(12) United States Patent
Chiang et al.

(10) Patent No.: US 7,923,895 B2
(45) Date of Patent: *Apr. 12, 2011

(54) ELECTROCHEMICAL METHODS, DEVICES, AND STRUCTURES

(75) Inventors: Yet-Ming Chiang, Framingham, MA (US); Steven R. Hall, Burlington, MA (US); Yukinori Koyama, Cambridge, MA (US); Kyungyeol Song, Seoul (KR); Timothy E. Chin, Cambridge, MA (US); Urs Rhyner, Schindellegi (CH); Dimitrios Sapnaras, Baden Wuerttemberg (DE); Fernando Tubilla, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/208,180

(22) Filed: Sep. 10, 2008

(65) Prior Publication Data

US 2010/0007248 A1 Jan. 14, 2010

Related U.S. Application Data

(63) Continuation of application No. 11/150,477, filed on Jun. 13, 2005, now Pat. No. 7,541,715.

(60) Provisional application No. 60/578,855, filed on Jun. 14, 2004, provisional application No. 60/621,051, filed on Oct. 25, 2004.

(51) Int. Cl.
*H01L 41/08* (2006.01)
(52) U.S. Cl. ........................... 310/311; 310/328
(58) Field of Classification Search .................. 310/311, 310/363
See application file for complete search history.

(56) References Cited

U.S. PATENT DOCUMENTS

| | | | |
|---|---|---|---|
| 3,573,511 A | 4/1971 | Noren | |
| 4,060,741 A | 11/1977 | Schafft | |
| 4,093,885 A | 6/1978 | Brown | |
| 4,194,062 A | 3/1980 | Carides et al. | |
| 4,382,882 A | 5/1983 | Vogel et al. | |
| 4,648,271 A | 3/1987 | Woolf | |
| 5,016,047 A | 5/1991 | Meacham | |
| 5,255,809 A | 10/1993 | Ervin et al. | |
| 5,268,082 A | 12/1993 | Oguro et al. | |
| 5,351,164 A * | 9/1994 | Grigortchak et al. | 361/502 |

(Continued)

FOREIGN PATENT DOCUMENTS

DE 19809483 A1 9/1999

(Continued)

OTHER PUBLICATIONS

Barvosa-Carter, W. et al., "Solid-state actuation based on reversible Li electroplating," Smart Structures and Materials 2005: Active Materials: Behavior and Mechanics, *Proceedings of SPIE*, 5761, 90-97.

(Continued)

*Primary Examiner* — Mark Budd
(74) *Attorney, Agent, or Firm* — Wolf, Greenfield & Sacks, P.C.

(57) ABSTRACT

The present invention provides devices and structures and methods of use thereof in electrochemical actuation. This invention provides electrochemical actuators, which are based, inter-alia, on an electric field-driven intercalation or alloying of high-modulus inorganic compounds, which can produce large and reversible volume changes, providing high actuation energy density, high actuation authority and large free strain.

20 Claims, 54 Drawing Sheets

U.S. PATENT DOCUMENTS

| | | | |
|---|---|---|---|
| 5,432,395 A | 7/1995 | Grahn | |
| 5,478,668 A | 12/1995 | Gozdz et al. | |
| 5,567,284 A | 10/1996 | Bauer et al. | |
| 5,671,905 A | 9/1997 | Hopkins, Jr. et al. | |
| 5,747,915 A | 5/1998 | Benavides | |
| 5,770,913 A | 6/1998 | Mizzi | |
| 5,800,420 A | 9/1998 | Gross et al. | |
| 5,848,911 A | 12/1998 | Garcin | |
| 5,858,001 A | 1/1999 | Tsals et al. | |
| 5,866,971 A | 2/1999 | Lazarus et al. | |
| 5,907,211 A | 5/1999 | Hall et al. | |
| 5,954,079 A | 9/1999 | Barth et al. | |
| 5,957,895 A | 9/1999 | Sage et al. | |
| 5,986,864 A | 11/1999 | Davis | |
| 5,989,423 A | 11/1999 | Kamen et al. | |
| 6,098,661 A | 8/2000 | Yim et al. | |
| 6,109,852 A | 8/2000 | Shahinpoor et al. | |
| 6,400,489 B1 | 6/2002 | Suzuki et al. | |
| 6,517,972 B1* | 2/2003 | Amatucci | 429/231.1 |
| 6,530,900 B1 | 3/2003 | Daily et al. | |
| 6,545,384 B1 | 4/2003 | Pelrine et al. | |
| 6,555,945 B1 | 4/2003 | Baughman et al. | |
| 6,577,039 B2 | 6/2003 | Ishida et al. | |
| 6,589,229 B1 | 7/2003 | Connelly et al. | |
| 6,599,662 B1* | 7/2003 | Chiang et al. | 429/218.1 |
| 6,682,500 B2 | 1/2004 | Soltanpour et al. | |
| 6,687,536 B1 | 2/2004 | Beck et al. | |
| 6,689,100 B2 | 2/2004 | Connelly et al. | |
| 6,699,218 B2 | 3/2004 | Flaherty et al. | |
| 6,752,787 B1 | 6/2004 | Causey, III et al. | |
| 6,828,062 B2 | 12/2004 | Lu et al. | |
| 6,938,945 B2 | 9/2005 | Wald et al. | |
| 6,960,192 B1 | 11/2005 | Flaherty et al. | |
| 6,982,514 B1 | 1/2006 | Lu et al. | |
| 7,005,078 B2 | 2/2006 | Van Lintel et al. | |
| 7,014,625 B2 | 3/2006 | Bengtsson | |
| 7,025,743 B2 | 4/2006 | Mann et al. | |
| 7,044,928 B2 | 5/2006 | LeMay et al. | |
| 7,115,108 B2 | 10/2006 | Wilkinson et al. | |
| 7,144,384 B2 | 12/2006 | Gorman et al. | |
| 7,156,838 B2 | 1/2007 | Gabel et al. | |
| 7,205,699 B1 | 4/2007 | Liu et al. | |
| 7,273,889 B2 | 9/2007 | Mermelstein et al. | |
| 7,274,128 B1 | 9/2007 | Liu et al. | |
| 7,298,017 B1 | 11/2007 | Liu et al. | |
| 7,410,476 B2 | 8/2008 | Wilkinson et al. | |
| 7,435,362 B2* | 10/2008 | Muraoka et al. | 252/582 |
| 7,541,715 B2* | 6/2009 | Chiang et al. | 310/311 |
| 7,569,050 B2 | 8/2009 | Moberg et al. | |
| D602,155 S | 10/2009 | Foley et al. | |
| D602,586 S | 10/2009 | Foley et al. | |
| 7,632,247 B2 | 12/2009 | Adams | |
| 7,652,907 B2 | 1/2010 | Bloch et al. | |
| 2001/0053887 A1 | 12/2001 | Douglas et al. | |
| 2002/0039620 A1 | 4/2002 | Shahinpoor et al. | |
| 2003/0135159 A1 | 7/2003 | Daily et al. | |
| 2003/0167035 A1 | 9/2003 | Flaherty et al. | |
| 2003/0170166 A1 | 9/2003 | Smalley et al. | |
| 2004/0038251 A1 | 2/2004 | Smalley et al. | |
| 2005/0119618 A1 | 6/2005 | Gonnelli | |
| 2005/0227071 A1* | 10/2005 | Muraoka et al. | 428/403 |
| 2006/0095014 A1 | 5/2006 | Ethelfeld | |
| 2006/0102455 A1* | 5/2006 | Chiang et al. | 200/181 |
| 2006/0206099 A1 | 9/2006 | Olsen | |
| 2006/0231399 A1 | 10/2006 | Smalley et al. | |
| 2007/0021733 A1 | 1/2007 | Hansen et al. | |
| 2007/0049865 A1 | 3/2007 | Radmer et al. | |
| 2007/0112301 A1 | 5/2007 | Preuthun et al. | |
| 2007/0282269 A1 | 12/2007 | Carter et al. | |
| 2007/0287753 A1 | 12/2007 | Charney et al. | |
| 2007/0299397 A1 | 12/2007 | Alferness et al. | |
| 2007/0299398 A1 | 12/2007 | Alferness et al. | |
| 2007/0299399 A1 | 12/2007 | Alferness et al. | |
| 2007/0299400 A1 | 12/2007 | Alferness et al. | |
| 2007/0299401 A1 | 12/2007 | Alferness et al. | |
| 2007/0299408 A1 | 12/2007 | Alferness et al. | |
| 2008/0009805 A1 | 1/2008 | Ethelfeld | |
| 2008/0015494 A1 | 1/2008 | Santini et al. | |
| 2008/0051710 A1 | 2/2008 | Moberg et al. | |
| 2008/0058718 A1 | 3/2008 | Adams et al. | |
| 2008/0157713 A1* | 7/2008 | Chiang et al. | 320/103 |
| 2008/0167620 A1 | 7/2008 | Adams et al. | |
| 2008/0215006 A1 | 9/2008 | Thorkild | |
| 2008/0255516 A1 | 10/2008 | Yodfat et al. | |
| 2008/0257718 A1* | 10/2008 | Chiang et al. | 204/242 |
| 2008/0269687 A1 | 10/2008 | Chong et al. | |
| 2008/0281270 A1 | 11/2008 | Cross et al. | |
| 2008/0317615 A1 | 12/2008 | Banister | |
| 2008/0319414 A1 | 12/2008 | Yodfat et al. | |
| 2009/0014320 A1* | 1/2009 | Chiang et al. | 204/252 |
| 2009/0028824 A1 | 1/2009 | Chiang et al. | |
| 2009/0036867 A1 | 2/2009 | Glejboel et al. | |
| 2009/0054866 A1 | 2/2009 | Teisen-Simony et al. | |
| 2009/0062747 A1 | 3/2009 | Saul | |
| 2009/0088693 A1 | 4/2009 | Carter | |
| 2009/0088694 A1 | 4/2009 | Carter et al. | |
| 2009/0088722 A1 | 4/2009 | Wojcik | |
| 2009/0099521 A1 | 4/2009 | Gravesen et al. | |
| 2009/0099522 A1 | 4/2009 | Kamen et al. | |
| 2009/0124997 A1 | 5/2009 | Pettis et al. | |
| 2009/0163855 A1 | 6/2009 | Shin et al. | |
| 2009/0163874 A1 | 6/2009 | Krag et al. | |
| 2009/0171324 A1 | 7/2009 | Chong et al. | |
| 2009/0182277 A1 | 7/2009 | Carter | |
| 2009/0192471 A1 | 7/2009 | Carter et al. | |
| 2009/0198215 A1 | 8/2009 | Chong et al. | |
| 2009/0326454 A1 | 12/2009 | Cross et al. | |
| 2009/0326455 A1 | 12/2009 | Carter | |
| 2009/0326472 A1 | 12/2009 | Carter et al. | |
| 2010/0007248 A1* | 1/2010 | Chiang et al. | 310/363 |
| 2010/0022992 A1 | 1/2010 | Genosar et al. | |
| 2010/0063438 A1 | 3/2010 | Bengtsson | |
| 2010/0129699 A1 | 5/2010 | Mikhaylik et al. | |

FOREIGN PATENT DOCUMENTS

| | | |
|---|---|---|
| DE | 100 26 264 A1 | 11/2001 |
| EP | 1 621 875 | 2/2006 |
| EP | 2 015 806 A1 | 1/2009 |
| JP | 04127885 | 4/1992 |
| JP | 2001-144342 | 5/2001 |
| WO | WO 95/15589 A1 | 6/1995 |
| WO | WO 96/34417 A | 10/1996 |
| WO | WO-2004/067066 A1 | 8/2004 |
| WO | WO 2005/124918 A1 | 12/2005 |
| WO | WO-2006/123329 A2 | 11/2006 |
| WO | WO 2007/010522 A1 | 1/2007 |
| WO | WO-2007/111880 A2 | 10/2007 |
| WO | WO-2007/129317 A1 | 11/2007 |
| WO | WO 2008/036122 A2 | 3/2008 |
| WO | WO 2008/094196 | 8/2008 |
| WO | WO-2008/129549 A1 | 10/2008 |
| WO | WO 2009/123672 A2 | 10/2009 |

OTHER PUBLICATIONS

Baughman, R.H., "Conducting Polymer Artificial Muscles," *Synthetic Metals* 78, 1996, 339-353.

Bruesewitz, M., "Elektrochmische Aktoren," *F&M Feinwerktechnik Mikrotechnik*, Hanser, Munchen, DE, Jul. 1, 1998, 106(7/08), 527-530.

Che, G. et al., "An Electrochemically Driven Actuator Based on a Nanostructured Carbon Material," *Anal. Chem.*, 1999, 71, 3187-3191.

Chin, T.E., et al., "Lithium Rechargeable Batteries as Electromechanical Actuators," *Electrochemical and Solid State Letters*, 2006, 9 (3), A134-A138.

Gu, G., et al., "$V_2O_5$ Nanofibre Sheet Actuators," *Nature Materials*, 2003, 2, 316-319.

International Search Report and Written Opinion from PCT/US2007/016849, filed Jul. 26, 2007, mailed Sep. 24, 2008.

International Search Report and Written Opinion from PCT/US2007/010036, filed Apr. 26, 2007, mailed May 21, 2008.

Koyama, Y. et al., "Harnessing the Actuation Potential of Solid-State Intercalation Compounds," *Adv. Funct. Mater.*, 2006, 16, 492-498.

Lin, K. et al., "Towards Electrochemical Artificial Muscles: A supramolecular Machine Based on a One-Dimensional Copper-Containing Organophosphonate System," *Angew. Chem. Int. Ed.* 2004, 43, 4186-4189.

Massey, C. et al., "Graphite intercalation compounds as actuation materials," *2004 Proceedings of IMECE04: 2004 ASME International Mechanical Engineering Congress and Exposition*, 117-122.

Massey, C. et al., "Reversible work by electrochemical intercalation of graphitic materials," *Smart Structures and Materials 2005: Electroactive Polymer Actuators and Devices (EAPAD), Proceedings of SPIE*, 5759, 322-330.

Niezrecki, C., et al., "Piezoelectric Actuation: State of the Art," *The Shock and Vibration Digest*, Jul. 2001, 33(4), 269-280.

Paquette, J.W. et al., "Ionomeric Electroactive Polymer Artificial Muscle for Naval Applications," *IEEE Journal of Oceanic Engineering*, 2004, 29, 3, 729-737.

Prechtl, E. et al., "Design of a high efficiency, large stroke, electrochemical actuator," *Smart Mater. Struct. 8*, 1999, 13-30.

Shahinpoor, M. et al., "Ionic Polymer-Metal Composites (IPMC) As Biomimetic Sensors and Actuators," *Proceedings of SPIE's 5th Annual International Symposium on Smart Structures and Materials*, Mar. 1-5, 1998, San Diego, CA. Paper No. 3324-27.

Spinks, G.M., et al., "Pheumantic Carbon Nanotube Actuators," *Adv. Mater.*, 2002, 14(23), 1728-1732.

Takada, K., et al., "Electrochemical Actuator with Silver Vanadium Bronzes," *Solid State Ionics*, 1992, vol. 53-56, 339-342.

Thomson, E.A., "Moving Toward Morphing Vehicles," *MIT TechTalk*, Mar. 22, 2006, 50(21), 1-8.

International Search Report and Written Opinion dated Feb. 7, 2008 for International Application Serial No. PCT/US2005/020554 (Corrected copy).

International Preliminary Report on Patentability dated Mar. 4, 2008 for International Application Serial No. PCT/US2005/020554.

International Preliminary Report on Patentability dated Oct. 28, 2008 for International Application Serial No. PCT/US2007/010036.

International Preliminary Report on Patentability dated Jan. 27, 2009 for International Application Serial No. PCT/US2007/016849.

Yamada A., et al., "Optimized $LiFePO_4$ for Lithium Battery Cathodes," *Journal of the Electrochemical Society*, Jan. 1, 2001, 148(3), A224-A229.

European Patent Office Supplemental Search Report from EP 05758772, mailed Mar. 5, 2010.

International Search Report from International Patent Application Serial No. PCT/US2009/001075, filed Feb. 20, 2009, mailed May 25, 2010.

[No Author Listed] Biovalue Products, Technologies: e-Patch. Jun. 26, 2006. Available at http://www.valeritas.com/epatch.shtml.

[No Author Listed] CODMAN 3000. Johnson & Johnson Company. 2 pages.

Osborne, Valeritas' Insulin Patch Takes Aim At Type II Drug Resisters. BioWorld Financial Watch. 2006;14(36):1 page.

* cited by examiner (a)

$$E = \frac{4V}{200 \, \mu m} = 2 \times 10^4 \text{ V/m}$$

A

B

ELECTROCHEMICAL METHODS, DEVICES, AND STRUCTURES

CROSS REFERENCE TO RELATED APPLICATIONS

This application is a continuation of U.S. application Ser. No. 11/150,477, filed Jun. 13, 2005, which claims priority from U.S. Provisional Application Ser. No. 60/578,855, filed Jun. 14, 2004 and U.S. Provisional Application Ser. No. 60/621,051, filed Oct. 25, 2004, which are hereby incorporated in their entirety.

FIELD OF THE INVENTION

This invention provides devices and structures and methods of use thereof in electrochemical actuation. This invention provides electrochemical actuators, which are based, inter-alia, on an electric field-driven intercalation or alloying of high-modulus inorganic compounds, which can produce large and reversible volume changes, providing high actuation energy density, high actuation authority and large free strain.

BACKGROUND OF THE INVENTION

Actuation is essentially a mechanism whereby a device is turned on or off, or is adjusted or moved by converting various types of energies such as electric energy or chemical energy into mechanical energy. Mechanical energy can be stored as elastic energy in a material or a device, or can be used to produce useful mechanical work, which is defined as the product of stress and strain. Thus a useful measure of the potential for actuation of a given material or device is the actuation energy density (energy per unit volume). The actuation energy density is also useful for distinguishing the capabilities of different actuation methods. The specific (or gravimetric) energy is readily obtained from the energy density knowing the density of the materials or device. While the "free strain," or strain produced under zero or nearly zero stress conditions, is sometimes used to characterize actuators or actuation materials, this is an inadequate measure of actuation capability since no mechanical work is done. Thus, the capability for mechanical work can only be known when the strain produced against a known mechanical stress, or the stress produced under known conditions of strain, are known.

Different types of actuators are categorized by the manner in which energy is converted. For instance, electrostatic actuators convert electrostatic forces into mechanical forces. Piezoelectric actuators use piezoelectric material to generate kinematic energy. Electromagnetic actuators convert electromagnetic forces into kinematic energy using a magnet and coil windings.

Actuation, in theory, would find application in the production of adaptive and morphing structures, though practically such an application has not produced ideal results. Piezoelectric actuation provides high bandwidth and actuation authority but low strain (much less than 1% typically), and requires high actuation voltages. Shape memory alloys (SMAs), magnetostrictors, and the newly developed ferromagnetic shape-memory alloys (FSMAs) are capable of larger strain but produce slower responses, limiting their applicability. Actuation mechanisms that are based on field-induced domain motion (piezos, FSMAs) also tend to have low blocked stress. All the above actuation methods are based on the use of active materials of high density (lead-based oxides, metal alloys), which negatively impacts weight-based figures of merit. Thus there is currently a great need for a technology capable of providing high actuation energy density, high actuation authority (stress), large free strain, and useful bandwidth.

Certain methods of actuation using electrochemistry have previously been described. For example, K. Oguro, H. Takenaka and Y. Kawami (U.S. Pat. No. 5,268,082) have described using surface electrodes to create ion motion under applied electric field across an ion-exchange membrane resulting in deformation of the membrane. W. Lu, B. R. Mattes and A. G. Fadeev (U.S. Patent Application No. 2002/0177039) have described using ionic liquid electrolytes in conjugated polymers to obtain dimensional change. R. H. Baughman, C. Cui, J. Su, Z. Iqbal, and A. Zhakidov (U.S. Pat. No. 6,555,945) have used double-layer charging of high surface area materials to provide for mechanical actuation. D. A. Hopkins, Jr. (U.S. Pat. No. 5,671,905) has described an actuator device in which electrochemically generated gas pressure is used to provide for mechanical motion. H. Bauer, F. Derisavi-Fard, U. Eckoldt, R. Gerhrmann and D. Kickel (U.S. Pat. No. 5,567,284) have similarly used electrochemically-produced gas pressure in a pneumatic actuation device. G. M. Spinks, G. G. Wallace, L. S. Fifield, L. R. Dalton, A. Mazzoldi, D. De Rossi, I. I. Khayrullin, and R. H. Baughman (Advanced Materials, 2002, 14, No. 23, pp. 1728-1732) have described a pneumatic mechanism using carbon nanotubes in which aqueous electrochemistry is used to generate gas within a confined space allowing for mechanical motion. In each of these non-faradaic approaches, the load-bearing actuation materials are inherently a gaseous or liquid phase and may be expected to have low elastic modulus and consequently low actuation energy density and actuation stress, compared to the approach of the present invention.

With respect to solid-state electrochemistry, it is well-known to those skilled in the art of solid state intercalation compounds, for instance, those working in the battery field, that certain compounds undergo expansion or contraction as their chemical composition is electrochemically altered by ion insertion or removal (faradaic processes). K. Takada and S. Kondo (Solid State Ionics, Vol. 53-56, pp. 339-342, 1992, and Japanese Patent Application 02248181) have further demonstrated free strain in consolidated solid compounds undergoing electrochemically induced composition change. They reported about 0.1% free strain using $Ag_xV_2O_5$ as a Ag intercalating compound, which is a Level of strain comparable to that reached by many commercial piezoelectric materials (e.g., those based on lead-zirconium-titanate (PZT)). However, no mechanical load was provided and so mechanical work was not demonstrated despite the observation of displacement. G. Cu, M. Schmid, P.-W. Chiu, A. Minett, J. Fraysse, G.-T. Kim, S. Roth, M. Kolov, E. Munoz and R. H. Baughman (Nature Materials, Vol. 2, pp. 316-319) have used mattes of $V_2O_5$ nanofibres for actuation using aqueous electrochemistry. In this instance, they reported strain under unloaded conditions of up 0.21%, and the production of stress under nominally zero-strain conditions of up to 5.9 MPa, although whether the process used to generate the stress was faradaic or non-faradaic was not known.

SUMMARY OF THE INVENTION

The invention provides, in one embodiment, an electrochemical actuator, comprising an negative electrode, a positive electrode and an intercalating species, wherein the electrochemical actuator is subjected to an applied voltage, whereby application of the voltage or cessation thereof induces intercalation of the intercalating species in the actuator, resulting in a volumetric or dimensional change of the actuator under conditions of mechanical constraint or loading resulting in the production of useful mechanical energy.

In another embodiment, the invention provides a Multilayer Stacked Electrochemical Actuator, comprising two or more negative electrode layers, two or more positive electrode layers, and an intercalating species, wherein the Multilayer Stacked Electrochemical Actuator is subjected to an applied voltage, whereby application of the voltage or cessation thereof induces intercalation of the intercalating species in the actuator, resulting in a volumetric change of the actuator resulting in the production of useful mechanical energy.

In another embodiment, the invention provides a Rotational Electrochemical Actuator, comprising rolled layers of an negative electrode, a positive electrode and an intercalating species, wherein the rolled layers assume a laminate configuration, and wherein the Rotational Electrochemical Actuator is subjected to an applied voltage, whereby application of the voltage produces intercalation of the intercalating species in the actuator, resulting in a volumetric or dimensional change of the actuator such that the rolled laminate configuration winds or unwinds, and torque is produced.

In one embodiment, following when the rolled laminate configuration winds or unwinds, rotary motion is produced. In one embodiment, the rotary motion ranges from 1-360°. In another embodiment, the rotary motion produces 1 or more rotations. In another embodiment, the 1 or more rotations are complete or incomplete. In another embodiment, the rotation is in a clockwise direction or counter clockwise direction, or a combination thereof.

In another embodiment, the invention provides a Continuous Fiber Electrochemical Actuator, comprising a fibrous electrode, a counter electrode and an intercalating species wherein the Continuous Fiber Electrochemical Actuator is subjected to an applied voltage, whereby application of the voltage or its cessation induces intercalation of the intercalating species in the actuator, resulting in a volumetric or dimensional change of the actuator, such that said fibrous negative electrode undergoes elongation and produces useful mechanical work. In one embodiment, the volumetric or dimensional change is induced in tension as well as in compression.

In another embodiment, the Continuous Fiber Electrochemical Actuator is comprised of multiple coated fibers, which are utilized to form a fiber composite. In another embodiment, the composite further comprises a matrix, which, in another embodiment, is a polymer. In another embodiment, the composite of the Continuous Fiber Electrochemical Actuator comprises fiber ends, which are uncoated. In another embodiment, the uncoated ends of the fibers enable electrical connections to be applied to the ends of the fibers.

In another embodiment, the Continuous Fiber Electrochemical Actuator comprises multiple layers, which, in another embodiment are assembled in parallel or in perpendicular orientation. In another embodiment, the perpendicular orientation allows positive and negative shearing actuation of the actuator, which, in another embodiment, produces torque, or, in another embodiment, produces rotation. In another embodiment, the perpendicular orientation allows for charge transfer between layers when low voltage is applied.

In one embodiment of the invention, intercalation of the species in an actuator of this invention can occur upon both application of the voltage and cessation thereof. In another embodiment, the extent of volume change is controlled by controlling the amount of current flow into or out of the actuator. In another embodiment, the volumetric or dimensional change is in the negative electrode or positive electrode or a combination thereof. In another embodiment, the volumetric or dimensional change is reversible. In another embodiment, the intercalation produces high strain against a substantial mechanical load. In another embodiment, the negative electrode, or in another embodiment, the positive electrode, serves as a donor or acceptor or combination thereof of the intercalating species.

In another embodiment, an electrode of an actuator of this invention is initially enriched in, and may serve as a source for, the intercalating species. In another embodiment, a negative electrode of an actuator of this invention may serve as a source for the intercalating species. In another embodiment, a positive electrode of an actuator of this invention may serve as a source for the intercalating species.

In another embodiment, the electrode comprises a high elastic modulus compound. In another embodiment, an electrode comprises an ion transition metal oxide. In another embodiment, the ion in said ion transition metal oxide is a proton or an alkali metal or an alkaline earth metal. In another embodiment, the alkali metal is lithium. In another embodiment, an electrode comprises: $LiCoO_2$, $LiFePO_4$, $LiNiO_2$, $LiMn_2O_4$, $LiMnO_2$, $LiMnPO_4$, $Li_4Ti_5O_{12}$, and their modified compositions and solid solutions. In another embodiment, an electrode comprises: an oxide compound comprising one or more of titanium oxide, vanadium oxide, tin oxide, antimony oxide, cobalt oxide, nickel oxide or iron oxide. In another embodiment an electrode comprises $TiSi_2$, $MoSi_2$, $WSi_2$, and their modified compositions and solid solutions. In another embodiment an electrode comprises a metal or intermetallic compound. In another embodiment an electrode is lithium or a lithium-metal alloy, which may be crystalline, nanocrystalline, or amorphous. In another embodiment the negative electrode is one or more of aluminum, silver, gold, boron, bismuth, gallium, germanium, indium, lead, antimony, silicon, or tin. In another embodiment, an electrode is carbon in the form of graphite, a carbon fiber structure, a glassy carbon structure, a highly oriented pyrolytic graphite, a disordered carbon structure or a combination thereof. In another embodiment, the intercalating species is an ion. In another embodiment, a proton or an alkali metal or an alkaline earth metal.

In another embodiment, the negative electrode or positive electrode compound undergoes anisotropic expansion or contraction upon intercalation.

In another embodiment, the compound is textured or oriented in the electrodes of the actuator resulting in anisotropic expansion or contraction. In another embodiment, the compound is oriented in the electrodes of the actuator to increase the dimensional change in the primary actuation direction of the actuator upon intercalation or alloying. In another embodiment, the negative or positive electrode compound undergoes a phase change upon intercalation or de-intercalation. In another embodiment, the negative or positive electrode material is in the form of a single crystal, polycrystal, or fine powder. In another embodiment the fine powder is of anisometric particle shape. In another embodiment the fine powder has a platelet or rod-like morphology. In another embodiment the smallest dimension of the powder particles is on average less than about 100 micrometers.

In another embodiment, one or more electrodes of the actuator comprise a porous sintered aggregate of the negative or positive electrode compound. In another embodiment, the porous sintered aggregate is a composite comprising also a conductive additive or sintering aid. In another embodiment the sintered aggregate has crystallites of an electrode compound that share a common orientation or texture of their crystal axes, which in one embodiment is uni-axial, and in another embodiment is biaxial.

In another embodiment, one or more electrodes of the actuator comprise a composite containing a powder of the negative or positive electrode compound, an organic or inorganic binder, and optionally a conductive additive. In one embodiment the binder is a polymer, and the conductive additive is carbon. In another embodiment, the volume percentage of the electrode compound in the electrode is at least 45%. In another embodiment the particles of the compound are anisometric in shape, and have a preferred common orientation. In another embodiment, the particles of the compound are crystalline, and have a preferred common orientation or texture of their crystal axes, which in one embodiment is uni-axial, and in another embodiment is biaxial. In another embodiment, the composite electrode is fabricated by mixing its constituents in an aqueous or inorganic solvent, coating and drying the mixture, and pressing or calendaring the coating.

In another embodiment, an actuator of this invention further comprises a current collector, which, in another embodiment, comprises a conductive material. In another embodiment, an actuator of this invention further comprises a separator, which in one embodiment is porous, or in another embodiment, is rigid. In one embodiment, the porous separator comprises a microporous polymer. In another embodiment, the porous separator comprises a porous electronically insulating ceramic material, which in another embodiment is alumina, an aluminosilicate, cordierite, or a silicate glass.

In another embodiment, an actuator of this invention further comprises an electrolyte. In one embodiment, the electrolyte is a solid electrolyte, which in one embodiment is a polymer, and in another embodiment an inorganic crystal or glass. In another embodiment, the electrolyte is a liquid or gel electrolyte. In another embodiment, an actuator of this invention further comprises an external packaging layer, which may be, in one embodiment, an electrochemically-insulating layer, or, in another embodiment, a protective layer or, in another embodiment, a combination thereof.

In another embodiment, this invention provides an actuator device in which an electrochemical actuator of this invention is further used in an actuator structure that provides for stress amplification (strain deamplification) or stress deamplification (strain amplification).

In another embodiment, an electrochemically-actuated strain deamplifying (stress amplifying) actuator device having a woven structure is provided.

In another embodiment, an electrochemically-actuated strain amplifying (stress deamplifying) lever actuator is provided.

In another embodiment, this invention provides a structure or apparatus comprising an actuator of this invention. In one embodiment, the structure or apparatus is adaptive. In another embodiment, the actuator is used as an element to apply stress at a site on the structure or apparatus that is distal to the actuator. In another embodiment, the apparatus amplifies the volumetric or dimensional change induced by the actuator, while in another embodiment, the apparatus deamplifies the volumetric or dimensional change induced by the actuator.

In one embodiment, the structure or apparatus moves in or beyond the atmosphere. In one embodiment, such a structure or apparatus may be an aircraft, a missile, a spacecraft or a satellite. In another embodiment, such a structure or apparatus may be part of an aircraft, a missile, a spacecraft, a worm, a robot or a satellite. In other embodiments, the part may be a wing, a blade, a canard, a fuselage, a tail, an aileron, a rudder, an elevator, a flap, a pipe, a propellor, a mirror, an optical element, or a combination thereof. In other embodiments, the part may be an engine, a motor, a valve, a regulator, a pump, a flow control device, a rotor, or a combination thereof.

In another embodiment, the structure or apparatus moves in water. In one embodiment, such a structure or apparatus may be a boat, a ship, a submarine or a torpedo. In another embodiment, the structure or apparatus is a part of a boat, a ship, a submarine or a torpedo. In another embodiment, the part is a blade, a rudder, a pipe, a propellor, an optical element, or a combination thereof. In another embodiment, the part is an engine, a motor, a valve, a regulator, a pump, a flow control device, a rotor, a switch or a combination thereof.

In another embodiment, the structure or apparatus is a bomb, a means of transportation, an imaging device, a robotic, a worm, a prosthesis, an exoskeleton, an implant, a stent, a valve, an artificial organ, an in vivo delivery system, or a means of in vivo signal propagation.

In another embodiment, this invention provides a method of actuation, comprising the step of applying a voltage or current to an actuator comprising a negative electrode, a positive electrode and an intercalating species, wherein controlling the applied voltage or current induces intercalation of the intercalating species in the actuator, whereby the intercalation induces a volumetric or dimensional change of said actuator. In one embodiment, an apparatus or structure comprises the actuator. In one embodiment, the method results in a structural change in the structure or apparatus comprising the actuator. In another embodiment, the structure or apparatus comprises more than one actuator. In another embodiment, a curvature, bend or twist, or combination thereof is induced in the structure or apparatus.

In another embodiment, this invention provides a method of producing torque or rotary motion in an apparatus comprising a Rotational Electrochemical Actuator, comprising the step of applying a voltage to a Rotational Electrochemical Actuator comprising an negative electrode, a positive electrode and an intercalating species, wherein applying voltage causes current flow inducing intercalation of the intercalating species in the actuator resulting in a volumetric or dimensional change of the actuator such that the rolled laminate layers unwind, and torque or rotary motion is produced.

In another embodiment, this invention provides a pump comprising at least one electrochemical actuator, comprising an negative electrode, a positive electrode, an intercalating species, and at least one valve, wherein following application of a voltage causing current flow in said actuator, intercalation of said species produces a change in volume in said actuator, such that fluid is directed through said valve. In one embodiment, the pump comprises a series of actuators. In one embodiment, the actuators are placed in a parallel series. In another embodiment, the actuators are placed in a plane so as to direct fluid through designed channels.

In another embodiment, this invention provides a nastic structure comprising at least one electrochemical actuator, comprising an negative electrode, a positive electrode, and an intercalating species, wherein following application of a voltage causing current flow in the actuator, intercalation of the intercalating species produces a change in volume in the actuator, such that a bend or other deformity is induced in the nastic structure.

In another embodiment, this invention provides for the use of an electrochemical actuator in a microfluidic system, wherein a network of hydraulic actuators is driven by intercalation-induced volume changes in the electrochemical actuator.

In another embodiment, this invention provides for the use of at least one electrochemical actuator for flight control of an aircraft, wherein the actuator is positioned on the aircraft, such that following intercalation-induced volume changes in the actuator(s), greater flight control is achieved.

BRIEF DESCRIPTION OF THE DRAWINGS

FIG. 18 shows actuation strain versus charge/discharge for bilayer stacked actuator, at 10 and 17 MPa applied uniaxial stress.

DETAILED DESCRIPTION OF THE INVENTION

This invention provides, in one embodiment, methods and structures/apparatuses for actuation that is based on the electric field driven intercalation (ion-exchange) of high-modulus inorganic compounds and produces true, useful, mechanical work.

The invention provides, in one embodiment, an electrochemical actuator, comprising a negative electrode, a positive electrode and an intercalating species, wherein the electrochemical actuator is subjected to an applied voltage or current, whereby application of the voltage or current or cessation thereof induces intercalation of the intercalating species in the actuator, resulting in a volumetric or dimensional change of the actuator. In the context of this invention, and in one embodiment, intercalation is understood to have a broad meaning including the insertion of ions into a structure causing a dimensional change without substantially changing the arrangement of other atoms, insertion forming a disordered or ordered solid solution, insertion forming an alloy, or insertion causing a partial or complete transformation to a new phase. All of these methods of "intercalation" may be useful in providing mechanical actuation.

Figure 1:
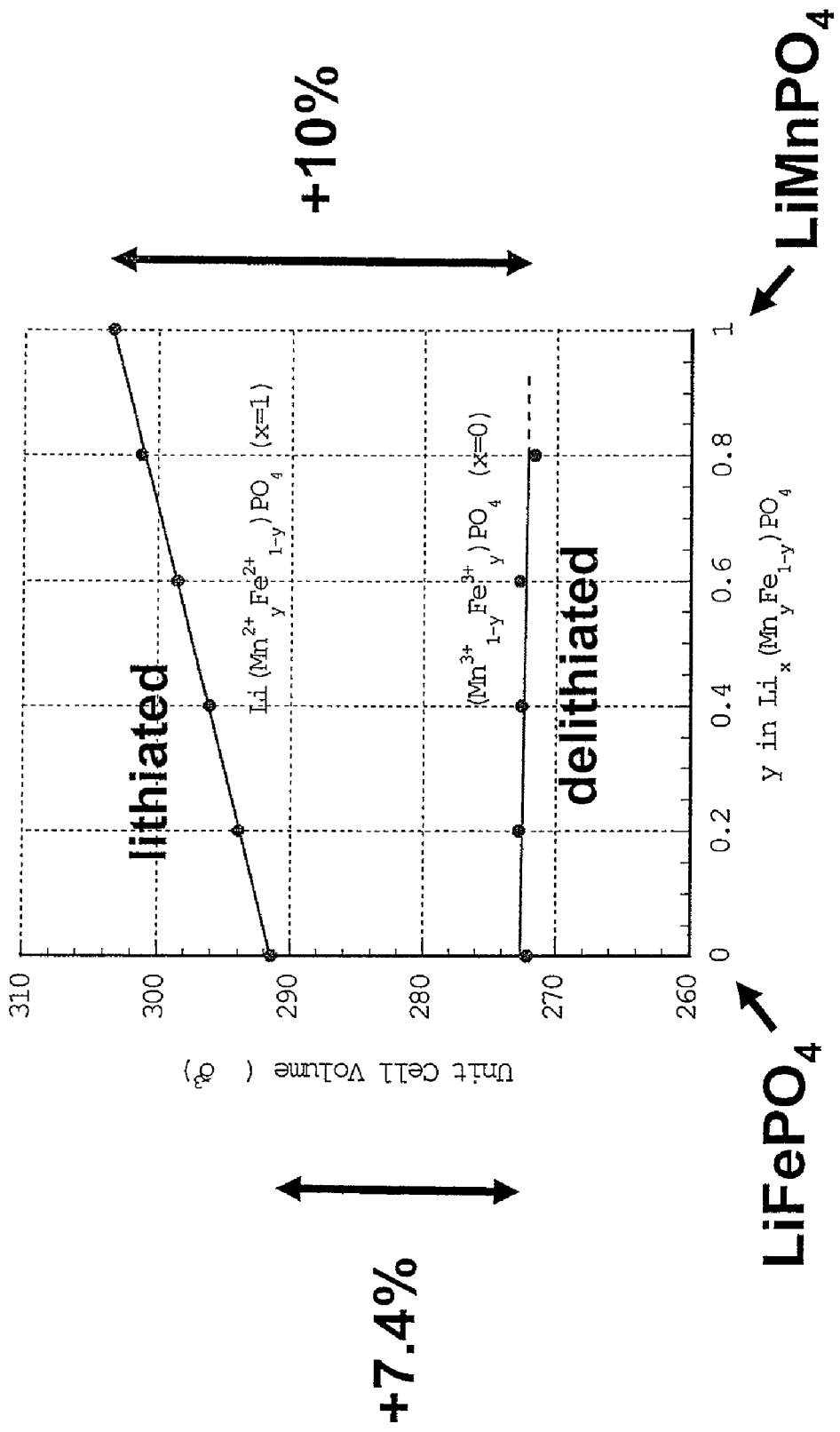
FIG. 1A demonstrates an embodiment of a reversible lithium intercalation with phospho-olivines Li(Fe,Mn)PO$_4$ to produce large intrinsic (crystallographic) volume changes of 7.4-10% [A. Yamada et al., J. Electrochem. Soc., 148, A224 (2001)].
FIG. 1B depicts the expansion upon discharge detected following Li+ intercalation into an LiFePO$_4$ positive electrode in an actuator with a 100 μm active layer, producing a 2.3% linear strain, well in agreement with the predicted value, in this embodiment of the invention.
FIG. 1C depicts the actuation strain in a multilayer Li-polymer battery of ~5 mm thickness. Strain was measured normal to the plane of the multilayer stack during charge and discharge. The 50 mm reversible displacement corresponds to ~1% linear strain.

Solid-state ion insertion compounds used in battery systems may undergo large and reversible volume changes (up to ~15% with high reversibility) as ions (e.g., Li+) are intercalated into the structure, which is exploited by the actuators of this invention, in one embodiment. As one example, FIG. 1 shows the volume changes that occur in the olivine structure compound (Fe,Mn)PO$_4$ as it is lithiated to the endmember composition Li(Fe,Mn)PO$_4$. Between the fully lithiated (upper curve) and fully delithiated (lower curve) limits of composition, a volume change of 7.4-10% (linear strain of 2.4-3.2%) is realizable depending on the Fe/Mn ratio. This is just one of numerous new intercalation compounds that have emerged from the battery field, which have promise for the technology here proposed, all of which represent embodiments of this invention. The insertion of ions into such compounds can result in volume expansion or contraction, and such expansion or contraction can be isotropic or anisotropic.

The volume change may have a corresponding linear or multiaxial dimensional change that is here exploited for mechanical actuation. Where the dimensional change is anisotropic, the anisotropy may be further exploited to maximize, minimize, or optimize the dimensional change for actuation, by using said compounds in a form in which there is a crystallographic orientation of the compound in the desired directions of actuation. For example, in one embodiment in which graphite is the active material, the expansion upon intercalation of alkali ions occurs primarily normal to the graphene planes of the graphite structure, and maximum expansion and contraction can be produced by having the graphene planes of the graphite oriented in the desired directions of actuation.

Table 1 provides exemplary pairs of compounds comprising an electrochemical couple with reversible electrochemical insertion of lithium, for which values for intrinsic linear and volumetric expansions (i.e., crystal constants of the lithiated and delithiated forms) are available. Table 2 provides exemplary individual compounds used as positive and negative electrodes in lithium batteries, and the volume change that occurs for a typical composition to which the compound can be delithiated. Note that in the electrochemical actuators of this invention, compounds are not restricted to being used as the electrode that they would comprise in a battery designed for optimal energy storage; that is, the active materials may comprise either positive or negative electrode in an electrochemical actuator.

TABLE 1

Cell Voltage and Net Volume Change For Charge-Balanced Cells Using Graphite as One Electrode

| Electrochemical Charging Reaction for Cell | Cell Voltage | Net Volume Change (Positive electrode + Negative electrode) |
|---|---|---|
| LiCoO$_2$ + 3C ⇒ Li$_{0.5}$CoO$_2$ + 0.5LiC$_6$ | 3.6 V | +5.8% |
| LiNiO$_2$ + 4.2C ⇒ Li$_{0.3}$CoO$_2$ + 0.7LiC$_6$ | 3.7 V | +5.3% |
| LiFePO$_4$ + 6C ⇒ FePO$_4$ + LiC$_6$ | 3.3 V | +5.8% |
| LiMn$_2$O$_4$ + 6C ⇒ Mn$_2$O$_4$ + LiC$_6$ | 3.8 V | +4.2% |
| Li + 6C ⇒ LiC$_6$ | 0.15 V | −2.4% |

TABLE 2

Selected Lithium Storage Electrodes and Associated Volume Changes

| Lithium Insertion Compound | Limiting Composition* | ΔV/V$_0$ | Comments |
|---|---|---|---|
| Positive electrodes | | | |
| LiCoO$_2$ | Li$_{0.5}$CoO$_2$ | +1.85% | Y~400 GPa. |
| LiFePO$_4$ | FePO$_4$ | −7.35% | Y~150 GPa. |
| LiNiO$_2$ | Li$_{0.3}$NiO$_2$ | −2.82% | |
| LiMn$_2$O$_4$ | Mn$_2$O$_4$ | −7.35% | |
| Negative electrodes | | | |
| Li$_{4/3}$Ti$_{5/3}$O$_4$ | Li$_{7/3}$Ti$_{5/3}$O$_4$ | 0 | "Zero-strain" spinel structure electrode. |
| C | ⅙ LiC$_6$ | +13.1% | Y~15 GPa (polycrystal). |
| Si | Li$_{4.4}$Si | +312% | |
| β-Sn | Li$_{4.4}$Sn | +260% | |

*For reversible cycling, except for Si and Sn

LiCoO$_2$, when used as the positive electrode, expands 1.85% when lithium is removed, while most other compounds shrink. Despite a modest volume change, LiCoO$_2$ is of interest because it can be used with carbon (Table 1) in a highly reliable and well-developed electrochemical system. LiCoO$_2$ has a hexagonal structure (rhombohedral space group R-3m) in which the lithium planes are parallel to the c-axis. The Young's modulus along the c-axis is 330 GPa while that along the a-axis (which lies in the fast-diffusion plane) is 500 GPa (F. X. Hart and J. B. Bates, *J. Appl. Phys.*, 83[12], 7560 (1998)), hence an aggregate value for randomly-oriented polycrystals of ~400 GPa can be obtained. Such a value is close to that obtainable for high strength structural ceramics such as Al$_2$O$_3$ and SiC.

A second example for use as the positive electrode is LiFePO$_4$, a phospho-olivine that when suitably doped (S. Y. Chung, J. T. Bloking, Y.-M. Chiang, *Nature Materials*, 1, 123 (2002)) has extremely fast charge-discharge behavior for a lithium battery, retaining ~50% of its charge capacity (and crystal expansion) at charge-discharge times of ~1 min (17 mHz). Its elastic properties have not been measured, but the similar mineral phosphate apatite (Ca$_5$(OH, F)(PO4)$_3$) has a Young's modulus of 150 GPa (G. Simmons and H. Wang, *Single Crystal Elastic Constants and Calculated Aggregate Properties*, MIT Press, Cambridge, Mass., 1971). It is expected that the phospho-olivines will have a higher modulus than apatite due to their denser atomic packing. Another attraction of these compounds is their safety in electrochemical systems.

As shown in Table 2, graphite is an excellent candidate for use as the negative electrode of an electrochemical actuator, owing to its ~13% volume expansion upon lithiation to the limiting composition $LiC_6$. This family includes not just graphite but also various other forms of disordered carbons, which together constitute widely used negative electrodes in current technology (see for example N. Imanishi, Y. Takeda and O. Yamamoto, and by M. Winter and J. O. Besenhard, Chapters 5 and 6 respectively in *Lithium Ion Batteries*, Eds. M. Wakihara and O. Yamamoto, Wiley-VCH, Weinheim, Germany, 1998)).

Using materials from Table 2, several types of electrochemical actuators are conceived. In one, the volume change of one electrode material is used to perform mechanical work, while the volume change in the counterelectrode is either negligible or is accommodated in a non-load bearing manner. In this instance active materials are selected primarily according to their elastic constants and strains.

In a second type, both the positive electrode and negative electrode are load-bearing, and volume changes in both active materials in the electrochemical couple (the positive electrode and the negative electrode) are used, the net volume change of the electrochemical reaction being the relevant quantity. Table 1 lists several electrochemical couples that use carbon as the negative electrode material, from which it is seen that several options give ~5% volumetric strain in a cell where the relative amounts of each material are adjusted to give a charge-balanced cell. In both designs, other issues such as rate capability (bandwidth), reversibility in cycling, and stability and safety over a wide range of operating temperatures must also be considered in the selection process.

Using the materials of Table 2, it is also possible to design actuators of a type that expands upon charging of the electrochemical cell, or one that expands upon discharging. Table 1 provides four examples that expand upon charging of the cell and one that expands upon discharging. As another example of actuators that expand upon discharging, any electrode-active compound that has a lithium insertion potential lower than that of the "zero-strain" material $Li_4Ti_5O_{12}$ (Table 2), and which expands upon lithiation, will comprise the negative electrode when used with $Li_4Ti_5O_{12}$. Such a cell will spontaneously discharge when electrons are allowed to flow between the electrodes, and lithium will migrate from the $Li_4Ti_5O_{12}$ to the other electrode, causing it to expand. Having a cell that either expands or contracts upon spontaneous discharge can be advantageous in designing the actuators of the invention for applications where a particular "default" state is desirable, for example in designing an actuated latch that defaults to an open (or closed) state in the event of an intentional or accidental short-circuit of the electrochemical actuator.

The stress that an actuator can be subjected to while producing useful strain, or the "blocked stress" that can be produced by an actuator undergoing zero or small strain, are important performance characteristics that bear directly on the practical utility of the actuator. In this respect, Table 2 and earlier discussion illustrates a particular advantage of the electrochemical actuators of the invention, which is the high elastic modulus of the active materials. In this invention we recognize and design actuators to utilize the fact that electrochemically-induced strains are substantial, and at the same time many ion-storage compounds including graphite, metal alloys, and intercalation oxides have high elastic modulus (50-150 GPa), more than a thousand times greater than other actuator materials such as electroactive polymers or gels, thereby providing for large actuation authority as well as large strain.

Figure 37:
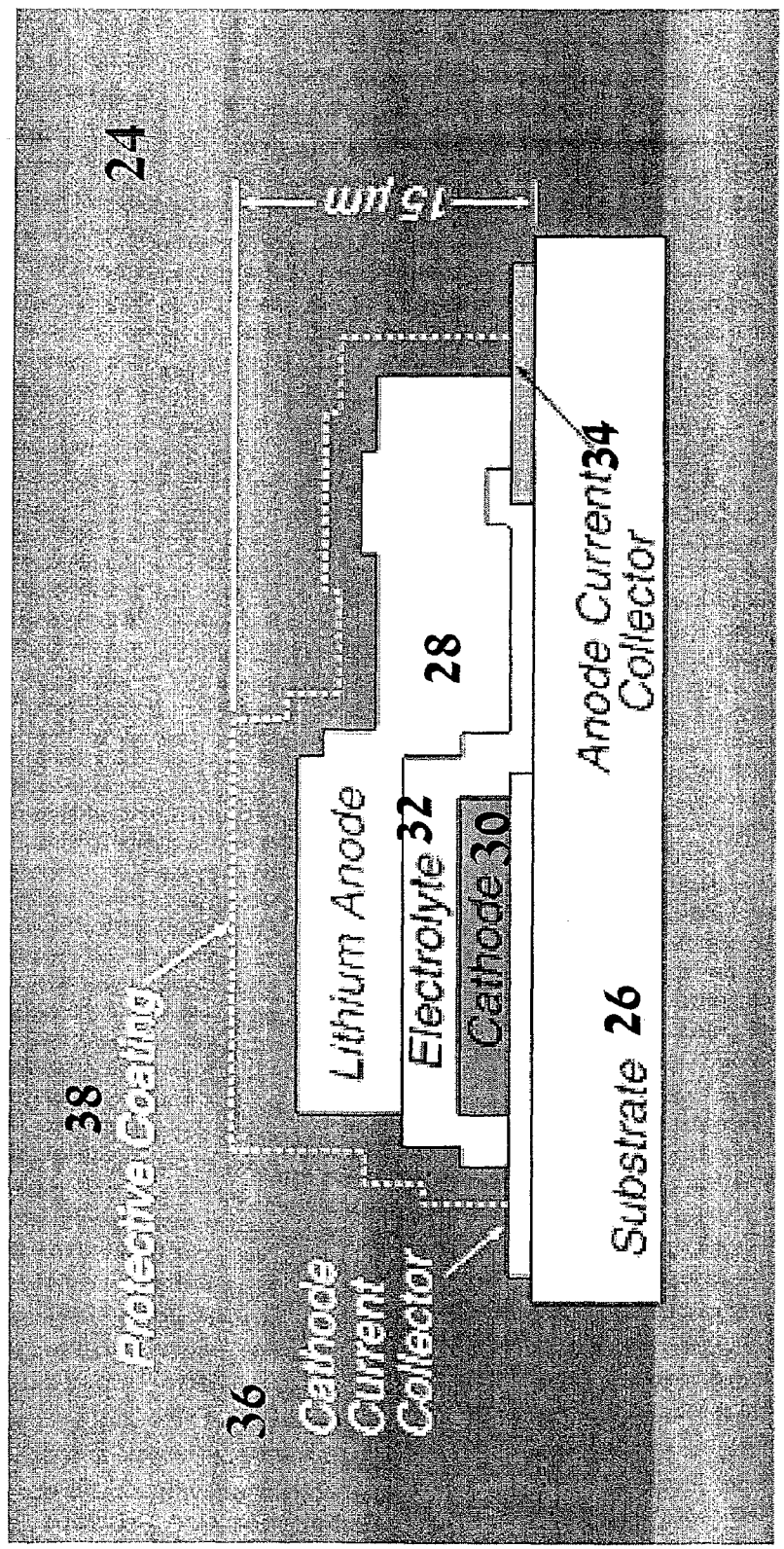
FIG. 37 schematically depicts one embodiment of a solid-state thin-film battery (24) that can be used for actuation. The negative electrode 28 is separated from the positive electrode 30 by an electrolyte layer 32, and current collectors for the negative electrode 34 and positive electrode 36 as well as the other components of the actuator are positioned on a substrate 26. A protective coating 38 covers the actuator, providing a height of 15 μm, in this example.
Figure 38:
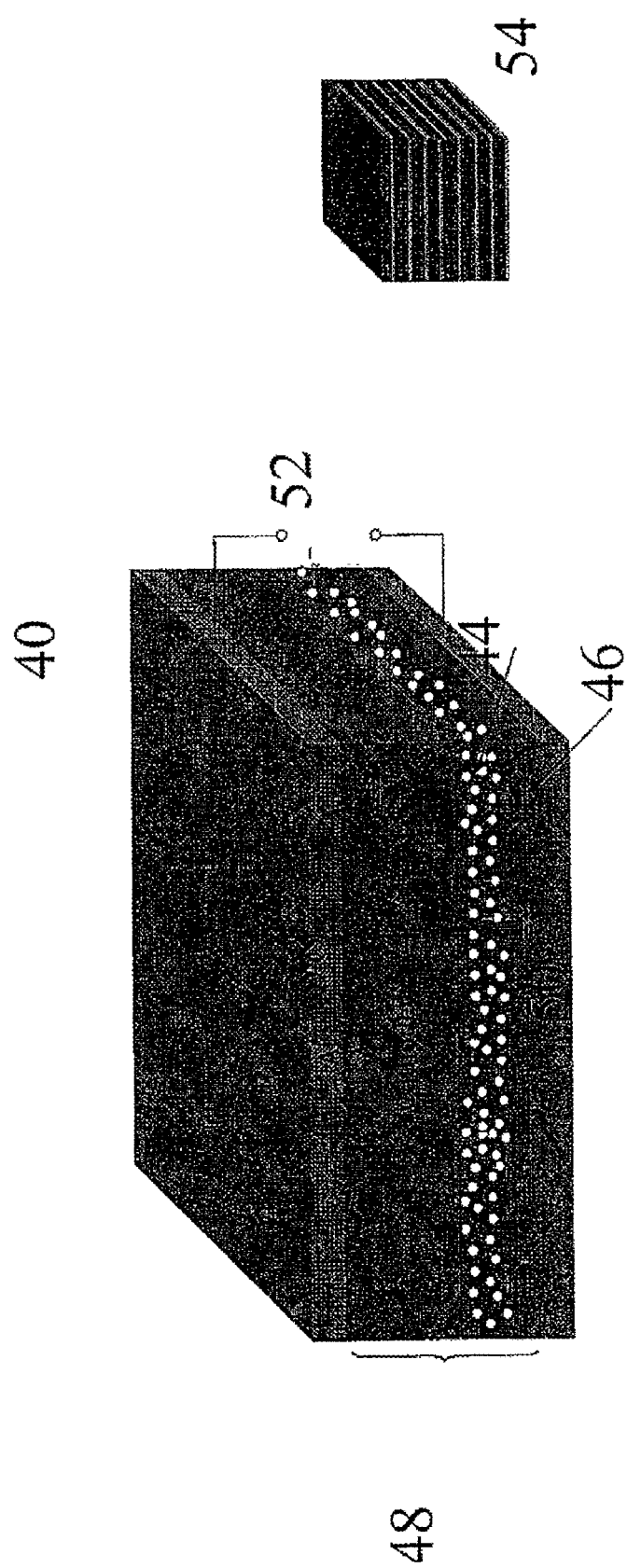
FIG. 38 schematically depicts embodiments of a Multi-layer Stacked Actuator of this invention. In this example, a high stiffness bilayer subassembly 40 and multilayer-stacked assembly 54 are depicted. Because the system is composed of ceramic layers 44, 46 and metal electrodes 42, the stack will have high stiffness and a strain capability of several percent. Liquid electrolyte may infiltrate the actuator 48. Current collectors 38, 50 may be present, with a power source 52, as indicated. This actuator would be an all-purpose, high energy density actuator, which could be used in many applications requiring high energy densities at modest bandwidth.

In addition to high actuation energy density and actuation stress, one measure of actuation authority that permits comparisons with piezoelectric actuator technology is the coefficient $e^{33}$, which refers to actuation stress generated per unit electric field (Units: $Pa/V/m=C/m^2$). (In the case of piezoelectrics, this coefficient is maximized for stresses in the direction of the applied electric fields, signified by the superscript "33."). Consider a laminated electrochemical actuator having cathode and anode thicknesses comparable to those in current lithium ion battery technology, as schematized in FIG. 37. As an example such a device may have an intercalation compound as one electrode, a stiff but porous ceramic separator, and an inorganic negative electrode of high elastic modulus, as shown in FIG. 38. For a 200 micrometer thick layer (typical for battery electrodes) of the electrochemical insertion compound in FIG. 1, when formulated as a powder-based composite electrode, will have a Young's modulus of $Y=50$ GPa (assumed to be reduced from the single crystal value of ~150 GPa). Under 3.3V applied voltage this electrode can be fully intercalated to reach a linear strain of $\epsilon \sim 1.5\%$, thereby generating $e^{33}=3.8\times10^4$ $C/m^2$. This value considerably exceeds the $e^{33}$ values obtained with the best-known piezoelectrics, of 15-40 $C/m^2$. The corresponding actuation specific energy, taken as $\frac{1}{2}Y\epsilon^2/\rho$, the strain energy density, taken as $\frac{1}{2}Y\epsilon^2/\rho$ where $\rho$ is the material density, is about 2050 J/kg ($5.6\times10^3$ $kJ/m^3$) for the active material layer, and ~1000 J/kg ($2.8\times10^3$ $kJ/m^3$) for an actuator stack containing one-half by weight or volume of inactive supporting layers. These values also greatly exceed typical values of 13.5 J/kg and 100 $kJ/m^3$ for a PZT piezoelectric ceramic. At a stack volumetric strain energy density of $2.8\times10^3$ $kJ/m^3$, and 1.5% linear strain, the equivalent blocked stress is ~375 MPa. These comparisons illustrate the advantages of the present invention over existing actuation technology where high actuation energy, high actuation authority, and large strain is required, and their usefulness in a wide variety of adaptive structures requiring significant strain coupled with high authority.

Since batteries are energy storage devices, the total amount of stored electrical energy is naturally maximized; typical stored energy levels for unpackaged rechargeable lithium ion batteries (i.e., the active "stack" alone without the can) are 550 Wh/liter and 200 Wh/kg. In such cases, and even in electrochemical actuators of the invention designed without regard to electrical energy storage and operating at less than 1V or even less than 0.5V applied voltage, during a charge/discharge cycle the mechanical work done may be only a few percent of the total electrical energy stored. This low level of electromechanical coupling is largely responsible for the high blocked stresses that are achievable, i.e. discharging a charged battery through the application of an external stress is difficult. In one embodiment, the actuator is designed such that the electrical energy is shuttled from the actuator to a storage battery, or in another embodiment, between two actuators acting in concert so that as one is charged the other is discharged, and the positive and negative strains simultaneously produced add to produce a desired deformation. In one embodiment, the invention allows for the use of antagonistic actuators so that as one is charged, another is discharged, having both act beneficially from the point of view of strain while shuttling the electrical energy between the two so that it is not resistively dissipated. Thus, according to this aspect of the invention, the losses in the system may be primarily the low resistive losses that are produced as the charge is shuttled between actuators.

In one embodiment, the intercalated material refers to an ion insertion compound, and in one embodiment, a solid-state ion insertion compound such as is used in battery systems, which is intercalated within the structure of the actuator, as described herein. In another embodiment, the intercalating species is a proton or an alkali metal or an alkaline earth metal. In one embodiment, the alkali metal is lithium.

In another embodiment, the high-modulus inorganic compounds are exemplified by the lithium transition metal oxide positive electrodes (e.g., $LiCoO_2$, $LiMn_2O_4$, $LiNiO_2$, $LiFePO_4$) and carbon negative electrodes developed as storage electrodes for rechargeable battery systems. These, and in other embodiments, other similar compounds can be intercalated with Li+ ions at low voltages of 1.5-5V to produce large and reversible volume changes of, in some embodiments, 3-13%.

In another embodiment, the ion insertion mechanisms may make use of an alloying of lithium with various metals and metalloids, such as, for example, Sn, or Si, which, in another embodiment may result in volume expansions in excess of 250%.

In one embodiment, the electrochemically-induced strain produced for actuation, when using intercalation compounds, which are oxides of high elastic modulus (50-150 GPa) will allow large actuation authority as well as large free strain, such that stresses can be produced approaching the intrinsic compressive strength of the materials. Furthermore, these compounds have low densities (3.5-5 g/cm3) compared to lead-based piezoelectrics or metal alloys comprising magnetostrictors and shape memory alloys.

In one embodiment, packaged actuators of this invention may have densities of 2-4 g/cm$^3$, which can produce high actuation authority, suitable for a broad range of applications.

In one embodiment, the volumetric or dimensional change in said actuator may range from 0.1-300%. In one embodiment, the volumetric or dimensional change in said actuator may range from 0.1-10%, or in another embodiment, the volumetric or dimensional change in said actuator may range from 0.1-50%, or in another embodiment, the volumetric or dimensional change in said actuator may range from 0.1-100%, or in another embodiment, the volumetric or dimensional change in said actuator may range from 1-100%, or in another embodiment, the volumetric or dimensional change in said actuator may range from 10-100%, or in another embodiment, the volumetric or dimensional change in said actuator may range from 1-200%, or in another embodiment, the volumetric or dimensional change in said actuator may range from 10-200%, or in another embodiment, the volumetric or dimensional change in said actuator may range from 50-200%, or in another embodiment, the volumetric or dimensional change in said actuator may range from 100-200%, or in another embodiment, the volumetric or dimensional change in said actuator may range from 10-300%, or in another embodiment, the volumetric or dimensional change in said actuator may range from 100-300%, or in another embodiment, the volumetric or dimensional change in said actuator may range from 50-300%. In another embodiment, the volumetric or dimensional change in an actuator of this invention may be reversible.

In one embodiment, the volumetric or dimensional change in said actuator may be a function of the current flow induced by an applied voltage. In one embodiment, the electrochemical actuator may be subjected to a varying voltage. In one embodiment, increasing the voltage or current over time may result in a gradual increase in volume. In another embodiment, decreasing voltage or current over time results in a gradual decrease in volume, or in another embodiment, in a gradual increase in volume. In another embodiment, cycles of varied voltage may be desired in order to induce discreet changes in volume.

In another embodiment, an electrode of an actuator of this invention is initially enriched in, and may serve as a source for, the intercalating species. In another embodiment, a negative electrode of an actuator of this invention may serve as a source for the intercalating species. In another embodiment, a positive electrode of an actuator of this invention may serve as a source for the intercalating species.

In another embodiment, the electrode comprises a high elastic modulus compound. In another embodiment, an electrode comprises an ion transition metal oxide. In another embodiment, the ion transition metal oxide is a proton or an alkali metal or an alkaline earth metal. In another embodiment, the alkali metal is lithium. In another embodiment, an electrode comprises: $LiCoO_2$, $LiFePO_4$, $LiNiO_2$, $LiMn_2O_4$, $LiMnO_2$, $LiMnPO_4$, $Li_4Ti_5O_{12}$, and their modified compositions and solid solutions. In another embodiment, an electrode comprises: an oxide compound comprising one or more of titanium oxide, vanadium oxide, tin oxide, antimony oxide, cobalt oxide, nickel oxide or iron oxide. In another embodiment an electrode comprises $TiSi_2$, $MoSi_2$, $WSi_2$, and their modified compositions and solid solutions. In another embodiment an electrode comprises a metal or intermetallic compound. In another embodiment an electrode is lithium or a lithium-metal alloy, which may be crystalline, nanocrystalline, or amorphous. In another embodiment the negative electrode is one or more of aluminum, silver, gold, boron, bismuth, gallium, germanium, indium, lead, antimony, silicon, or tin. In another embodiment, an electrode is carbon in the form of graphite, a carbon fiber structure, a glassy carbon structure, a highly oriented pyrolytic graphite, a disordered carbon structure or a combination thereof. In another embodiment, the intercalating species is an ion. In another embodiment, a proton or an alkali metal or an alkaline earth metal.

In another embodiment, the positive or negative electrode compounds exhibit an elastic modulus ranging between 10-500 GPa. In another embodiment, the compound exhibits an elastic modulus ranging between 50-150 GPa, or in another embodiment, the compound exhibits an elastic modulus ranging between 50-350 GPa, or in another embodiment, the compound exhibits an elastic modulus ranging between 50-450 GPa, or in another embodiment, the compound exhibits an elastic modulus ranging between 10-250 GPa, or in another embodiment, the compound exhibits an elastic modulus ranging between 10-350 GPa, or in another embodiment, the compound exhibits an elastic modulus ranging between 10-450 GPa, or in another embodiment, the compound exhibits an elastic modulus ranging between 25-250 GPa, or in another embodiment, the compound exhibits an elastic modulus ranging between 25-500 GPa, or in another embodiment, the compound exhibits an elastic modulus ranging between 50-500 GPa, or in another embodiment, the compound exhibits an elastic modulus ranging between 50-300 GPa.

In another embodiment, an electrode comprises an ion transition metal oxide. In another embodiment, said ion transition metal oxide is a proton, alkali metal, or alkaline earth metal. In another embodiment, the alkali metal is lithium. In another embodiment, an electrode comprises: $LiCoO_2$, $LiFePO_4$, $LiNiO_2$, $LiMn_2O_4$, $LiMnPO_4$, $Li_4Ti_5O_{12}$, or their modified compositions or solid solutions. In another embodiment, the intercalating species is an ion. In another embodiment, a proton or an alkali metal or an alkaline earth metal.

In one embodiment, the electrochemical actuators of this invention have a negative electrode or positive electrode, or combination thereof, comprising a single crystal or, in another embodiment, a polycrystal having preferred crystallographic orientation of its crystallites. In another embodiment, the electrochemical actuators of this invention have a negative electrode or positive electrode, or combination thereof, comprising a multiplicity of individual crystallites or a powder. In another embodiment, the multiplicity of individual crystallites or a powder, wherein there is a preferred crystallographic orientation of the crystallites or powder particles. In another embodiment, the electrochemical actuators of this invention have a negative electrode or positive electrode, or combination thereof, comprising a multiplicity of particles of an amorphous or disordered material.

In another embodiment, an actuator of this invention further comprises a current collector, which, in another embodiment, comprises a conductive material. In another embodiment, an actuator of this invention further comprises a separator that is electronically insulating, which in one embodiment is porous, or in another embodiment, is rigid. In one embodiment, the porous separator comprises a microporous polymer. In another embodiment, the porous separator comprises a porous electronically insulating ceramic material, which in another embodiment, is alumina, an aluminosilicate, cordierite, or a silicate glass. In another embodiment, the electrodes of an actuator of this invention further comprise a conductive additive.

In another embodiment, an actuator of this invention further comprises an electrolyte. In one embodiment, the electrolyte is a solid electrolyte, or in another embodiment, the electrolyte is a liquid or gel electrolyte. In another embodiment, an actuator of this invention further comprises an external packaging layer, which may be, in one embodiment, an electrochemically-insulating layer, or, in another embodiment, a protective layer or, in another embodiment, a combination thereof.

In one embodiment of the invention, intercalation of the species in an actuator of this invention can occur upon both application of the voltage and cessation thereof. In one embodiment, the applied voltage is in a range of between 0.1-15 V. In another embodiment, the applied voltage is in a range of between 1-5V. In another embodiment, the applied voltage is in a range of between 0.1-5 V. In another embodiment, the applied voltage is in a range of between 1-10 V. In another embodiment, the applied voltage is in a range of between 1-15 V. In another embodiment, the applied voltage is in a range of between 5-15 V. In another embodiment, the applied voltage is in a range of between 5-10 V. In another embodiment, the applied voltage may be varied, which may, in another embodiment, influence the amount of intercalation, and in another embodiment, the degree of volume change.

In another embodiment, the volumetric or dimensional change in an actuator of this invention is in the negative electrode or positive electrode or a combination thereof. In another embodiment, the volumetric or dimensional change is reversible. In another embodiment, intercalation in an actuator of this invention produces high strain.

In one embodiment, the strain produced ranges from 0.1% to 300%, or in another embodiment, the strain produced ranges from 1% to 300%, or in another embodiment, the strain produced ranges from 10% to 300%, or in another embodiment, the strain produced ranges from 0.1% to 200%, or in another embodiment, the strain produced ranges from 10% to 300%, or in another embodiment, the strain produced ranges from 10% to 200%, or in another embodiment, the strain produced ranges from 50% to 300%, or in another embodiment, the strain produced ranges from 50% to 200%.

In another embodiment, a negative electrode, or in another embodiment, a positive electrode, in an actuator of this invention serves as a donor or acceptor or combination thereof of an intercalating species.

The electrochemical actuators of the invention may have many different constructions or designs or architectures. In some embodiments they may be implemented with constructions similar to storage batteries. In one embodiment, in a form similar to a thin-film battery, as schematically depicted in FIG. 37. The actuator 24 may be positioned on a substrate 26. The actuator comprises a negative electrode 28, and a positive electrode 30, which is separated from the negative electrode by an electrolyte layer 32. In one embodiment, the electrolyte is a solid electrolyte, or in another embodiment, a liquid electrolyte. Current collectors for the negative electrode 34 and positive electrode 36 may also be provided. A protective coating 38 may be present as well, which may comprise an insulating material.

In other embodiments, the actuator may have a design that is similar to multilayered storage batteries of either stacked or wound designs or hybrids thereof, including for example designs where a separator film is continuously wound around a series of sequentially stacked discrete electrodes. Such designs are well-known to those skilled in the art of batteries. In one embodiment, the invention provides a Multilayer Stacked Electrochemical Actuator, comprising two or more negative electrode layers, two or more positive electrode layers, and an intercalating species, wherein the Multilayer Stacked Electrochemical Actuator is subjected to an applied voltage, whereby application of the voltage or cessation thereof induces intercalation of the intercalating species in the actuator, resulting in a volumetric or dimensional change of the actuator.

Electrodes may be fabricated for the actuators of the invention by methods similar to those used for storage batteries. In one embodiment, according to this aspect of the invention, the active materials may be cast from powder-based suspensions containing a polymer binder and conductive additive such as, in one embodiment, carbon, then calendered (rolled) under high pressure (for example, several tons per linear inch) to densely compacted layers in which the volume percentage of active material is between 50 and 70%.

In one or more embodiments, a multilayer stacked or wound electrochemical actuator may use a porous polymer separator film similar to those used in storage batteries.

As exemplified herein, multilayer electrochemical actuators of this invention that use a construction similar to those of storage batteries, in particular having electrodes containing polymer binder and liquid or gel electrolyte, having a porous polymer separator that is load bearing during the function of the actuator, or having external packaging that comprises relatively low modulus polymer materials, will, in some embodiments, have a soft construction compared to other actuators of the invention, due to the low modulus materials used and/or excess internal volume in the multilayer actuator. Under mechanical load, such actuators may exhibit, in some embodiments, plastic deformation or viscous creep or viscoelastic deformation. In order to obtain useful mechanical work from such actuators, according to one aspect of the invention, electrochemical actuators of such design may be mechanically pretreated or processed so as to provide greater stiffness, higher actuation energy density, higher actuation strain, decreased creep deformation, lower hysteresis of strain, improved reversibility of actuation performance over multiple actuation cycles, or a combination thereof. In one embodiment, a multilayer actuator is subjected to a hydrostatic pressure to consolidate the actuator, remove free volume, and improve performance. In another embodiment, a uniaxial stress is applied to the multilayer actuator normal to the layers to remove excess internal volume, to consolidate the stack, increase the stiffness of the actuator, or to remove creep deformation. Such applied stresses of hydrostatic or nonhydrostatic nature cannot typically be increased without limit, as internal shorting of the electrode layers or current collectors or tabs may occur. Even at stresses not sufficient to cause internal short circuits, microporous polymer separators or particle-based electrodes may be consolidated to an extent that inhibits the function of the actuator. However, surprisingly it was found as exemplified herein, that a very high preconditioning pressure may be applied to a multistack actuator to improve its performance without causing internal failure.

Thus in some embodiments, a uniaxial or hydrostatic pressure is used for preconditioning of an assembled laminated actuator. In some embodiments, the applied pressure may be as high as 10,000 psi (69 MPa), in other embodiments as high as 20,000 psi (138 MPa) or as high as 30,000 psi (207 MPa), or even as high as 45,000 psi (310 MPa), without causing internal failure and improving the performance of the actuator thereafter.

In other embodiments of laminated electrochemical actuators incorporating a microporous polymer separator layer between active material electrodes, high mechanical energy densities and high strains are obtained under substantial applied stresses. As illustrated by the Examples, in some embodiments such multilayer stacked actuators are used to provide actuation strains from 0.5% to 5% under stresses from 0.1 MPa to 50 MPa and provide actuation energy densities from 1 to 400 $kJ/m^3$. For one exemplary actuator and conditions of operation, 4% strain is obtained while actuating under 1 MPa stress, providing 40 $kJ/m^3$ energy density, and 2.5% strain is obtained while actuating under 10 MPa stress, providing 250 $kJ/m^3$ energy density. In other Examples and embodiments lower strains and associated stresses and energy densities are obtained that provide the ability to conduct useful mechanical work.

In some embodiments an actuator of the invention provides high actuation speed. In some embodiments, an actuator of similar construction to a high charge and discharge rate battery is provided, in which substantially complete charging or discharging of the cell is possible in less than 6 minutes (10 C rate of charging or discharging), or less than 4 min (15 C rate), or less than 3 min (20 C rate). In other such embodiments, ion storage (faradaic) electrode materials are known that are capable of substantially complete charge and discharge in as short as 18 sec (200 C rate), allowing a comparable rate of actuation in an electrochemical actuator using such materials. In some embodiments, the rate of actuation is increased by charging or discharging over times that permit only a portion of the total or reversible charge capacity of the actuator to be reached.

As illustrated by the Examples, in some embodiments greater than 1.5% under an applied stress greater than 0.5 MPa, greater than 1.5% as high as 4% under stresses as high as 5 MPa, or as high as 2.5% under stresses as high as 20 MPa, providing for actuation energy densities as high as 400 $kJ/m^3$. In some embodiments, uniaxial stresses as high as 5 MPa, 10 MPa or even 20 MPa may be applied while conducting actuation without significant loss of actuation energy density or actuation strain or rate of actuation.

In other embodiments, when designing some of the electrochemical actuators of the invention, use of materials including separators that have a high elastic modulus, and are capable of withstanding high applied loads without loss of function are employed. Thus the Multilayer Stacked Electrochemical Actuator 40 may be implemented, in one embodiment, as schematically depicted in FIG. 38. According to this aspect, in one embodiment, the active layer is the positive electrode layer 42, which comprises a thick layer, which in one embodiment may also comprise a binder. An electronically-insulating, separator layer 44 may, in another embodiment, be constructed of a high stiffness porous ceramic, such as a silicate based ceramic, or in this case a porous $Al_2O_3$, as illustrated in FIG. 38. The counter-electrode 46 may be embedded in the porous separator so that it is not load-bearing, in this case, Li embedded in the porous $Al_2O_3$. Liquid electrolyte may be infiltrated in the actuator 48. In FIG. 38, 44 is a porous $Al_2O_3$ structural separator, 46 is Li (non load-bearing) in porous $Al_2O_3$ insulator, 48 is liquid electrolyte infiltrated, 52 is a power source, and 54 is a 1 $cm^3$ stacked actuator.

In another embodiment, a high stiffness separator comprises a layer of electronically insulating particles, such as particles of an insulating ceramic material. Said layer has greater mechanical flexibility while maintaining porosity under high actuation loads. In one embodiment the porous particulate separator is cast as a particulate or slurry layer on the mating surfaces of one or both electrodes prior to assembly of the layers, using methods well-known to those skilled in the art of ceramic processing or coating technology such as spray deposition, doctor blade coating, screen printing, web coating, comma-reverse coating, or slot-die coating. In one embodiment the particulate separator comprises particles of glass, a silicate ceramic, aluminum oxide, aluminosilicates, or other mixed-metal oxides or nitrides or carbides that are electronically insulating.

In another embodiment, the counter electrode 46 may be replaced by an intercalation compound-embedded within a rigid separator, or in another embodiment, by a layer that is mechanically functional. Such substitutions may be utilized in a stacked actuator design, 50. The power source 52 may be connected to aluminum 38, and copper 52 current collectors, respectively. A compact, unitized multilayer actuator 54, such as that demonstrated in this embodiment, may be distributed in adaptive structures in a variety of configurations to impart desired degrees of freedom. In one embodiment, a device that can be prepared in a reduced-volume state (i.e., by charging or discharging), then inserted into a structure can be actuated in expansion. Such unitized actuators could also be easily replaced, simplifying maintenance of an adaptive structure.

The energy density of electrochemical actuators (ECAs) may be high, in another embodiment, and the choice of materials will influence the resulting energy densities obtained. The resulting volume changes may range, in one embodiment, from 0.1 to 50%, or in another embodiment, from 0.1 to 1%, or in another embodiment, from 1 to 5%, or in another embodiment, from 5 to 8%, or in another embodiment, from 5 to 10%, or in another embodiment, from 8 to 10%, or in another embodiment, from 10 to 15%, or in another embodiment, from 15 to 20%, or in another embodiment, from 5 to 15%, or in another embodiment, from 5 to 20%, or in another embodiment, from 20 to 25%, or in another embodiment, from 10 to 20%, or in another embodiment, from 10 to 25%, or in another embodiment, from 20 to 35%, or in another embodiment, from 25 to 35%, or in another embodiment, from 15 to 35%, or in another embodiment, from 25 to 40%, or in another embodiment, from 25 to 50%, or in another embodiment, from 35 to 40%, or in another embodiment, from 35 to 50%.

The electrochemical actuators of this invention, allow for mechanical energy production. In one embodiment, any electrochemical actuator of this invention, including, for example a Multilayer Stacked Actuator of this invention, allows for mechanical energy production, and can operate under stress conditions. In one embodiment, the volumetric or dimensional change occurs against an applied stress such that mechanical work is conducted, where the mechanical work divided by the initial volume of the actuator (mechanical energy density) exceeds (kJ/m3) values of between 0.1-5000 kJ/m$^3$. In one embodiment, the mechanical energy density exceeds 1 kJ/m$^3$, or in another embodiment, the mechanical energy density exceeds 10 kJ/m$^3$, or in another embodiment, the mechanical energy density exceeds 50 kJ/m$^3$, or in another embodiment, the mechanical energy density exceeds 100 kJ/m$^3$, or in another embodiment, the mechanical energy density exceeds 200 kJ/m$^3$, or in another embodiment, the mechanical energy density exceeds 300 kJ/m$^3$, or in another embodiment, the mechanical energy density exceeds 500 kJ/m$^3$, or in another embodiment, the mechanical energy density exceeds 1000 kJ/m$^3$, or in another embodiment, the mechanical energy density exceeds 1250 kJ/m$^3$, or in another embodiment, the mechanical energy density exceeds 1500 kJ/m$^3$, or in another embodiment, the mechanical energy density exceeds 1750 kJ/m$^3$, or in another embodiment, the mechanical energy density exceeds 2000 kJ/m$^3$, or in another embodiment, the mechanical energy density exceeds 2250 kJ/m$^3$, or in another embodiment, the mechanical energy density exceeds 2500 kJ/m$^3$, or in another embodiment, the mechanical energy density exceeds 2750 kJ/m$^3$, or in another embodiment, the mechanical energy density exceeds 3000 kJ/m$^3$, or in another embodiment, the mechanical energy density exceeds 3250 kJ/m$^3$, or in another embodiment, the mechanical energy density exceeds 3500 kJ/m$^3$, or in another embodiment, the mechanical energy density exceeds 3750 kJ/m$^3$, or in another embodiment, the mechanical energy density exceeds 4000 kJ/m$^3$, or in another embodiment, the mechanical energy density exceeds 4500 kJ/m$^3$, or in another embodiment, the mechanical energy density exceeds 5000 kJ/m$^3$, or any range in between.

In another embodiment, the electrochemical actuators of this invention have a volumetric or dimensional change occurring against an applied stress, such that mechanical work is conducted, wherein the mechanical work divided by the mass of the actuator (specific mechanical energy) exceeds between 0.04-2,000 J/g. In one embodiment, the specific mechanical energy exceeds 0.4 J/kg, or in another embodiment, the specific mechanical energy exceeds 1 J/kg, or in another embodiment, the specific mechanical energy exceeds 2 J/kg, or in another embodiment, the specific mechanical energy exceeds 3 J/kg, or in another embodiment, the specific mechanical energy exceeds 4 J/kg, or in another embodiment, the specific mechanical energy exceeds 5 J/kg, or in another embodiment, the specific mechanical energy exceeds 10 J/kg, or in another embodiment, the specific mechanical energy exceeds 20 J/kg, or in another embodiment, the specific mechanical energy exceeds 40 J/kg, or in another embodiment, the specific mechanical energy exceeds 80 J/kg, or in another embodiment, the specific mechanical energy exceeds 100 J/kg, or in another embodiment, the specific mechanical energy exceeds 200 J/kg, or in another embodiment, the specific mechanical energy exceeds 300 J/kg, or in another embodiment, the specific mechanical energy exceeds 400 J/kg, or in another embodiment, the specific mechanical energy exceeds 500 J/kg, or in another embodiment, the specific mechanical energy exceeds 750 J/kg, or in another embodiment, the specific mechanical energy exceeds 1000 J/kg, or in another embodiment, the specific mechanical energy exceeds 1200 J/kg, or in another embodiment, the specific mechanical energy exceeds 1350 J/kg, or in another embodiment, the specific mechanical energy exceeds 1500 J/kg, or in another embodiment, the specific mechanical energy exceeds 1600 J/kg, or in another embodiment, the specific mechanical energy exceeds 1800 J/kg, or in another embodiment, the specific mechanical energy exceeds 2000 J/kg.

The actuators of the invention have in some aspects designs or architectures providing for improved load bearing, or for load bearing by a single active material of the cell. Such designs can also avoid having a porous separator under load as in the laminated designs. Thus in one embodiment, an actuator of this invention may have an electrode compound or composite electrode providing actuation forming a multiplicity of load-bearing members in the primary direction or directions of actuation, wherein each member is exposed to an intercalation compound in one or more directions from the primary direction or directions of actuation. In another embodiment, the members may be formed as a pattern of posts or bars or ridges. In another embodiment, the actuator design comprises an array of posts wherein only one active material is load-bearing. In another embodiment, the actuator design is such that when one electrode performs actuation, the other electrode is buried in a stiff porous separator, such that it (the latter) is not load-bearing.

In another embodiment, the lateral dimensions of the members may have at least one half-thickness that is sufficiently small to allow substantial intercalation of the intercalation compound, during a desired time period of actuation. In another embodiment, the intercalation compound source is placed adjacent to a pattern of members or, in another embodiment, between members allowing ion insertion from a direction that is not the primary direction or directions of actuation.

In one embodiment, an electrochemical actuator of this invention will have a high load-bearing and stress-generating capacity as well as a high rate of actuation. The actuation compounds of the invention as well as composite electrodes incorporating such actuation compounds are capable of supporting substantial stress in tensile loading, in one embodiment, and in another embodiment, even greater stress in compressive loading.

For example, a polycrystalline graphite material may have a compressive failure stress of 100-200 MPa, a highly oriented or single crystal graphite may have compressive failure stress in the c-axis direction (normal to the graphene planes) in excess of 500 MPa or even in excess of 1 GPa, and a densely sintered metal oxide intercalation compound may have compressive failure strength in excess of 400 MPa or even in excess of 1 GPa. In one embodiment, certain applications may require ion insertion to occur from a direction other than the highly loaded directions. For example, in the fiber actuators described herein, in one embodiment, load bearing is primarily along the axis of the fibers, while ion insertion occurs in the transverse direction.

According to this aspect of the invention, and in one embodiment, actuators are designed to allow ion insertion from a transversely or laterally placed ion source into load-bearing members of an actuator that are supporting compressive or tensile load. The lateral or transverse dimensions of the load-bearing members may be selected on the basis of ion and electron transport kinetics well-known to those skilled in the art of electrochemical materials and devices.

In one embodiment, where lithium intercalation compounds are used for electrochemical actuation, the time necessary to lithiate or delithiate a certain cross-section of material to a desired ion concentration and corresponding strain may be readily determined knowing the rate of ion transport into the material. Such determinations may be readily tested experimentally or made theoretically using tabulated or estimated values of properties such as ion diffusion coefficients, ionic and electronic conductivities, and surface reaction rate coefficients.

Extremely high stresses and energy densities are achievable using a suitably designed actuator and actuating material, as will be understood by one skilled in the art, and as exemplified herein. In one embodiment, an oriented graphite material is used as a load bearing actuating material, with the c-axis of the graphite oriented substantially in the direction of desired actuation. In one embodiment the graphite has a multiplicity of individual elements together bearing the load, each of which has a smallest cross-sectional width that is 200 micrometers or less, allowing substantial ion intercalation over a useful actuation time. As shown in the Examples, in one such embodiments an actuation strain of as high as 1.2% is obtained under a stress as high as 100 MPa (one metric ton per $cm^2$), providing an energy density of 1200 $kJ/m^3$, or 4.3% is obtained under a stress of 30 MPa, providing an energy density of 1290 $kJ/m^3$. While these Examples demonstrate the capabilities of the present invention for extremely high actuation energy density, it is understood that useful mechanical work can be performed according to the invention while employing much lower strains and actuation energies than the ultimate capabilities of a particular actuator.

In another embodiment, the actuator design is such that one or, in another embodiment, both of the materials forming the electrochemical couple, namely the positive and negative electrode materials, may be load bearing material. In some embodiments this is desirable because one of the materials may expand when the cell is charged or discharged while the other contracts. By having the load borne by one active material, a larger net strain and mechanical energy density may be obtained than in the case where the two materials are joined in series in the direction of loading, and the net strain includes that in both materials. By placing the two active materials in a parallel arrangement between the load-bearing surface of the actuator rather than in series, in another embodiment, it is also possible to design the actuator such that both materials contribute to mechanical actuation, but in different proportions or even in different directions (expansion versus contraction) as the state of charge varies.

In some applications of electrochemical actuators it is advantageous to provide for rotary motion. In one embodiment, the invention provides a Rotational Electrochemical Actuator, comprising rolled layers of an negative electrode, a positive electrode and an intercalating species, wherein the rolled layers assume a laminate configuration, and wherein the Rotational Electrochemical Actuator is subjected to an applied voltage, whereby application of the voltage produces intercalation of the intercalating species in the actuator, resulting in a volumetric or dimensional change of the actuator such that the rolled laminate configuration winds or unwinds, and torque is produced.

Figure 39:
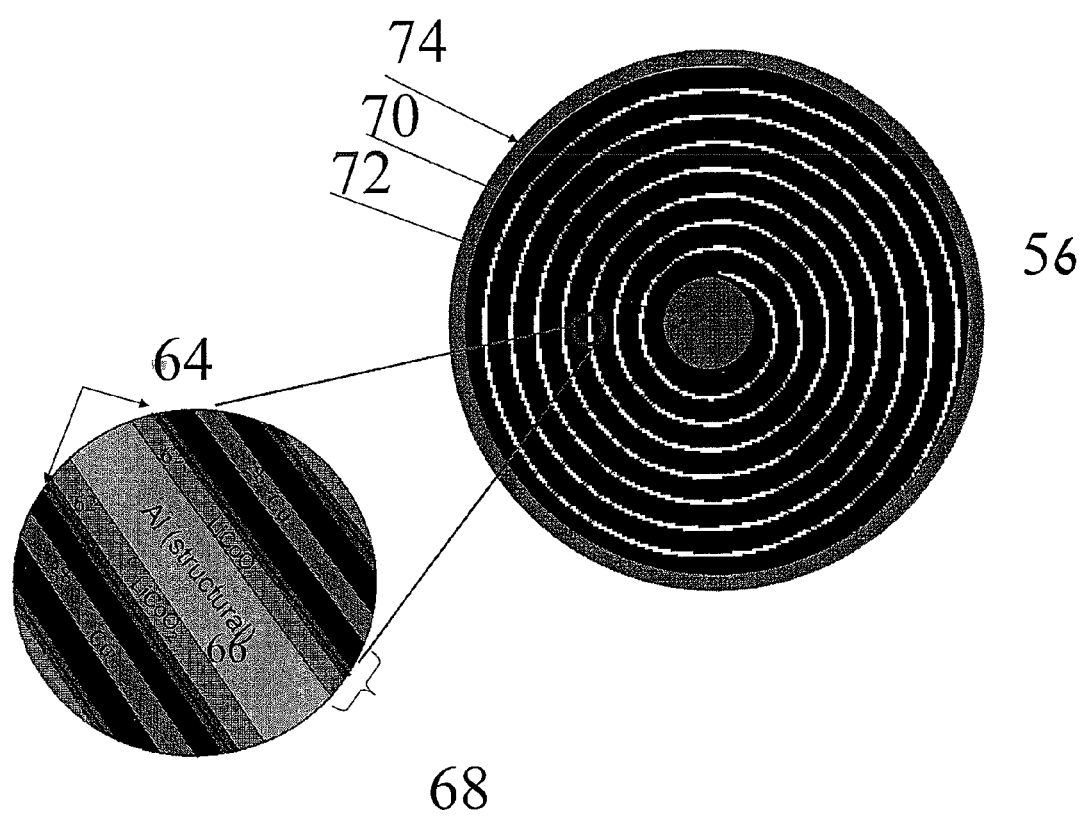
FIG. 39 schematically depicts a Rotational Electrochemical Actuator 56, comprising laminates of current collectors 58, negative electrodes 60, positive electrodes 62, and a separator 64. A structural aluminum layer 66 is added and the Rotational Electrochemical Actuator is infiltrated with electrolyte 68. The actuator may be assembled as a spiral 70, around an inner mandrel 72, and covered by an outer shell 74.

The Rotational Electrochemical Actuator 56 would use, in one embodiment, a design similar to that of the Multilayer Stacked Electrochemical Actuator, comprising laminates of current collectors 58, which, in one embodiment, comprise aluminum and copper, negative electrodes 60, which in another embodiment, comprise carbon, positive electrodes 62, which in another embodiment comprise an oxide, and a separator 64, which in another embodiment, may comprise a polymer film (FIG. 39). In another embodiment, a structural aluminum layer 66 is added, or in another embodiment, the aluminum foil current collector is replaced with structural aluminum. In another embodiment, the copper layer may be structural as well. In another embodiment, the Rotational Electrochemical Actuator is infiltrated with electrolyte 68. The actuator may be assembled as a spiral 70, around an inner mandrel 72, and covered by an outer shell 74. When the system is charged, a significant volume change (~5%) would occur, causing the rolled actuator to unwind. The amount of rotary motion induced would be proportional to the product of the volume change and the number of turns in the spiral. As a result, a spiral actuator with, say, 20 layers, would be capable of very high torques, and significant rotary motion.

In one embodiment, Rotational Electrochemical Actuator winds, or unwinds, in response to application of voltage, or cessation thereof. In another embodiment, when the rolled laminate configuration winds or unwinds, rotary motion is produced. In another embodiment, the rotary motion ranges from 1-360°. In another embodiment, the rotary motion produces 1 or more rotations, which, in another embodiment, are complete or incomplete. In another embodiment, the rotation is in a clockwise direction or counter clockwise direction, or a combination thereof.

It is possible that shear strains may be produced in the lamination, as a result of the construction of the Rotational Electrochemical Actuator. In one embodiment, shear strain is mitigated by using a thick polymer separation layer to allow shearing motions between structural layers. In one embodiment, selection of the polymer layer includes that of a low shear modulus in order to allow the shear, but high bulk modulus to ensure that the actuation energy in not wasted in the compression of the polymer layer. In another embodiment, the spiral may be constructed with an additional elastomeric layer to achieve this result.

In some applications of the electrochemical actuators of the invention, it is advantageous to provide for actuation in one or more directions within a plane, or to have the actuator exert a tensile stress. In one embodiment, the invention provides a Continuous Fiber Electrochemical Actuator, comprising a fibrous negative electrode, a positive electrode and an intercalating species wherein the Continuous Fiber Electrochemical Actuator is subjected to an applied voltage, whereby application of the voltage or its cessation induces intercalation of the intercalating species in the actuator, resulting in a volumetric or dimensional change of the actuator, such that said fibrous negative electrode undergoes elongation. By "continuous fiber" it is understood that the fibers comprising the active material have an aspect ratio of at least 10 to 1 and preferably greater than 20 to 1, and are load bearing along the axis of the fibers. In one embodiment a majority of the fibers continuously span an actuator device comprising at least a positive electrode and negative electrode and electrolyte.

Figure 40:
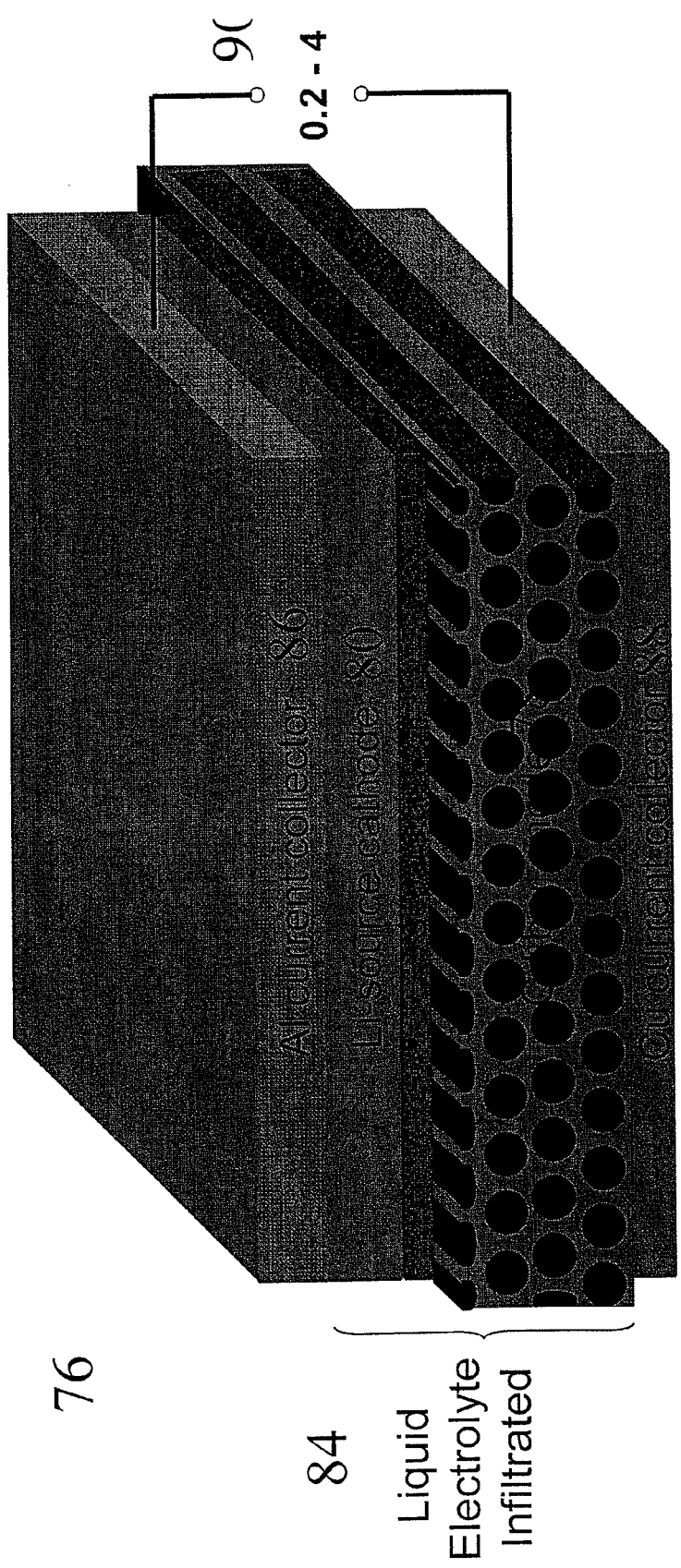
FIG. 40 schematically depicts an embodiment of a Continuous Fiber Electrochemical Actuator 76 comprised of a fiber composite system, in which the active fibers form the negative electrode 78. The fiber negative electrode is separated from the positive electrode 80, by a polymer or inorganic separator 82, and a liquid or solid electrolyte layer 84. Current collectors 86 and 88, respectively, are connected to the power source 90 in the actuator.

In one embodiment, the Continuous Fiber Electrochemical Actuator 76 is comprised of a fiber composite system, similar to graphite fiber composites, in which the active fibers form the negative electrode 78, which, in one embodiment are carbon fibers, and undergo significant elongation under intercalation. (FIG. 40). In one embodiment, disordered carbon fibers are utilized, which, in another embodiment, expand isotropically upon lithium intercalation. The fiber negative electrode may be separated from the positive electrode 80, which in one embodiment, is a lithium-source positive electrode, by a polymer or inorganic separator 82, and a liquid or solid electrolyte layer 84. Current collectors 86 and 88, respectively, may be connected to the power source 90 in the actuator.

In one embodiment, the carbon fibers are the primary structural layer, and are anchored at each end to form a completed actuator. In one embodiment, the Continuous Fiber Electrochemical Actuator can actuate in tension as well as in compression.

Figure 41:
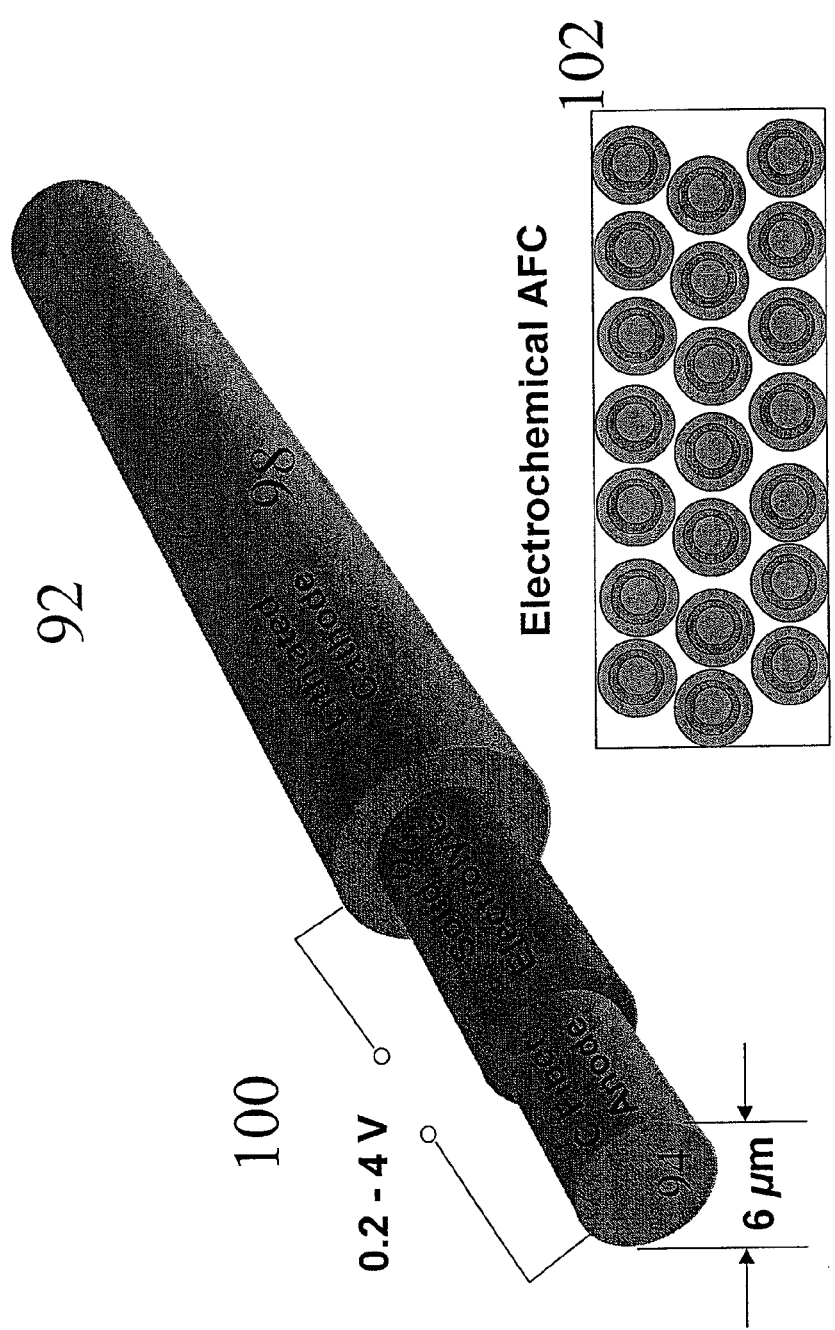
FIG. 41 schematically represents another embodiment of a Continuous Fiber Electrochemical Actuator 92 comprised of individual negative electrode fibers 94, coated with a ceramic or polymer electrolyte 96 and a lithiated positive electrode 98, connected to a power supply 100. These fibers can form an active fiber composite 102.

In another embodiment, the actuator 92 is comprised of individual negative electrode fibers 94, such as carbon, are coated with a ceramic or polymer electrolyte 96 and a lithiated positive electrode 98, connected to a power supply 100 as shown in FIG. 41. These fibers could then be used to form, in one embodiment, an active fiber composite 102, which, in another embodiment, uses a conventional matrix (such as epoxy), found, in another embodiment, in graphite-reinforced plastic composites. Masking the ends of the fibers during the coating process would produce step layers, as shown in the figure, allows, in another embodiment, the electrical connections to be applied to the ends of the fibers.

In another embodiment, the Continuous Fiber Electrochemical Actuator is comprised of multiple coated fibers, which are utilized to form a fiber composite. In another embodiment, the composite further comprises a matrix, which, in another embodiment, is a polymer. In another embodiment, the composite of the Continuous Fiber Electrochemical Actuator comprises fiber ends, which are uncoated. In another embodiment, the uncoated ends of the fibers enable electrical connections to be applied to the ends of the fibers.

In another embodiment, the Continuous Fiber Electrochemical Actuator primarily actuates in tension. For example, graphite can be lithiated up to a composition $LiC_6$ with an accompanying volume expansion of 13.1%, and disordered (isotropic) carbons can be lithiated to still higher concentrations and expansions. A carbon fiber can, according to this aspect of the invention, exhibit axial displacement of about 5%, while possessing a high elastic modulus (>500 GPa for commercially available disordered-carbon fibers).

In another embodiment, the Continuous Fiber Electrochemical Actuator comprises multiple layers, which, in another embodiment are assembled in parallel or in perpendicular orientation. In another embodiment, the perpendicular orientation allows positive and negative shearing actuation of the actuator, which, in another embodiment, produces torque, or, in another embodiment, produces rotation. In another embodiment, the perpendicular orientation allows for charge transfer between layers when low voltage is applied.

In another embodiment, the Continuous Fiber Electrochemical Actuator comprising multiple layers, wherein a layer of carbon fibers is added with orientation perpendicular to a first layer. According to this aspect, both positive and negative shearing actuation results, producing an actuator capable of twisting an object, such as, in one embodiment, a wing or in another embodiment a blade in both positive and negative directions. In another embodiment, such an orientation reduces the total power requirements, by allowing charge to be transferred back and forth between layers at a low voltage. In another embodiment, such an actuation system might be capable of 3% elongation in the fiber direction. In another embodiment, the Continuous Fiber Electrochemical Actuator can be constructed as a pack, similar in form factor to active fiber composite (AFC) packs based on piezoelectric fibers, which could be used to actuate a blade or wing, producing significant actuated twist capability (See FIG. 41).

In one embodiment, the invention comprises actuators that can deamplify strain, and thereby amplify stress. In one embodiment, depicted in FIG. 30, a woven actuator is provided in which a transverse (or through-thickness) displacement of one or more electrochemical actuators is converted into a longitudinal or in-plane displacement with a strain deamplification factor that is determined by the respective dimensions of the actuator. The design features, construction, and testing of this actuator type is exemplified in Example 9. Such actuators are useful in numerous applications including shape-morphing or beam-bending applications where a relatively thin actuator, for example one sufficiently thin to use in the skin or shell of a fuselage, rotor, wing, watercraft hull, or land vehicle body is desired.

In one embodiment, the woven structure comprises metallic wires, or in another embodiment, a composite material, or a combination thereof. In one embodiment, the composite material comprises graphite fibers, or in another embodiment, fiberglass fibers in a matrix. In one embodiment, "matrix" refers to any matrix known in the art, and may comprise, for example, an epoxy, or in another embodiment, two-part epoxies, temperature cured epoxies, thermoplastics, etc. In one embodiment, a rubberizing agent (see Crawley, E. F. and Ducharme, E. H. ASME, International Gas Turbine Conference and Exhibition, 32nd, Anaheim, Calif.; UNITED STATES; 31 May-4 Jun. 1987. 11 pp. 1987) may be used to lower the matrix modulus, to increase the flexibility of the mechanism.

In another embodiment, the amplifying mechanism is a composite structure formed not by interweaving fibers, but by fibers running roughly parallel on the top and bottom sides of one of more electrochemical actuators, with the fibers on opposite sides stitched or sewn together on the left and right of each EC actuator.

The high strain of the present electrochemical actuators notwithstanding, many applications benefit from an amplification of strain, which for energy conservation necessitates a deamplification of stress. In another embodiment, the invention comprises actuators that amplify strain. In one specific embodiment, the actuation strain of an electrochemical actuator element or series of actuator elements, here a stack of multilayer actuator devices, is amplified by an assembly incorporating a lever and a fulcrum that also serves as a flexure. In one embodiment the housing for the actuating elements or the lever and fulcrum are formed from one piece of material, for example from an electro-discharge machined piece of a metal or from a formed single body of a polymer or reinforced polymer composite, providing for a compact and economical design. Such actuators may be used singly or multiply as positioners, latches, lifters, or to change the shape of a structure. While actuators having a lever and fulcrum powered by piezoelectric elements are known, for example the commercial products manufactured by Physik Instrumente, the present actuators have a much larger range of motion as shown in Example 8.

In another embodiment, this invention provides a method of actuation, comprising the step of applying a voltage to an actuator of this invention, comprising an negative electrode, a positive electrode and an intercalating species, wherein applying voltage causes current flow inducing intercalation of the intercalating species in the actuator, whereby intercalation induces a volumetric or dimensional change of an actuator of this invention. The amount of actuation is in one embodiment controlled by controlling the voltage, and in another embodiment by controlling the total amount of current flowing into the device.

It is to be understood that all the embodiments for the actuators of this invention listed herein, are applicable to methods of actuation using the same, and are to be considered as part of this invention.

In another embodiment, this invention provides a method of producing torque or rotary motion in a structure or an apparatus comprising a Rotational Electrochemical Actuator, comprising the step of applying electric current to a Rotational Electrochemical Actuator comprising an negative electrode, a positive electrode and an intercalating species, wherein applying current induces intercalation of the intercalating species in the actuator resulting in a volumetric or dimensional change of the actuator such that said rolled laminate layers unwind, and torque or rotary motion is produced.

In another embodiment, this invention provides a structure or apparatus comprising an actuator of this invention. In one embodiment, the structure or apparatus is adaptive. In another embodiment, the actuator is used as an element to apply stress at a site on the structure or apparatus that is distal to the actuator. In another embodiment, the structure or apparatus amplifies the volumetric or dimensional change induced by the actuator.

Figure 42:
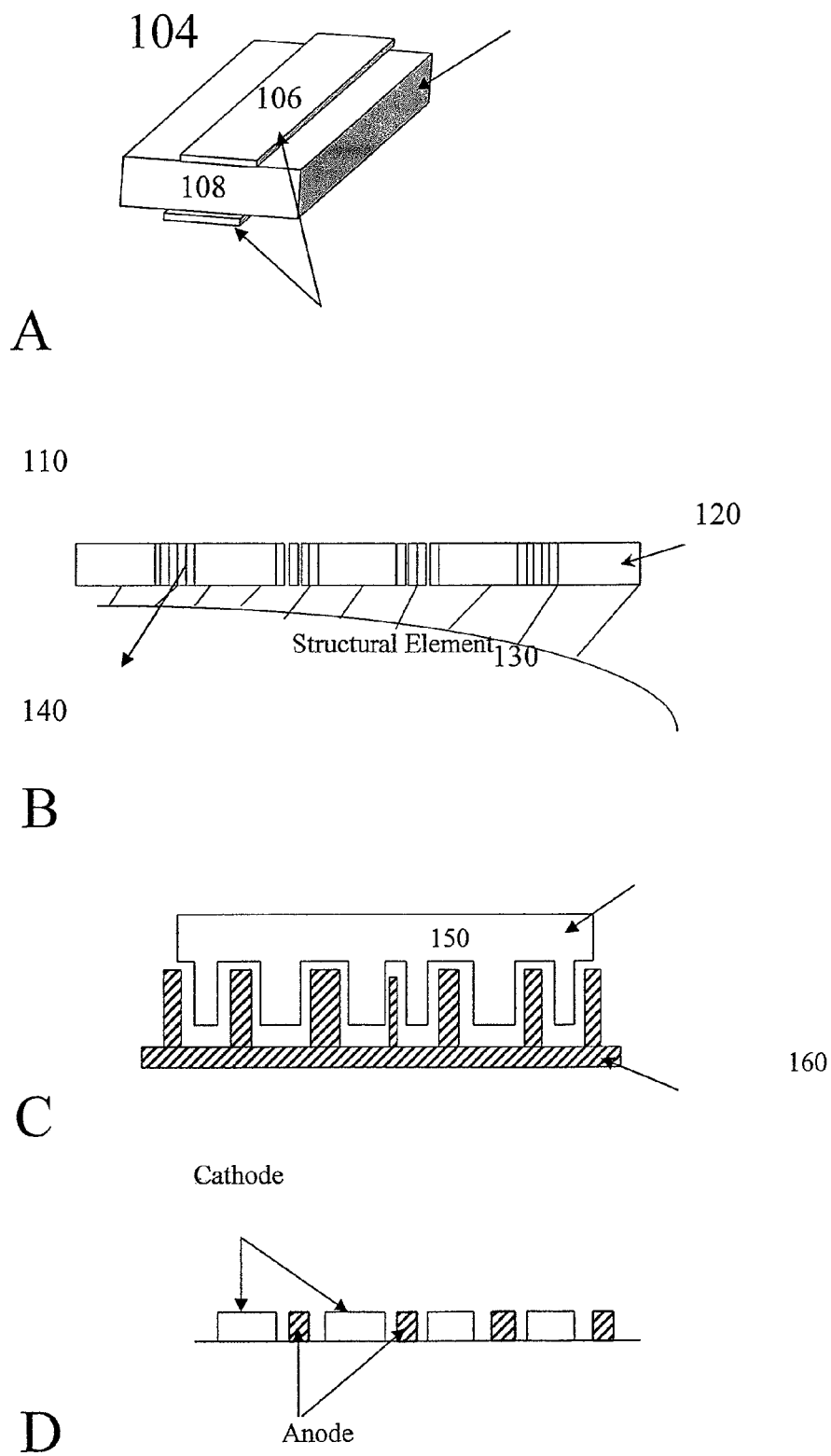
FIG. 42 depicts an embodiment of an adaptive structure or apparatus 104 comprising an electrochemical actuator of this invention 106, mounted on its surface 108 (FIG. 10A). In one embodiment, the integration of an actuator within a structure or apparatus 110 may be as schematically depicted in FIG. 10B. The electrochemical actuator, or in another embodiment, actuators 140, may be in one embodiment, thin film, or in another embodiment, thick film laminated electrochemical actuators, which may be oriented normally to the surface, and may be positioned within a stiff surface layer 120, on a substrate 130. Changing the aspect ratio of the expanding and contracting elements of the actuators and strategic positioning may produce greater deformation in the surface plane, in another embodiment, as schematically diagrammed in FIG. 10C, via the positioning of the positive electrode 150 and the negative electrode 160, in another embodiment, which may be evident when viewed looking down the plane of the surface, or in cross-section (10D).

In one embodiment the adaptive structure or apparatus 104 comprises an electrochemical actuator of this invention 106, mounted on its surface 108 (FIG. 42A).

In one embodiment, a structure such as a beam or plate or any structure of a size ranging from the MEMS scale to, in another embodiment, a large scale structure can be actuated with a surface mounted electrochemical actuator of this invention. In one embodiment, the electrochemical actuators of this invention are designed to produce in-plane deformation or actuation stress. In one embodiment, the deformation produced via planar thin film electrochemical actuators of this invention is normal to the plane of the surface where the actuator is positioned. In one embodiment, deformation in such an orientation is least constrained and construction of the actuator or, in another embodiment, its integration within a structure or apparatus is so designed as to produce a high stress or deformation in the plane of the surface.

In one embodiment, the actuators of this invention may produce blocked stresses of between 0.1-1000 MPa. In another embodiment, the actuators of this invention may produce blocked stresses of between 0.1-10 Mpa, or, in another embodiment, actuators of this invention may produce blocked stresses of between 0.1-100 Mpa, or, in another embodiment, actuators of this invention may produce blocked stresses of between 1-10 MPa, or, in another embodiment, actuators of this invention may produce blocked stresses of between 1-100 MPa, or, in another embodiment, actuators of this invention may produce blocked stresses of between 1-1000 MPa, or, in another embodiment, actuators of this invention may produce blocked stresses of between 10-100 MPa, or, in another embodiment, actuators of this invention may produce blocked stresses of between 10-1000 MPa, or, in another embodiment, actuators of this invention may produce blocked stresses of between 100-1000 MPa.

In one embodiment, multiple actuators are distributed in an apparatus. In one embodiment, the distributed electrochemical actuator technology of this invention is capable of imparting multiple degrees of freedom to active structures comprising the actuators.

In one embodiment, integration of an actuator within a structure or apparatus 110 is as schematically depicted in FIG. 42B. The electrochemical actuator, or in another embodiment, actuators 140, are in one embodiment, thin film, or in another embodiment, thick film laminated electrochemical actuators, which are oriented normally to the surface, and are positioned within a stiff surface layer 120, on a substrate 130.

The positioning and design of the actuators may result in a greater deformation produced in the surface plane, via, in one embodiment, changing the aspect ratio of the expanding and contracting elements (FIG. 42C), the positive electrode 150 and negative electrode 160. Such a construction as depicted in the figure produces a large, in-plane, net deformation upon charging/discharging of the actuator, evident when viewed looking down the plane of the surface (C), or in cross-section (D).

In another embodiment, the laminated electrochemical actuator itself undergo deformation. In one embodiment, the deformation is a bending of the actuator itself, as a result of expansion of one electrode concurrent with contraction of another, during the same charge or discharge cycle. For example, and in one embodiment, an negative electrode comprising carbon will expand, as carbon expands when lithiated and a positive electrode comprising $LiCoO_2$ expands when delithiated, resulting in a partial compensation of any deformation of the actuator comprising the two.

Figure 43:
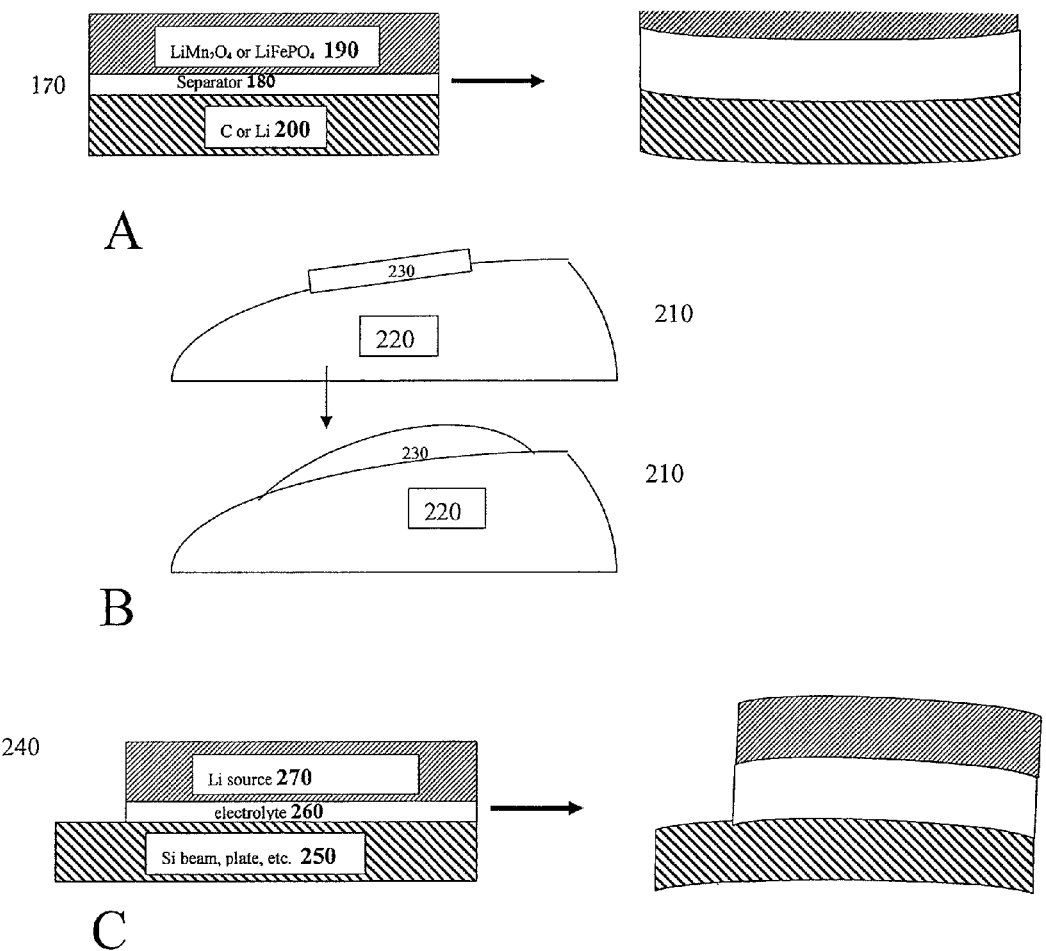
FIG. 43A schematically depicts one embodiment of an actuator 170 comprising a carbon or lithium negative electrode 200, which expands when lithiated, and a $LiMn_2O_4$ or $LiFePO_4$ positive electrode 190, which contracts when de-lithiated, which if bonded to a separator 180, will produce a marked bend in the entire structure. One embodiment of such a use would be in an airfoil 210 where the actuator is positioned, such that the negative electrode is facing outward 230, from the surface 220, such that following actuation, a greater curvature outward occurs (43B).

In another embodiment, an actuator 170 comprising a carbon or lithium negative electrode 200, which expands when lithiated, and a $LiMn_2O_4$ or $LiFePO_4$ positive electrode 190, which contracts when de-lithiated, if bonded to a separator 180, will produce a marked bend in the entire structure (FIG. 43A).

In another embodiment, a laminated electrochemical actuator of thin film or thick film design of this invention, wherein a volume change in both negative electrode and positive electrode is being utilized simultaneously, will position electrodes yielding maximum expansion, in one embodiment, the negative electrode, facing outward from a surface that is intended to be deformed from lesser to greater convexity. In one embodiment, an airfoil 210 would be designed to comprise actuators assuming such a configuration. According to this aspect, the actuator would be positioned, such that the negative electrode is facing outward 230, from the surface of the apparatus 220, such that following actuation, a greater curvature outward occurs. In one embodiment, such a configuration enables the device to be discharged in the relaxed state.

In another embodiment, electrochemical actuation may be performed using a supporting material such as a substrate as the electro-active material itself (FIG. 43C). According to this aspect of the invention, and in one embodiment, the structure comprising the actuator 240, comprises a silicon wafer 250 that can be lithiated from the surface 270, via the lithium metal or lithiated oxide electrode as the lithium source, in order to induce volumetric expansion hence bending. In one embodiment, other metalloids, or, in another embodiment, metals (e.g. Al which lithiates to LiAl) or, in another embodiment, oxides may be used similarly.

Figure 44:
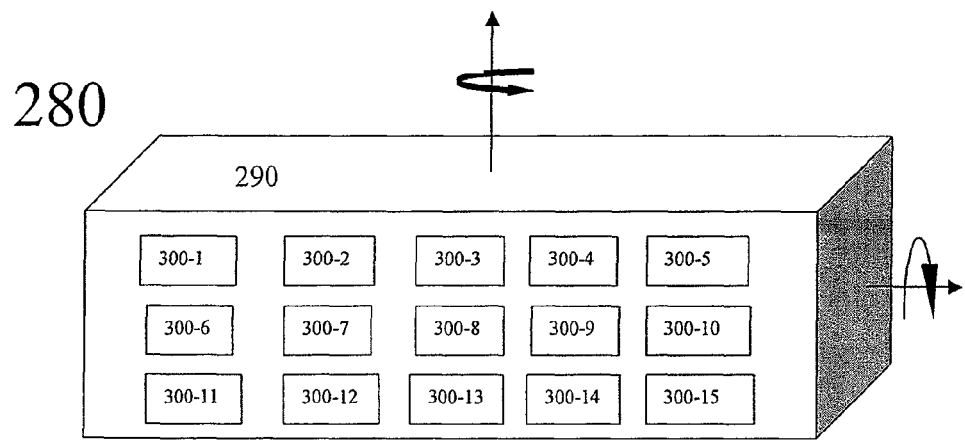
FIG. 44C schematically depicts a structure 240 comprising a silicon wafer 250 that can be lithiated from the surface 260, via the lithium metal or lithiated oxide electrode as the lithium source, in order to induce volumetric expansion hence bending.
FIG. 44A schematically depicts one embodiment of a structure or apparatus 280 made to bend around more than one axial direction, by having an array of electrochemical actuators 300 on the surface of the structure or apparatus 290.
FIG. 44B depicts an example of how actuators may be utilized to unfurl a wing.
Figure 44:
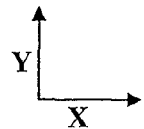
Figure 44:
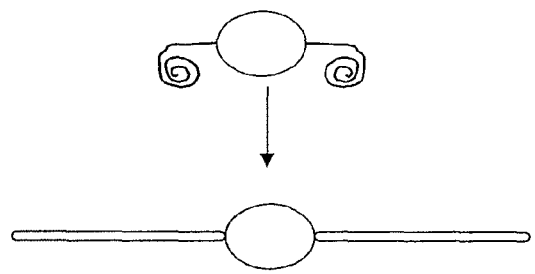

In another embodiment, a structure or apparatus 280 may be made to bend around more than one axial direction, such as, in another embodiment, to twist and curve concurrently, by having an array of electrochemical actuators 300 on the surface of the structure or apparatus 290 and actuating them non-uniformly in a prescribed manner (FIG. 44).

In one embodiment, the structure or apparatus will twist about the x-axis and bend about the y-axis, if individual actuators are actuated appropriately to produce this result. According to this aspect of the invention, and in one embodiment, if there is a net expansion induced on the surface, then the surface will bend, as a whole in response, and, in another embodiment, if different degrees of bending are induced locally as one progresses down the x-axis, then overall, there will be a twisting along this axis.

In another embodiment, according to this aspect of the invention, the structure or apparatus may comprise a series of small actuators so designed as to produce an overall twist in the structure comprising the actuators, wherein the structure may be quite large, and the twisting exerted despite high frictional and other resistance forces exerted on the structure. For example, and in one embodiment, a series of Multilayer Stacked Electrochemical Actuators with an aspect ratio of, in one embodiment, 1, or in another embodiment, 0.5, or in another embodiment, 2.0, or in another embodiment, 1.5, or in another embodiment, between 0.5 to 2, is placed on a substrate, at an angle to the leading edge of the substrate. In one embodiment, the Multilayer Stacked Electrochemical Actuator is in the shape of a cube, or in another embodiment, in the shape of a cylinder. In another embodiment, the Multilayer Stacked Electrochemical Actuators range in size between 0.5 to 10 cm, or in another embodiment, between 0.5 to 5 cm, or in another embodiment, 1 to 3 cm.

Figure 45:
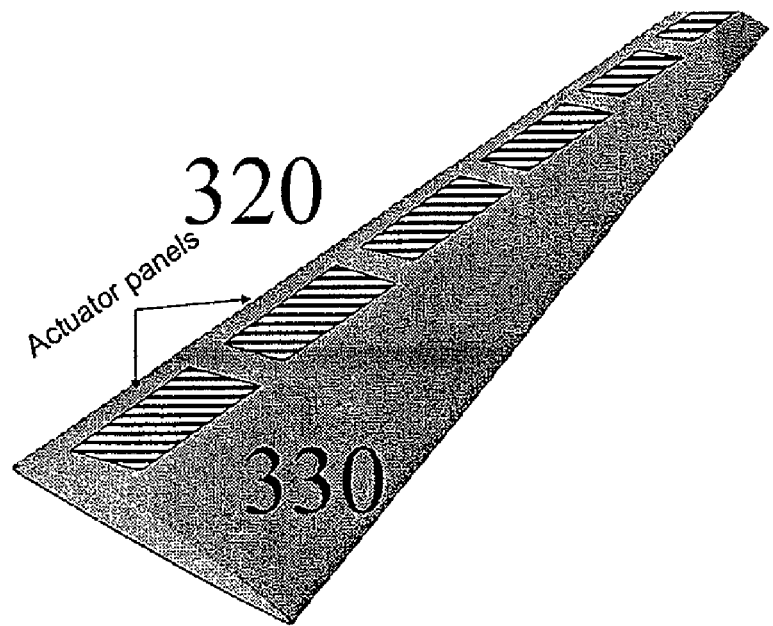
FIG. 45 schematically depicts an assembly 310 of possible arrangements of actuators 320 on the wings 330 of an aircraft, which may provide twist to the wing.
Figure 45:
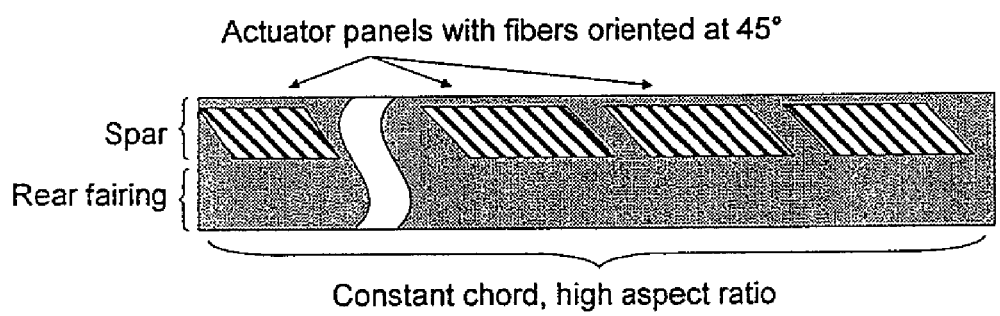

In another embodiment, the substrate is a wing of an aircraft 330, and the actuators of this invention 320 arranged according to this aspect of the invention are used to twist the wing (FIG. 45). In another embodiment, the actuators may be utilized to raise and lower flaps positioned on a wing, for greater flight control. In another embodiment, the actuators of this invention may be utilized to reversibly unfurl a wing (FIG. 44B).

According to this aspect of the invention, and in other embodiments, the actuators may be utilized for unfurling a fin or wing on a missile or aircraft. In one embodiment, large strains produced by electrochemical actuation enable the morphing of surfaces. By the term "morphing", it is meant, in one embodiment, to refer to an overall change in structure. In one embodiment, an otherwise rigid wing or fin may be furled when the vehicle is stored, and unfurled when the vehicle is deployed, via the electrochemical actuators of this invention. In another embodiment, significant change in wing sweep is achieved, which, in another embodiment, enables a vehicle comprising the electrochemical actuators of this invention to have both subsonic and supersonic capabilities.

In one embodiment, the structure or apparatus moves in or beyond the atmosphere. In one embodiment, such a structure or apparatus may be an aircraft, a missile, a spacecraft or a satellite. In another embodiment, such a structure or apparatus may be part of an aircraft, a missile, a spacecraft, a worm, a robot or a satellite. In other embodiments, the part may be a wing, a blade, a canard, a fuselage, a tail, an aileron, a rudder, an elevator, a flap, a pipe, a propellor, a mirror, an optical element, or a combination thereof. In other embodiments, the part may be an engine, a motor, a valve, a regulator, a pump, a flow control device, a rotor, or a combination thereof.

In another embodiment, the structure or apparatus moves in water. In one embodiment, such a structure or apparatus may be a boat, a ship, a submarine or a torpedo. In another embodiment, the structure or apparatus is a part of a boat, a ship, a submarine or a torpedo. In another embodiment, the part is a blade, a rudder, a pipe, a propellor, an optical element, or a combination thereof. In another embodiment, the part is an engine, a motor, a valve, a regulator, a pump, a flow control device, a rotor, a switch or a combination thereof.

In another embodiment, the structure or apparatus is a bomb, a means of transportation, an imaging device, a robotic, a worm, a prosthesis, an exoskeleton, an implant, a stent, a valve, an artificial organ, an in vivo delivery system, or a means of in vivo signal propagation.

For example, and in an embodiment of this invention, high-authority control of helicopter rotor blades may be accomplished via the use of an actuator of this invention. The actuators of this invention may be utilized, in one embodiment of the invention, for producing high-authority, low-bandwidth control required to allow auto-rotation, or to improve hover performance at hover levels in aircraft. In one embodiment, a Rotational Electrochemical Actuator of this invention will produce a 10 degree tip rotation, or more, which may be used in hover applications, which typically require 8-15 degrees of authority. In another embodiment, a Rotational Electrochemical Actuator of this invention will provide an electric, swashplateless rotor for use in hover application.

In another embodiment, single bi-layer or stack actuators comprising a rigid porous separator, or a solid electrolyte can be used, which provides high stiffness to the actuator. A series of such actuator elements may be patterned on a substrate, including on silicon glass, or aluminium oxide, or some other such substrate of high stiffness, and used for high force actuation, for production of a nastic structure. In one embodiment, the term nastic structure refers to a structure, which deforms in response to a stimulus. According to this aspect of the invention, a series of actuators may be placed on a substrate which when activated, creates a deformation, in another embodiment, in an overall structure comprising the actuators.

In one embodiment, devices that utilize the technology of this invention comprise motors, such as, in one embodiment, a linear, or, in another embodiment, a rotational motor. In another embodiment, the device is a pump, such as, in another embodiment, a microhydraulic pump, or in another embodiment, a microfluidic pump. In another embodiment, the device is a mirror array, or in another embodiment, an optical element used for optical switching. In another embodiment, the device is a photonic device where actuation induces a change in an optical path or properties. In another embodiment, the device is a worm or robot that moves as a result of actuation, moving, in another embodiment, a series of elements in a given sequence.

The energy density of electrochemical actuators (ECAs) may be quite high, and the choice of materials will influence the resulting energy densities obtained, with, in another embodiment, the advantage of easier distribution of ECAs throughout a morphing aircraft structure, or, in another embodiment, their production as small units that can be ganged to produce high authority at a single point or distributed widely over a structure to produce localized control. In another embodiment, a structure comprising the ECAs may be able to "morph" in many degrees of freedom, and achieve high performance over a wide range of conditions. In one embodiment, such an application is exploited in constructing parts of an airplane. For example, in one embodiment, one might develop a wing with distributed ECAs that would allow high levels of twist (5 deg or more) which allow the elimination of ailerons, or, in another embodiment, significant sweep changes (20 deg or more) to allow good performance at both subsonic and supersonic speeds, or, in another embodiment, airfoil shape changes (camber and thickness) large enough to optimize wing performance over Mach numbers ranging from low subsonic to supersonic speeds.

In another embodiment, this invention provides a pump comprising at least one electrochemical actuator, comprising an negative electrode, a positive electrode, an intercalating species, and at least one valve, wherein following application of a voltage causing current flow in the actuator, intercalation of the intercalating species produces a change in volume in the actuator, such that fluid is directed through the valve. In one embodiment, the pump comprises a series of actuators. In another embodiment, the actuators may be placed in a parallel series. In another embodiment, the actuators may be placed in a plane of a surface so as to direct fluid through designed channels.

Figure 46:
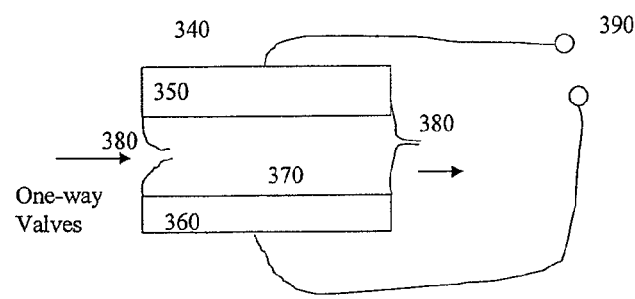
FIG. 46A schematically depicts a microfluidic pump 340, comprising a positive electrode 350, and negative electrode 360, separated by a liquid electrolyte layer 370. The actuator undergoes a net volume change upon charging and discharging 390, enabling fluid propulsion through the valves 380. A pump or microfluidic device 400 comprising a series of actuators 410, which upon charging and discharging induces fluid flow from intake 420, through exit 430 of the pump (B). Positioning of the actuators is such that channels are designed (14C).
Figure 46:
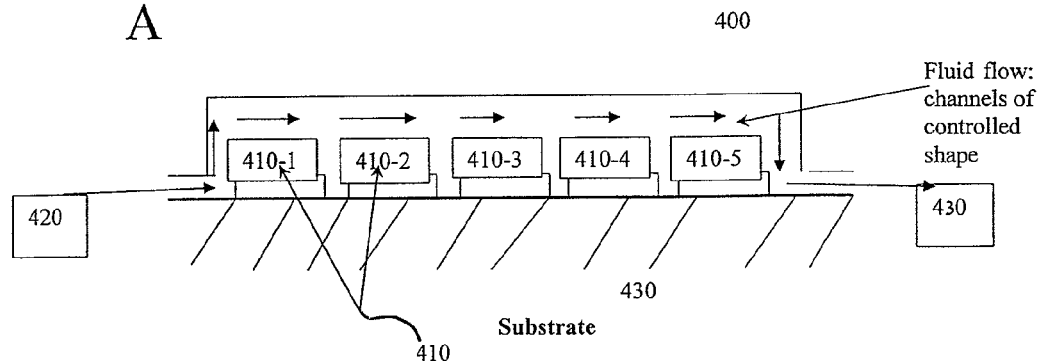
Figure 46:
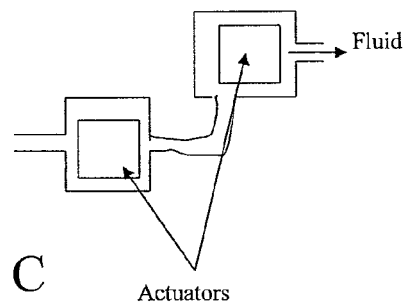

In one embodiment, a microfluidic pump may be designed, using an electrochemical actuator of this invention, wherein the actuator produces a net volume charge upon charging and discharging (FIG. 46). According to this aspect of the invention, and in one embodiment, the microfluidic pump 340, comprises a positive electrode 350, and negative electrode 360, separated by an electrolyte layer 370, which according to this aspect of the invention is a liquid electrolyte. In one embodiment, the electrolyte may itself be the working fluid of the pump, or in another embodiment, the working fluid may be a separate fluid from the electrochemical actuator system. In another embodiment, the actuator undergoes a net volume change upon charging and discharging, following the application of voltage 390, or its cessation, respectively, which enables fluid propulsion through the valves 380.

Volume changes that may be achieved, such as those exemplified in Example 3 herein, may range, in one embodiment, from 1 to 10%, or, in another embodiment, from 5 to 10%, or, in another embodiment, from 10 to 15%, or, in another embodiment, from 15 to 20%, or, in another embodiment, from 5 to 10%, or, in another embodiment, from 5 to 10%, or, in another embodiment, from 20 to 25%, or, in another embodiment, from 25 to 30%, or, in another embodiment, from 30 to 35%, or, in another embodiment, from 35 to 40%, or, in another embodiment, from 40 to 45%, or, in another embodiment, from 45 to 50%, or any range as described herein.

In one embodiment, an assembly of actuators can be used to create a fluid or gas pump or a microfluidic device. In one embodiment, a series of actuators may be assembled in a plane, wherein actuation produces a net flow of fluid though channels, whose shape is controlled by the actuator design and positioning within the plane (FIG. 46B). In one embodiment, the pump or microfluidic device 400 comprises a series of actuators 410, which upon charging and discharging induce volume changes, which can, in one embodiment, direct fluid flow from intake 420, through exit 420 of the device, through channels whose shape may be controlled, in another embodiment, via specific actuator design, which may comprise assembly on a substrate 430. In one embodiment, operation of the actuators in a series propels the fluid through the device. In another embodiment, positioning of the actuators is such that channels are designed, as depicted in FIG. 46C. Such actuators can be, in one embodiment, of single bi-layer, or, in another embodiment, of stacked design. In one embodiment, the device will comprise a high molecule stack for the actuators. According to this aspect of the invention, and in one embodiment, a rigid porous separator or, in another embodiment, a solid electrolyte can be used, such as, in another embodiment, a LIPON electrolyte. In another embodiment, the stacked actuators may comprise thin film batteries in an array on a substrate, in a single bi-layer (single electrochemical cell) or multilayer stack sequence. In one embodiment, the substrate on which the actuators are patterned may comprise silicon glass, aluminium oxide, or any substrate of high stiffness, and may, in another embodiment, be used for high force actuation, or, in another embodiment, in microfluidic devices for fluid propulsion. In another embodiment, according to this aspect of the invention, a nastic structure is thus designed, in which a series of gas or liquid filled chambers are actuated so as to create deformation of the overall structure.

Figure 15:
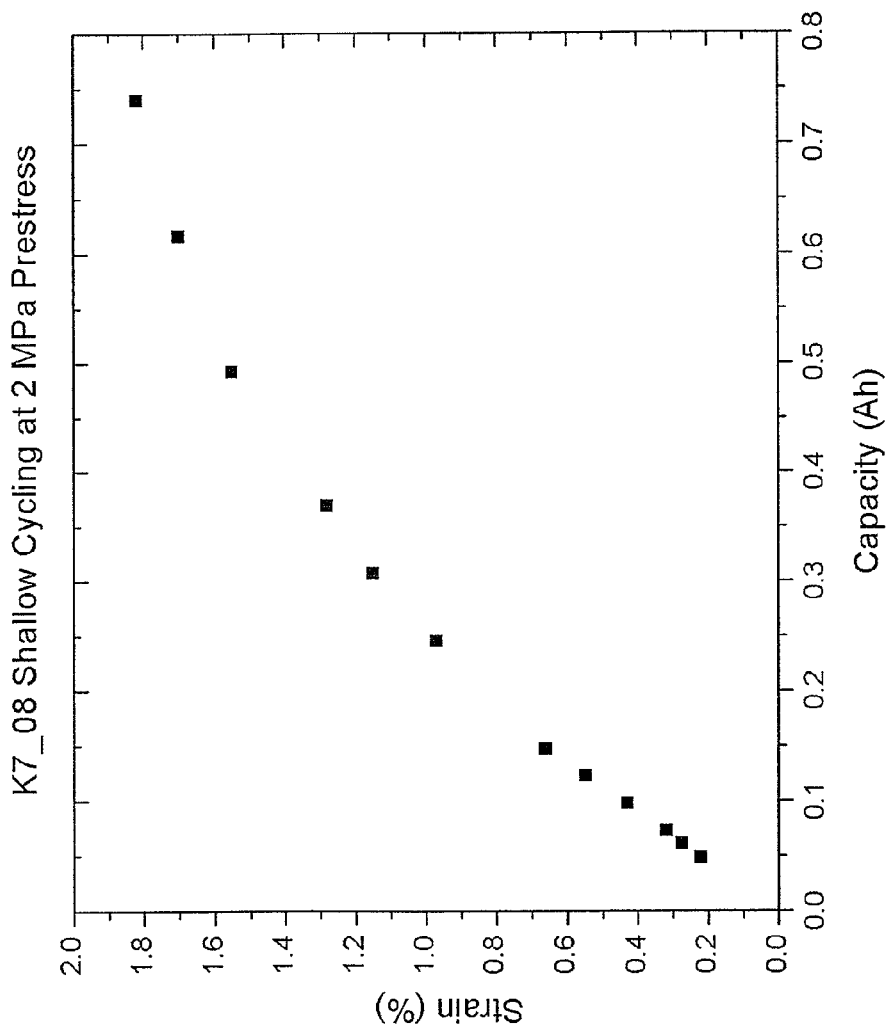
FIG. 15 shows strain versus the utilized reversible capacity in an embodiment of a multilayer stacked actuator under 2 MPa constant stress.

In another embodiment, actuation is via a fluidic system, which comprises an electrolytic membrane, which pumps an ion from one side to another, producing a liquid rather than a gas in the process, as exemplified herein in Example 4 and FIG. 15. By pumping a liquid, much higher actuation forces can be produced since liquids have much lower compressibility. Actuators of this kind can be used, in one embodiment, in fluidic, or in another embodiment, in micro fluidic devices, or, in another embodiment, in micro hydraulic devices, or in another embodiment, in nastic structures or, in another embodiment, in compressing cellular micro-fluidic or, in another embodiment, in micro hydraulic devices.

In one embodiment, such an electrochemical actuator, will comprise an negative electrode, a positive electrode and an electrolytic membrane and an ion, wherein application of voltage to the electrochemical actuator or its cessation induces pumping of the ion from one side of the membrane to the other side, resulting in the generation of a liquid, thereby producing a volumetric or dimensional change in the actuator. In one embodiment, the ion is a proton (H+). In another embodiment, the liquid comprises $H_2O_2$, or in another embodiment, the liquid comprises $H_2O$.

Figure 47:
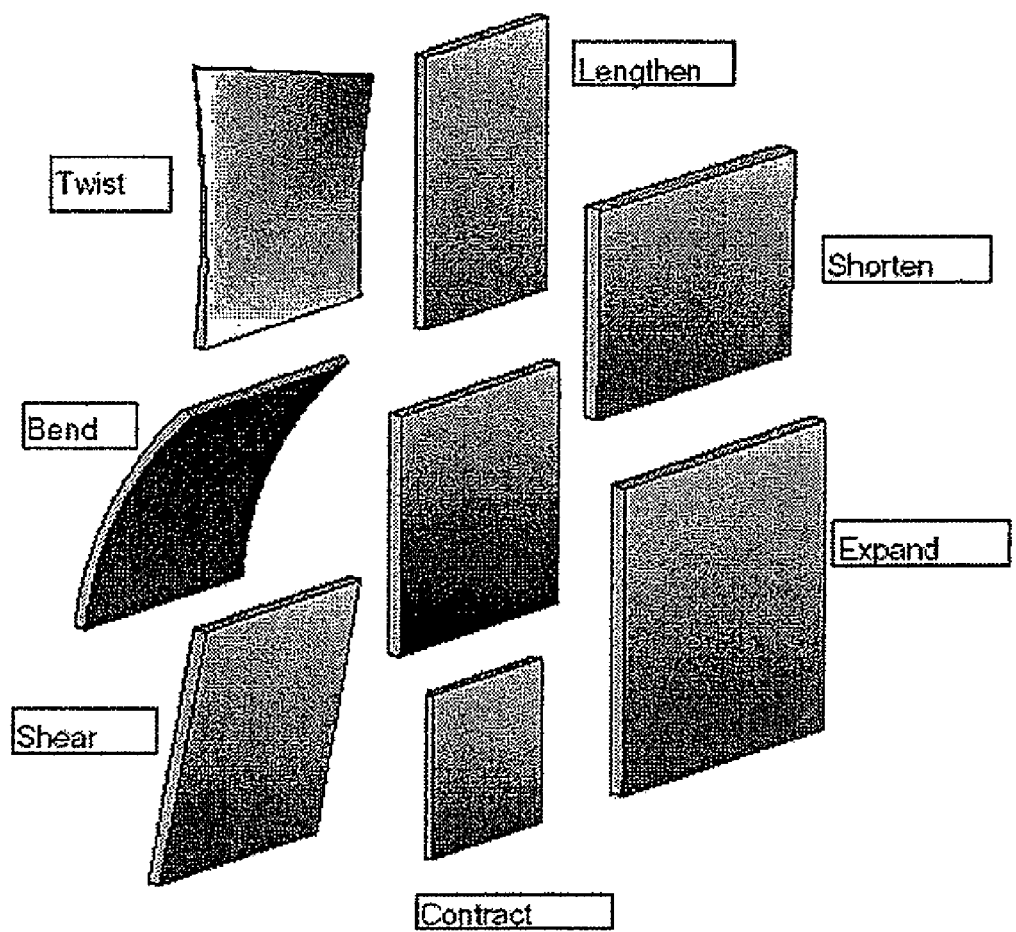
FIG. 47 schematically depicts multiple morphing capabilities of the actuators or structures comprising the same of this invention.
Figure 48A:
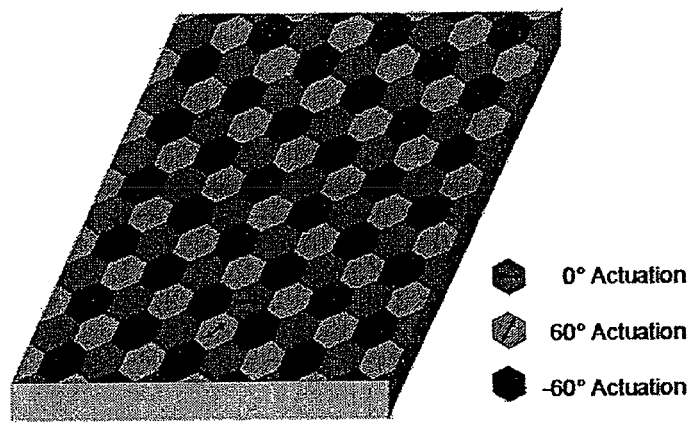
FIG. 48 depicts embodiments of a morphing plate architecture envisioned for this invention. In A, an overall plate architecture, with 3 actuator orientations is shown. In B, an embodiment depicting an embedded individually addressable multilayer stack actuator array is shown. In C, an embodiment depicting a distributed array of electrochemical fiber actuators applying tensile loads is shown. In D, embodiments depicting actuator designs, which allow for greater expansion or contraction, are shown.

In another embodiment, this invention provides a morphing plate, or in another embodiment, morphing beam architecture comprising the actuators of this invention. According to this aspect of the invention, and in one embodiment, a plate architecture containing distributed electrochemical actuators is provided, which may yield, in another embodiment, a multiple shape target (FIG. 47). In one embodiment, the plate may comprise three orientations of in-plane, independently-addressable actuators, such as, for example, 0°, +60°, −60°, as illustrated by the red-green-blue motif in FIG. 48A. This hexagonal network does not necessarily represent actual physical cell walls or boundaries (although such an assembly represents one embodiment of this invention), but may, in another embodiment, describe a distribution of "unit cells", each acted upon by a single actuator of a given orientation. Many degrees of morphing freedom are possible in a plate, in another embodiment, as schematized in FIG. 48B, in which the surfaces contain such arrays of embedded addressable actuators.

Figure 48B:
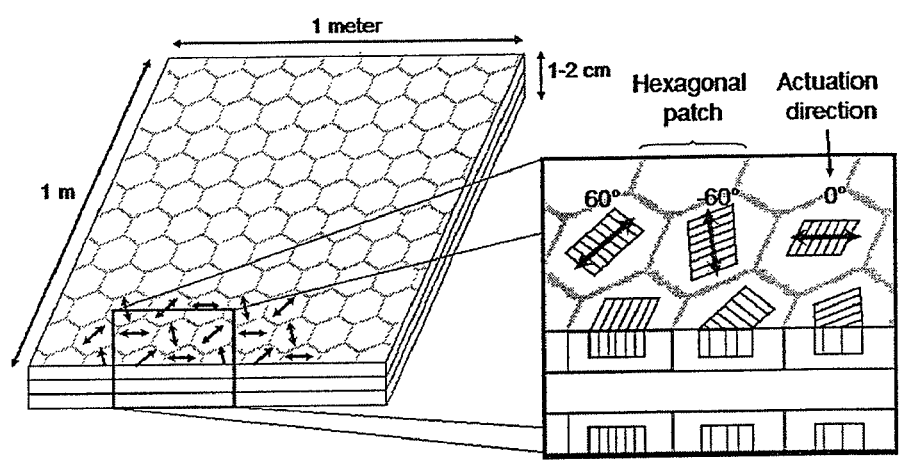

In one embodiment, the construction in FIG. 48B may, for example, be a 10×10 array of actuators embedded in each side of a monolithic plate made of a polymer or structural metal, or a composite plate. Shape changes could be induced, in one embodiment, as follows:

If all actuators are simultaneously charged (discharged) so that they expand (contract), the plate will expand (contract) biaxially. According to this aspect of the invention, there may be a lesser extent of thickness expansion (contraction), determined primarily by the expansion anisotropy designed into the multilayer actuator. The net macroscopic expansion of the plate depends, according to this aspect, and in one embodiment, on the area or volume fraction of actuators and details of load transfer. The actuator fraction may be, in one embodiment, 50% or more, so that an actuator exhibiting 10% volume expansion results in a 5% expansion of the plate.

In one embodiment, the lengthening, shortening, shear, or combination thereof, of the plate along any direction in the plane of the plate may be accomplished by actuating the three orientations non-uniformly.

In another embodiment, curvature about any axis or axes may be produced by actuating the two sides of a plate in a non-uniform manner. For example, if all actuators on one surface are expanded equally, while those on the opposing surface either contract equally or are not activated, the plate will cup in a uniform (macroscopically spherical) curvature. The net curvature may depend, in another embodiment, on the strain induced at each surface, the thickness of the plate or combination thereof; for example, a 2 cm thick plate having +5% expansion at one surface and −5% contraction at the other may exhibit a radius of curvature of 20 cm.

In another embodiment, twisting, saddle curvatures, or more complex topologies may be produced by actuating the two sides of a plate appropriately, which, in another embodiment, may manifest in the depicted shape changes as shown in FIG. 47.

Figure 48C:
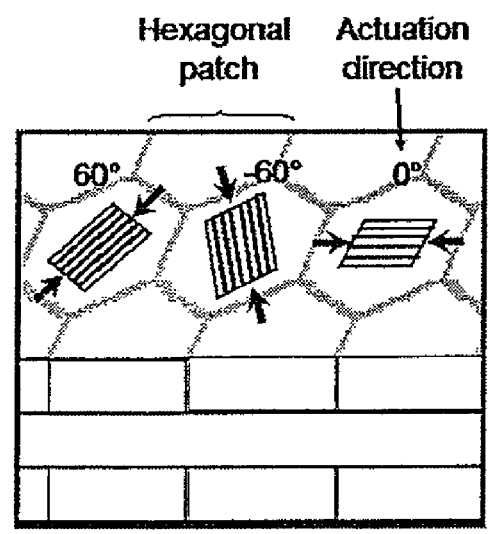

In another embodiment, the Continuous Fiber Electrochemical Actuator may be arrayed such that it is applied to the surface of a plate, in one embodiment, along the 3 orientations herein described, and actuated to provide multiple morphing capability (FIG. 48C).

Figure 48D:
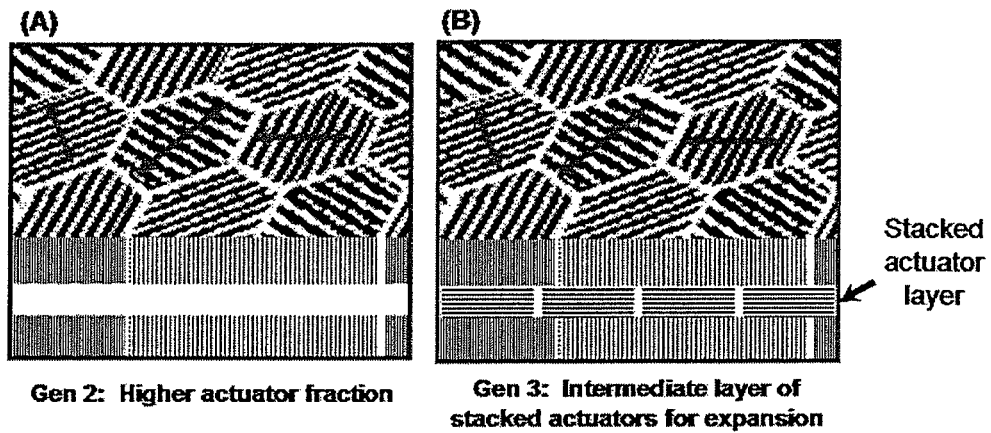

In another embodiment, a combination of stacked and fiber actuators may be used. Higher morphing performance may be achieved, in another embodiment, by increasing the actuator density within the plate. In another embodiment, the array may be constructed such that each hexagonal cell is virtually filled by actuator, for example, as depicted in FIG. 48D. To impart greater thickness expansion or contraction capability (including varying thickness changes along the plate), the cross-section of the plate may, in another embodiment, also contain stacked actuators (for example, as depicted in 48D, panel 2).

It is to be understood that the present invention encompasses any embodiment, or combinations of embodiments for what is to be considered an electrochemical actuator of this invention, and the invention includes any structure, fabric, device, etc. comprising the same, or multiples thereof. It is to be understood that several actuators may be incorporated within a single structure, apparatus, device, fabric, that the actuators may differ, in terms of their type, materials used to construct the actuator, actuation energy provided, preconditioning, stress amplification, or strain amplification properties, etc., and are encompassed by the present invention.

While only a few embodiments of the present invention have been shown and described, it will be apparent to those persons skilled in the art that many changes and modifications may be made thereunto without departing from the spirit and scope of the invention, and numerous applications of the methods and devices of the invention are apparent, and to be considered as part of this invention.

The following examples are presented in order to more fully illustrate the preferred embodiments of the invention. They should, in no way be construed, however, as limiting the broad scope of the invention.

EXAMPLES

Example 1

Figure 1B:
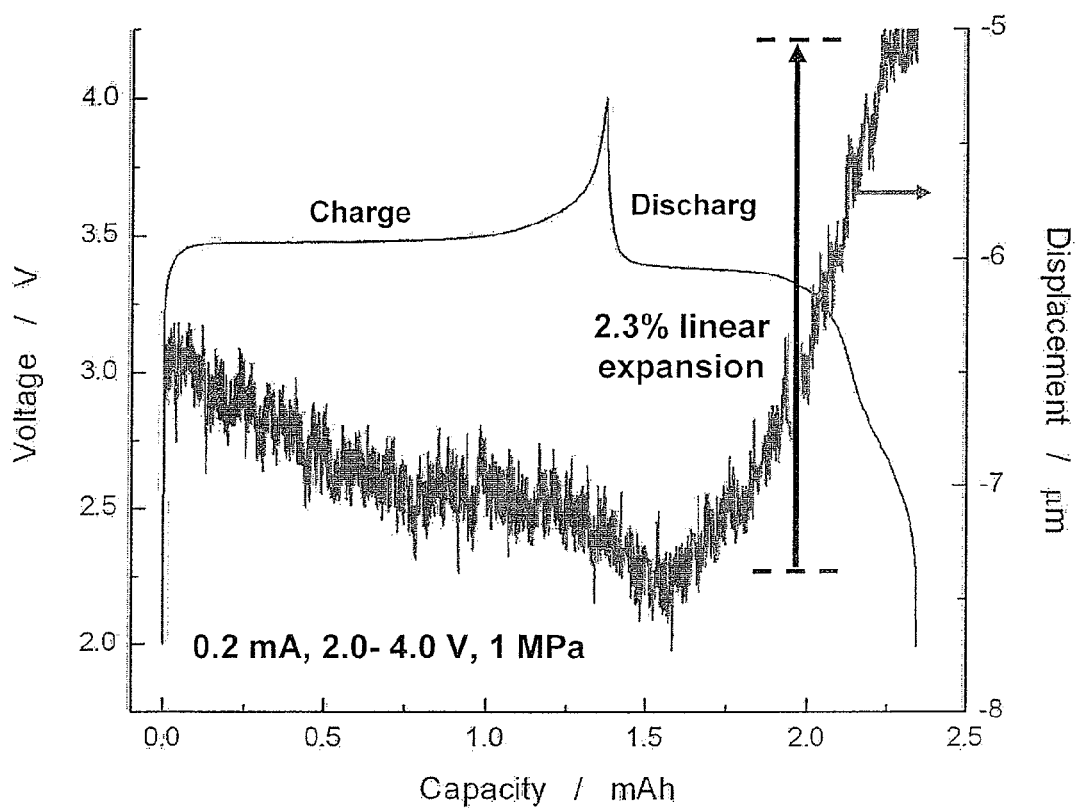
Figure 4:
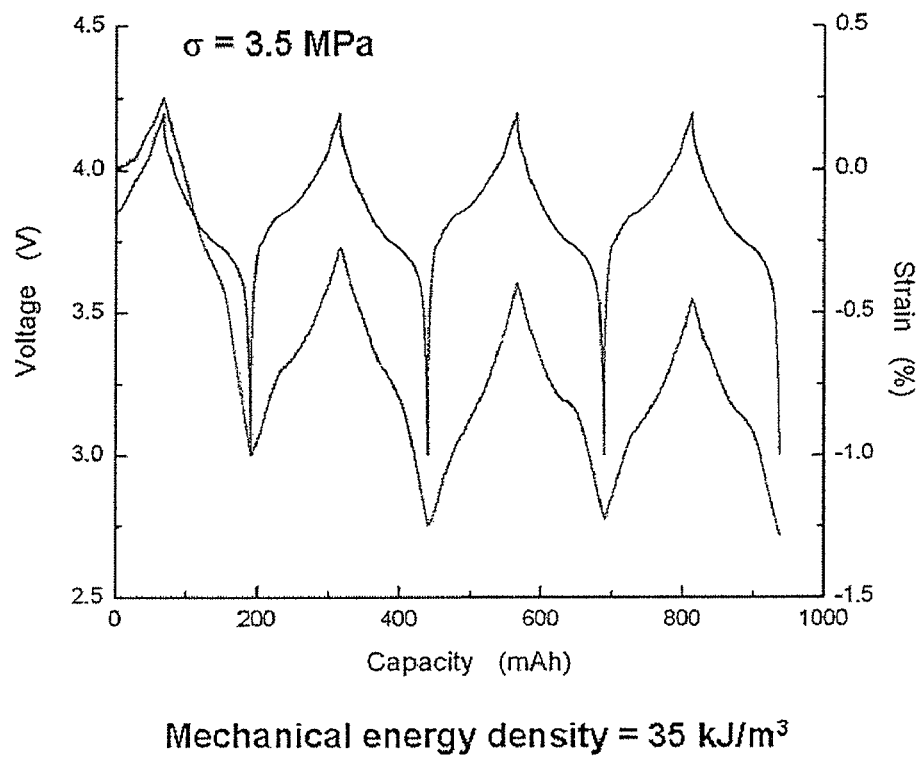
FIG. 4 graphically depicts the charge-discharge voltage curve and corresponding strain, obtained under 3.5 MPa constant pre-stress, for actuators of one embodiment of a multilayer stacked design. Strain is ~1% and actuation energy density is ~35 kJ/m$^3$.

Electrochemical Actuator Utilizing LiFePO$_4$-Based Electrode and Porous Ceramic Separator FIG. 1, from Yamada [J. Electrochem. Soc., 148, A224 (2001)] shows the volume changes that occur in the olivine structure compound (Fe,Mn)PO$_4$ as it is lithiated to the end-member composition Li(Fe,Mn)PO$_4$. Between the fully lithiated (upper curve) and fully delithiated (lower curve) limits of composition, a volume change of 7.4-10% (linear strain of 2.4-3.2%) is realizable depending on the Fe/Mn ratio. FIG. 4 illustrates a design of electrochemical actuator in which a positive electrode is used with a porous alumina separator of high stiffness and load bearing ability. The negative electrode comprises Li metal, which is deposited within the pores of the porous load-bearing actuator so that it is not load bearing, while still providing a source and sink for Li ions during the operation of the actuator. An actuator of this design was constructed using a positive electrode for a rechargeable lithium battery having a 100 μm thick composite layer comprising an LiFePO$_4$-based cathode active powder, polymer binder, and carbon conductive additive, deposited on an aluminum foil current collector of about 15 micrometer thickness. The electrode had an area of about 1 cm$^2$. A 2 mm thick porous alumina separator was used, sectioned from a glass-bonded alumina abrasive product (Norton Company, Worcester, Mass.). On the negative electrode side of this separator, a small amount of Li metal was mechanically squeezed into the pores of the separator, and a copper foil negative current collector was applied. The assembly was infiltrated with a liquid electrolyte used for lithium rechargeable cells (LP40), sealed in a polymer envelope, and subjected to 1 MPa uniaxial prestress applied normal to the layers of the actuator. The actuator was cycled over a voltage range of 2.0-4.0V at a constant 0.2 mA current. The actuator required 8 charge/discharge cycles for the layers to adjust, and on the 9$^{th}$ cycle, the expected expansion upon discharge was seen as Li+ was intercalated into the LiFePO$_4$ positive electrode, FIG. 1B, with 2.3% linear strain being observed, in good agreement with the expected value.

In another example, a 200 mm thick layer (typical for battery electrodes) of the electrochemical insertion compound in FIG. 1, when formulated as a powder-based composite electrode, will have a Young's modulus of Y=50 GPa (reduced from the single crystal value of ~150 GPa). Under 3.3V applied voltage this electrode can be fully intercalated to reach a linear strain of $\epsilon$~1.5%, thereby generating $e^{33}$=3.8× 10$^4$ C/m$^2$. The strain energy density (FIG. 4), taken as ½Y$\epsilon^2$/ρ where ρ is the material density, is estimated at ~2050 J/kg (5.6×10$^6$ J/m3) for the active material layer, and ~1000 J/kg (2.8×10$^6$ J/m$^3$) for an actuator stack containing one-half by weight or volume of inactive supporting layers. For a stack volumetric strain energy density of 2.8×10$^6$ J/m$^3$, at 1.5% linear strain the equivalent blocked stress should be ~375 MPa.

Example 2

Multilayer Stacked Actuator Using LiCoO$_2$ and Carbon as Active Materials

Figure 1C:
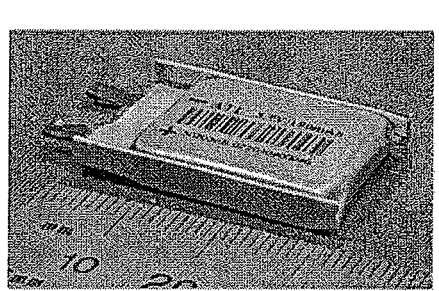
Figure 1C:
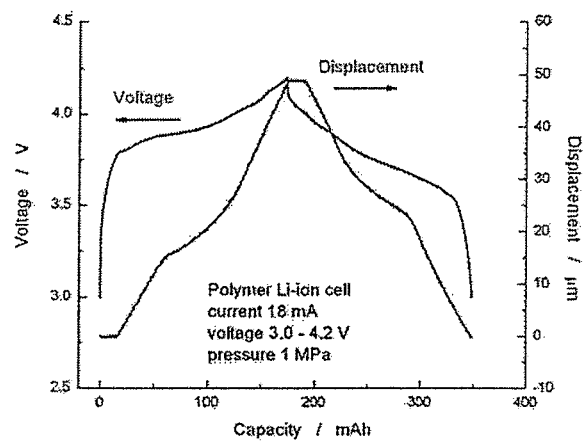
Figure 2:
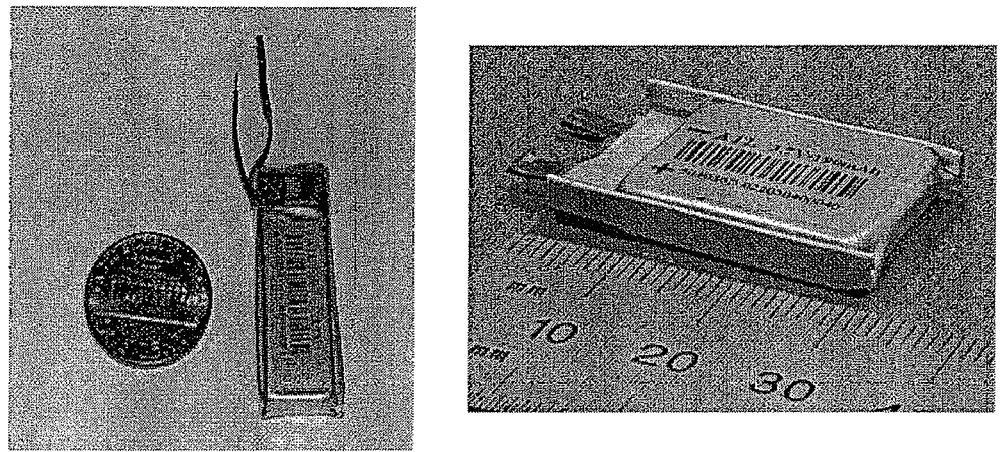
FIG. 2 demonstrates an embodiment of a multilayer stacked electrochemical actuator comprised of Li ion-polymer batteries (ATL Corporation). According to this aspect of the invention, the elastic (Young's) modulus measured normal to the face of the cells (in the direction of layer stacking) was very low, ~30 MPa.

In FIG. 1C, actuation is shown in a multilayer stacked actuator in which the positive electrode is LiCoO2 and the negative electrode is carbon. These devices are commercially available batteries fabricated according to the "Bellcore" gel-electrolyte technology in which positive electrode and negative electrode layers (about 30 layers total) are bonded together with a bondable separator film, following which the multilayer stack is packaged in polymer. Typical cells are shown in FIG. 2. The laminates are oriented normal to the plane of the cell. This battery is elastically soft due to the materials used; it is a relatively low energy density device containing a large fraction of soft polymer components to facilitate manufacturing. The cells were tested in the as-received state with no preconditioning prior to electromechanical testing. The cells were tested in an apparatus designed to apply a constant pre-stress between two parallel-faced rams while the cells were charged and discharged. The deformation of the cells in the direction of applied stress was measured with a precision displacement transducer. Under 1 MPa applied pressure, a reversible 1% linear expansion was measured, as shown in FIG. 1C, providing for an energy density of 10 kJ/m$^3$.

Figure 3:
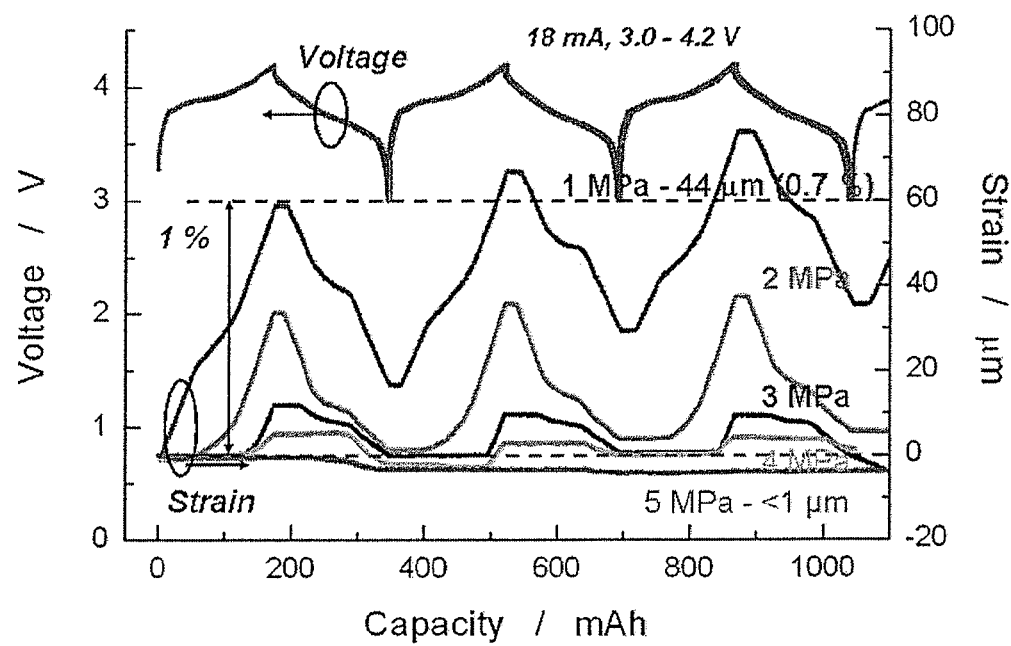
FIG. 3 graphically depicts the charge-discharge voltage curves and corresponding strain, obtained under various prestress conditions, for actuators of one embodiment of a multilayer stacked design. Maximum strain was ~0.7% and obtained actuation energy density was ~12 kJ/m$^3$.

FIG. 3 shows results for a cell under various values of pre-stress from 1 MPa to 5 MPa. For this cell the strain is ~0.7% at 1 MPa, and decreases as the pre-stress is increased. In the as-received condition, the cells have a Young's modulus measured in the direction of actuation (normal to the face of the cells and the planar electrode layers) of ~30 MPa. The maximum actuation energy density in this device is ~12 kJ/m$^3$. FIG. 4 shows results from a cell that exhibited higher energy density. In this instance the applied pre-stress is 3.5

MPa, and the strain exhibited by the cell is ~1%, yielding a mechanical energy density of ~35 kJ/m³. This actuation energy density is approximately one-half that of a typical well-engineered PZT piezoelectric actuator.

Example 3

Multilayer Stacked Actuators and Preconditioning for Improved Performance

Figure 5:
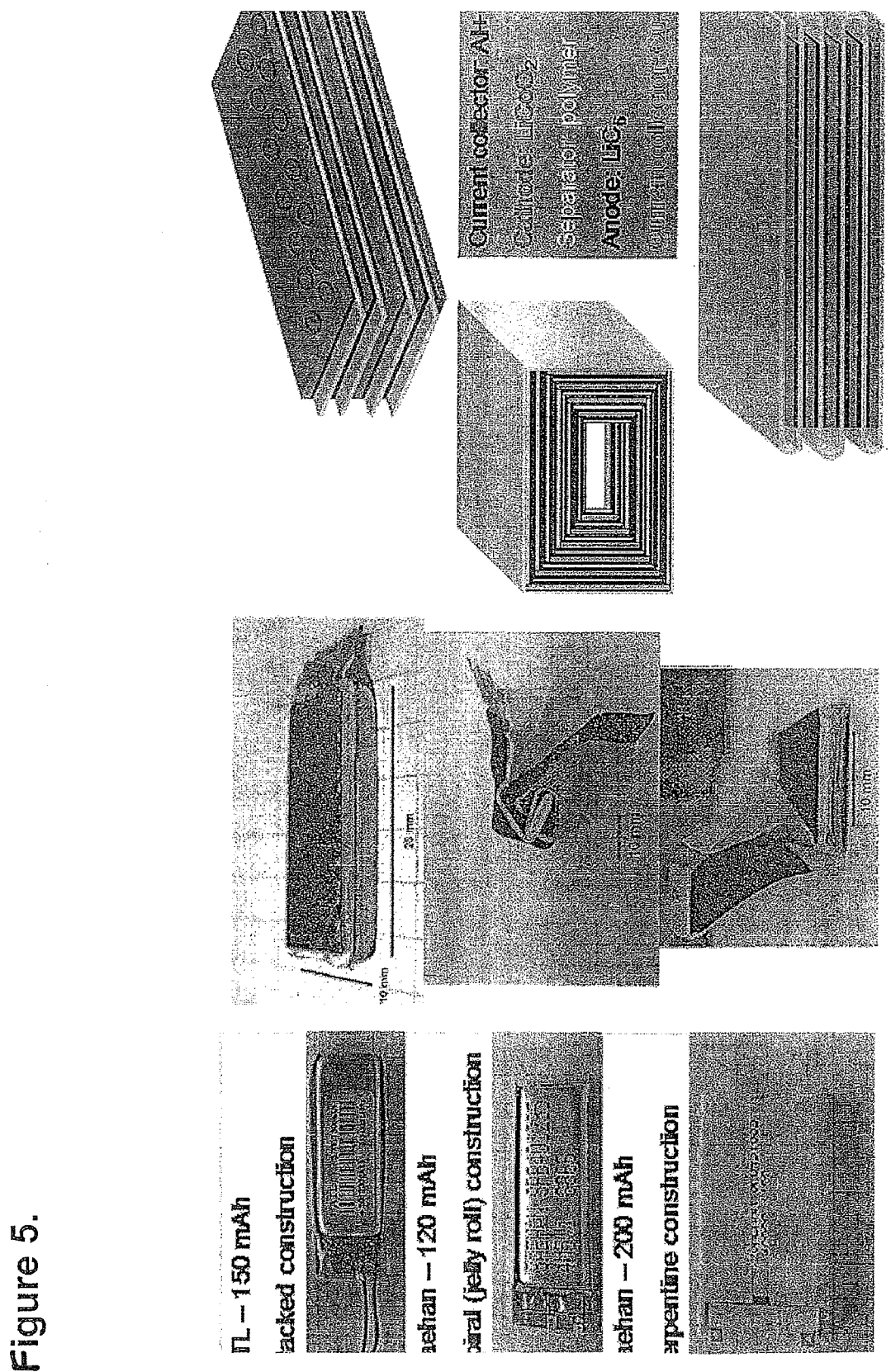
FIG. 5 shows embodiments of lithium ion rechargeable cells based on LiCoO$_2$-carbon chemistry, with different internal constructions.

Multilayer stacked actuators can have several different internal constructions, as exemplified in the following. FIG. 5 shows several lithium ion rechargeable cells based on $LiCoO_2$-carbon chemistry, each of which has a different internal construction. Each of these designs was demonstrated to be capable of performing substantial mechanical work, and furthermore, to have improved performance after preconditioning treatments described herein.

Figure 6:
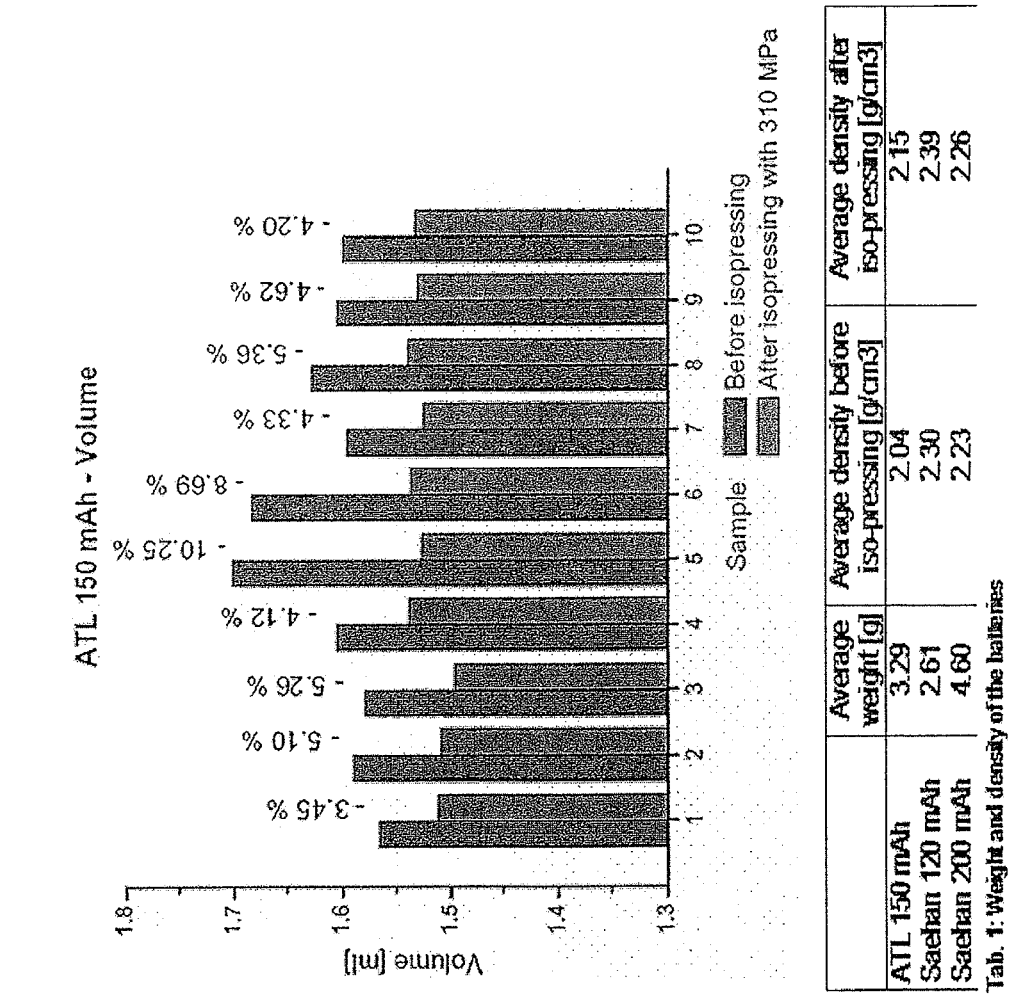
FIG. 6 graphically depicts the volume reduction of an embodiment of a multilayer stacked actuator cells prior to and following isopressing treatment at 45,000 psi.

Several samples of each cell were double-vacuum-bagged in plastic and placed in an isostatic press, and the pressure raised to 45,000 psi and held for 5 minutes. After testing, the open circuit voltage of the cells was measured, and all cells were found to have survived the pressure treatment without suffering an internal short. The capacity of the batteries changed only slightly after the isopressing treatment, showing a reduction in capacity measured between 3.0 and 4.2V at a C/5 or C/2.5 rate of <3% for the 120 mAh and 150 mAh cells, and ~8% for the 200 mAh cells. A significant volume reduction was seen for each cell. FIG. 6 is a plot of the volume reduction for 10 cells of one type, in which volume reductions ranging from 3.45% to 10.25% were observed. An excess volume in the cell may exist, which can be reduced by the pressing treatment. FIG. 6 also tabulates the macroscopic densities measured by the Archimedes method of each cell type before and after isopressing. The average volume reduction ranges from 1.4% to 5.4%. It is also seen that the density of the actuators is low, from 2.15 to 2.39 g/cm³, which may be compared to the density of a PZT piezoelectric actuator of approximately 7.5 g/cm³.

Figure 7:
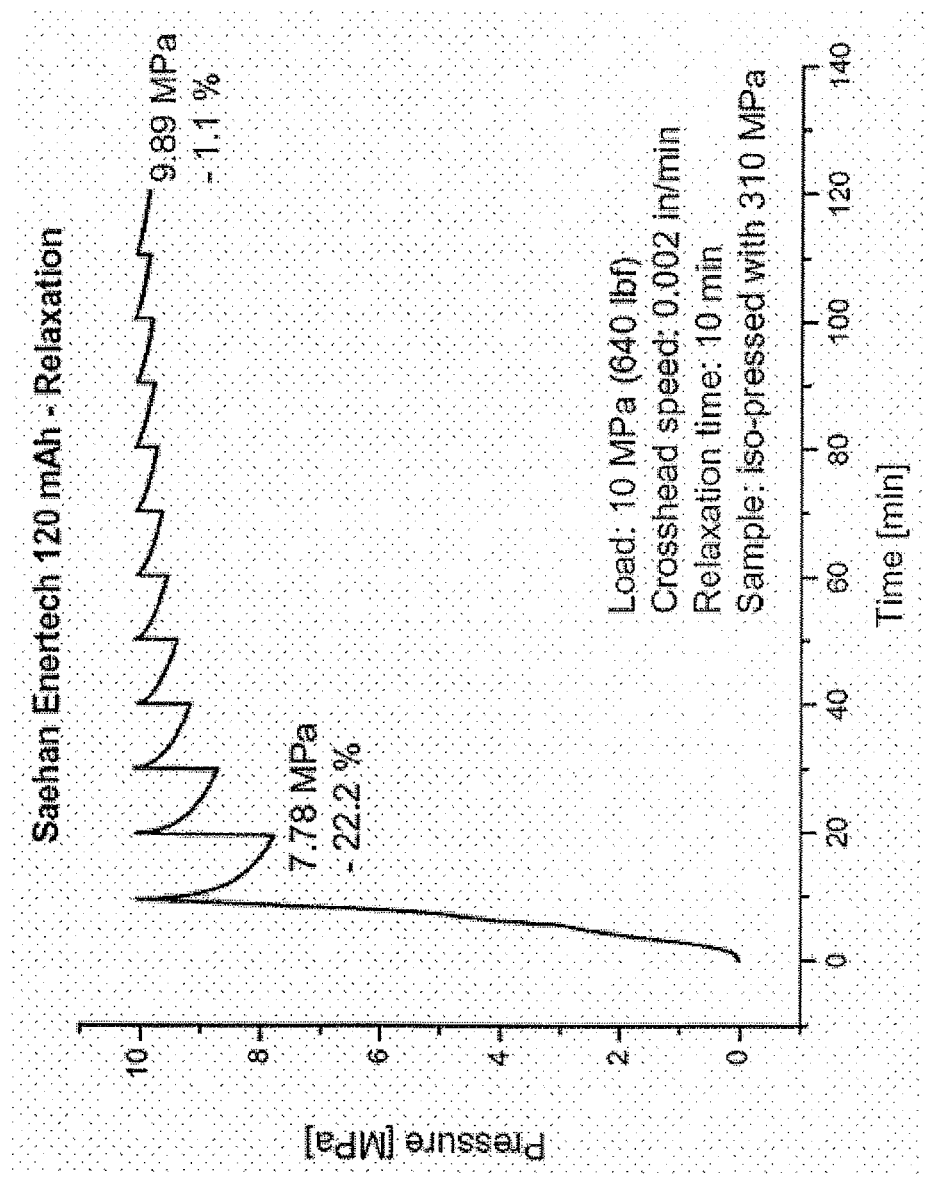
FIG. 7 graphically depicts viscoelastic relaxation of applied stress in an embodiment of a multilayer stacked actuator. Relaxation in applied stress is measured as a function of time in cells subjected to 10 MPa stress in an Instron test machine.

These multilayer cells were found to exhibit viscoelastic deformation under a uniaxial stress applied normal to the largest face of the prismatic cell, which is normal to the plane of the electrode in the stacked cases. Both as-received and isopressed cells exhibited viscoelastic relaxation. FIG. 7 shows the relaxation in applied stress over time when a cell is subjected to 10 MPa stress in an Instron test machine. The stress is ramped to 10 MPa at a crosshead speed of 0.002 in/min, and then the crosshead is stopped so that no further displacement occurs. Over time, the stress then relaxes substantially. However, with each successive stressing and relaxation cycle, the amount of stress relaxation decreases, and eventually the cell is able to sustain nearly the full applied pressure of 10 MPa. Furthermore, the thickness of the cells increased after the stress was removed at the end of the test, and increased by 2.5 to 4% over a period of several hours. These results show that multilayer stacked actuators of such design using powder composite electrodes, microporous polymer separators, and polymer packaging exhibit viscoelastic relaxation properties, but that the dimensions of the cells can be stabilized by applying stress over an extended time prior to using them as electrochemical actuators.

Under uniaxial applied stress, these cells were found to be able to withstand extremely high applied stresses before internal short-circuiting. Using the Instron apparatus, stress was increased at a constant crosshead speed while the cell voltage (at a 3.8 V state of charge initially) was continuously monitored. For the 120 mAh, 150 mAh, and 200 mAh cells respectively, the voltage did not decrease until pressures of 37 MPa, 57 MPa, and 67 MPa respectively were reached. Thus electrochemical actuators of these designs may be expected to be tolerant to high and abusive stress conditions.

The apparent Young's modulus was measured on these cells in the direction normal to the largest area faces after the isopressing treatments. The cells showed two characteristic slopes in the stress-strain relationship, a lower slope between zero and 5 MPa exhibiting a modulus of 50-60 MPa, and a higher slope above 10 MPa exhibiting a modulus of 220-320 MPa. Clearly, a more compressible component or components of the cells provide for the Lower stiffness, which after compression transfers load to higher modulus constituents. It is also shown that even the lower modulus value is greater than the modulus of ~30 MPa measured in as-received cells prior to preconditioning, thereby demonstrating a benefit of the preconditioning treatment. These results show that there exist regimes of lower and higher stiffness for the multilayer stacked actuators, in which the accessible actuation energy densities may accordingly vary.

Figure 8:
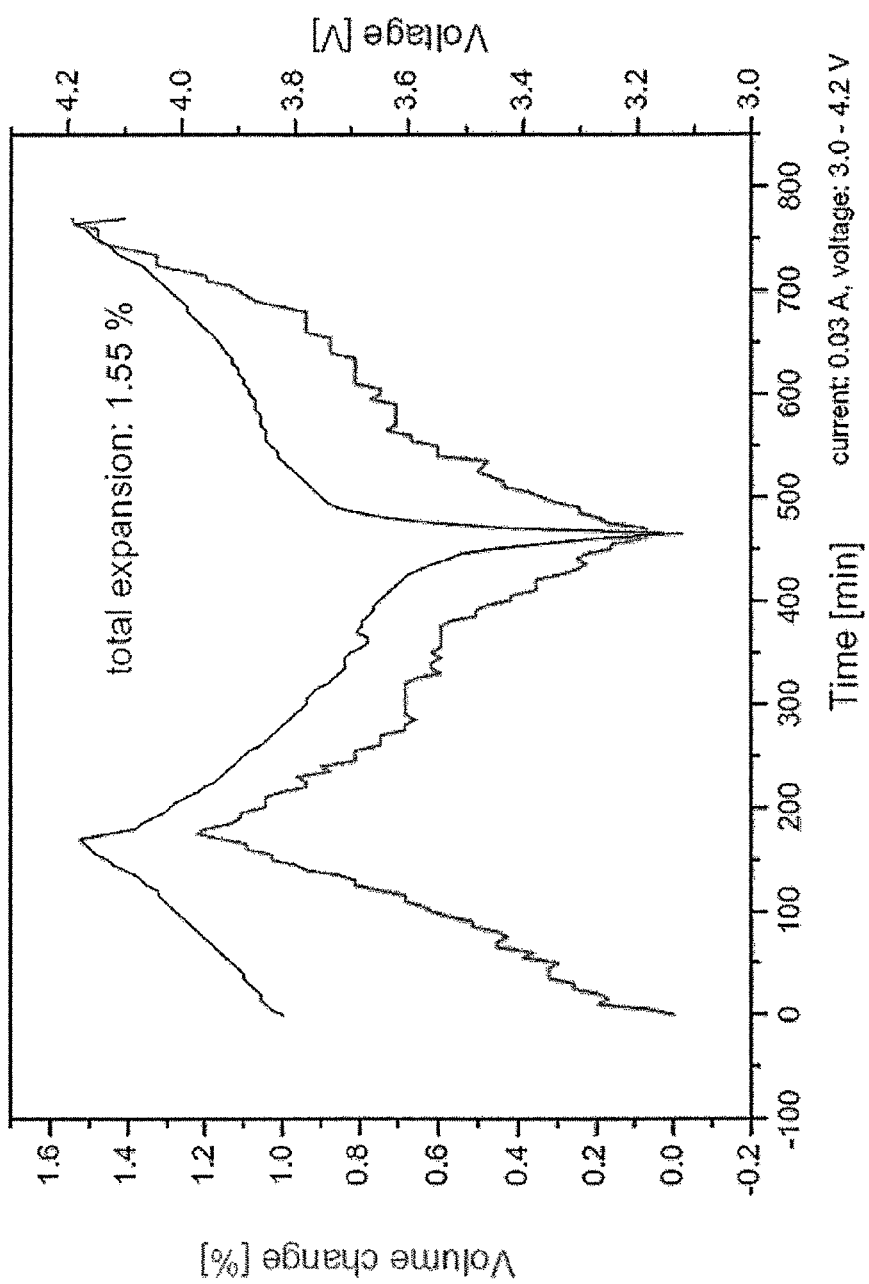
FIG. 8 graphically depicts the volume expansion of an embodiment of a multilayer stacked actuator having 150 mAh charge capacity, measured by fluid displacement.

The volume expansion of the cells was precisely measured in a fluid displacement apparatus. FIG. 8 shows the reversible volumetric expansion of ~1.5% that was measured on a 150 mAh cell. Other cells showed similar values of reversible volume expansion. Thus, these measurements show the capability of electrochemical actuators to perform volume expansion mechanical work as described in multiple embodiments of the present invention. These test results also show that for a multilayer stacked actuator, the expansion is anisotropic, since the volumetric expansion is less than the linear expansion described below. Anisotropic expansion is advantageous for certain applications of electrochemical actuators.

Figure 9:
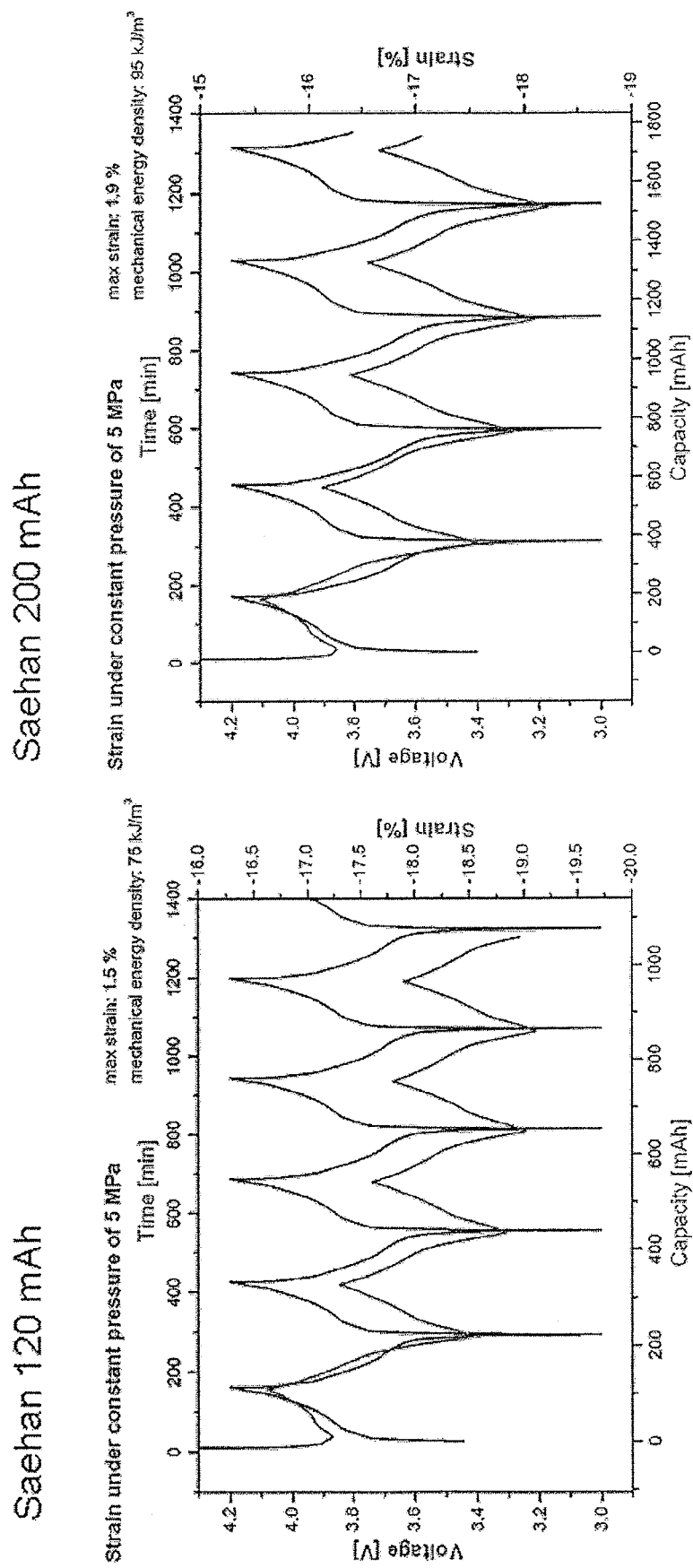
FIG. 9 graphically depicts the cyclic charge/discharge and corresponding strain of two embodiments of multilayer stacked actuators under 5 MPa uniaxial stress.
Figure 10:
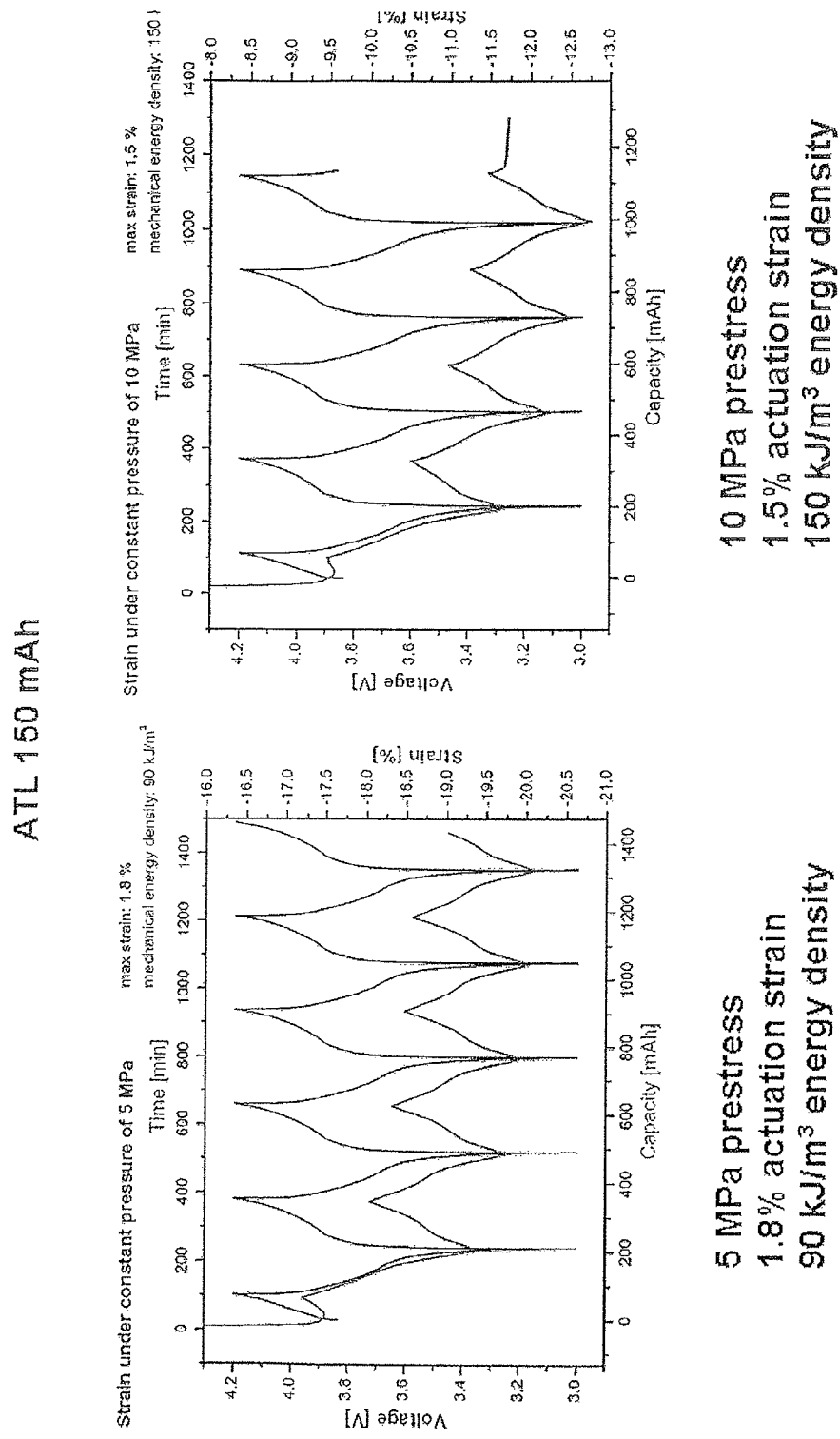
FIG. 10 graphically depicts the cyclic actuation tests of an embodiment of a multilayer stacked actuator at 5 and 10 MPa uniaxial stress.
Figure 11:
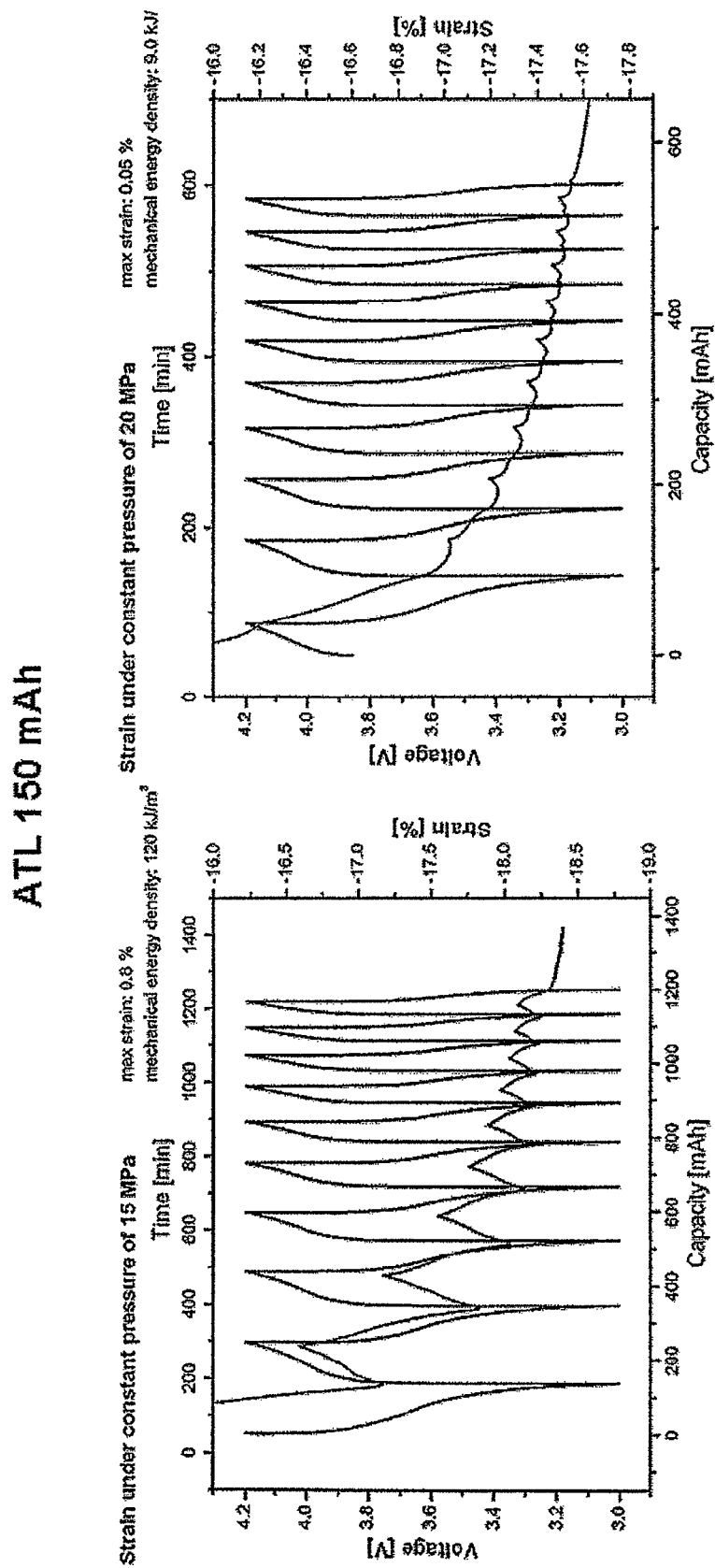
FIG. 11 graphically depicts the cyclic actuation tests of an embodiment of a multilayer stacked actuator at 15 and 20 MPa uniaxial stress.
Figure 12:
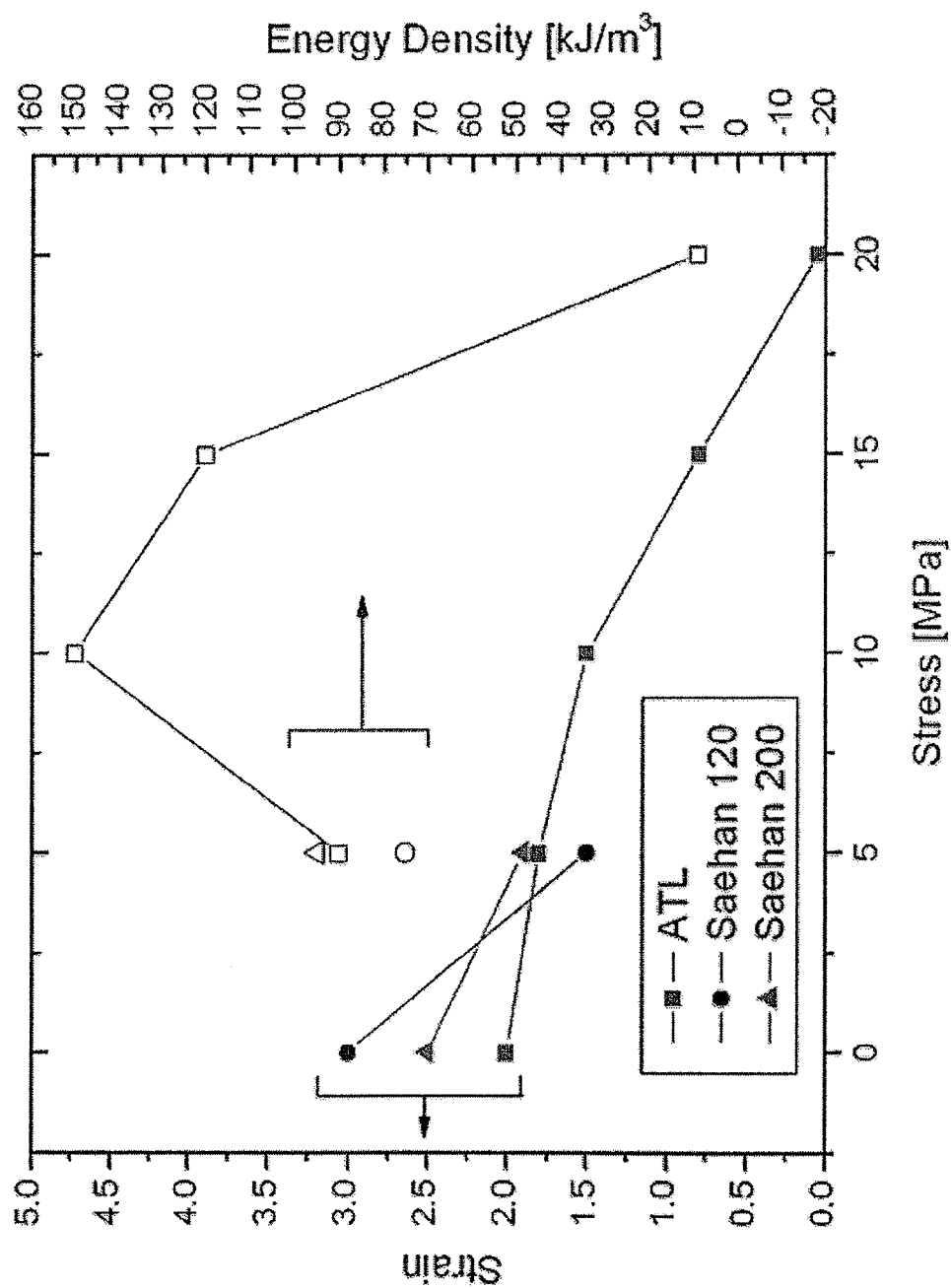
FIG. 12 graphically depicts the strain and energy density of embodiments of multilayer stacked actuators as a function of uniaxial prestress.

The charge-discharge curves, corresponding strain, and strain energy density of these multilayer stacked actuators measured after the preconditioning treatment are shown in FIGS. 9-12. The measurements were made with an Instron apparatus under conditions where a constant stress was applied, and the displacement was allowed to vary, with charging and discharging of the cells at a C/5 rate. In FIG. 9, there was nearly constant cyclic strain on top of creep strain. The capacity remains constant with cycling. 1.5%-1.9% strain and an energy density of 75-95 kJ/m³ was observed. In general, a cyclic strain paralleling the charge-discharge cycle is observed, which is superimposed upon a background creep relaxation as noted earlier. As shown in FIG. 12, at up to about 10 MPa stress, strains of 1.5% or larger are readily obtained, and energy densities increase with applied stress up to 10 MPa, reaching peak values of about 150 kJ/m³. At higher stresses, such as 15 and 20 MPa, actuation strain is diminished but so is the capacity of the cell, indicating that the limiting factor is ion transport rather than the ability of the active material to be charge/discharged under the particular applied stress. It is probable that the higher applied stresses cause the porosity in the separator and/or the particle-based electrodes to be decreased, thereby lowering the rate capability of the cells. Thus, the use of higher modulus separators and electrode constructions as embodied elsewhere in this patent application can allow electrochemical actuation to higher stresses.

Example 4

High Rate Actuation in Multilayer Stacked Electrochemical Actuators

In order to demonstrate that multilayer stacked actuators can exhibit high strains and actuation energy densities with rapid rates of actuation and that substantial actuation performance can be obtained using only partial charge and discharge of an electrochemical cell, a different actuator was used. The cells tested were commercially available $LiCoO_2$-carbon lithium ion cells (Kokam), having a prismatic form factor with dimensions of 59×33.5×5.4 mm$^3$. The cells have a nominal capacity quoted by the manufacturer of 740 mAh and are rated for up to 20 C continuous discharge. They use a microporous polymer separator in an accordion-folded construction alternating layers of the electrodes, as shown for the bottom cell in FIG. 5. An aluminum current collector is used at the positive electrode, and a copper current collector at the negative electrode. Tests were conducted under a constant 2 MPa uniaxial stress.

These cells exhibit actuation strains of about 2% under a 2 MPa constant stress. The cells were cycled at 2.96 A (4 C), 3.70 A (5 C), and 4.44 A (6 C) for five cycles for a specified amount of time (1 min, 2 min, 5 min, 10 min). Between charging and discharging, a 5 minute rest period was used to allow the voltage to relax. Before charging, a constant voltage discharge to 3 V was used to ensure a fully discharged cell, however, a constant voltage hold was not used in the charged state before discharging.

Figure 13:
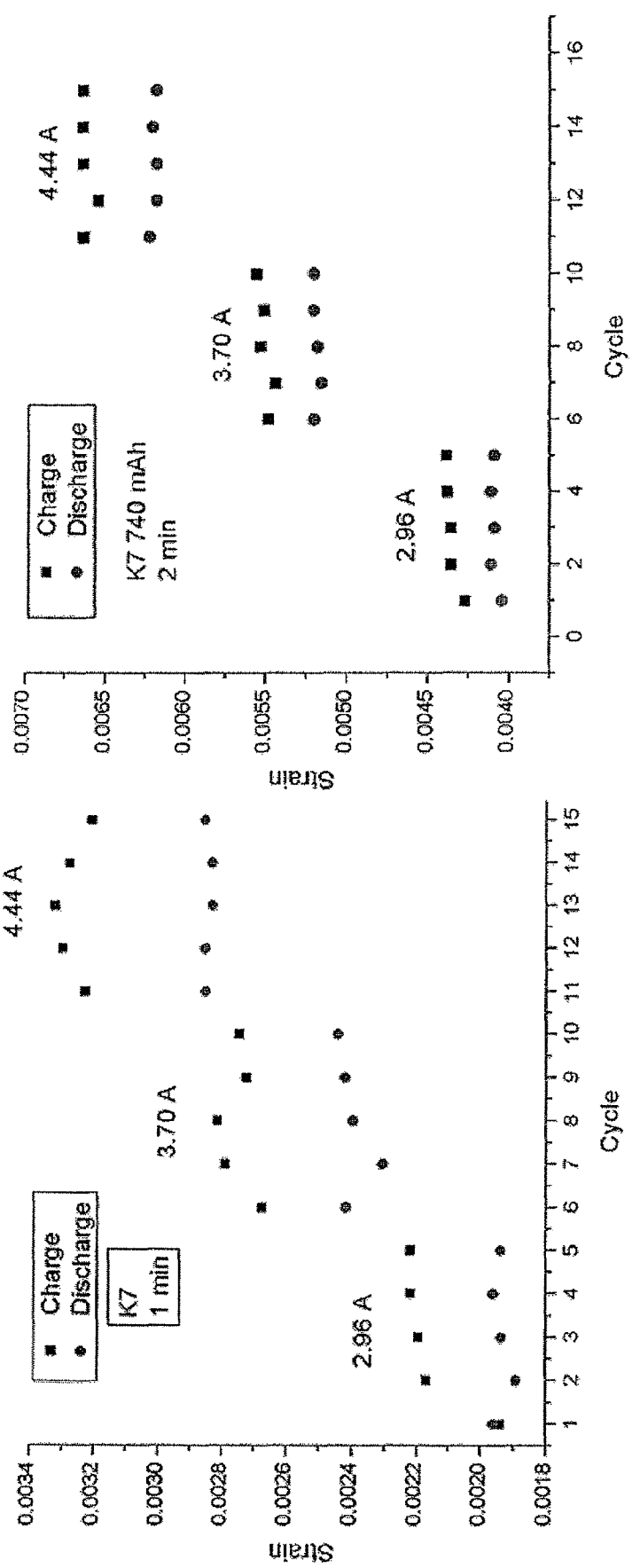
FIG. 13 graphically depicts strain versus cycle number for constant current cycling of an embodiment of a multilayer stacked actuator at the given current for 1 and 2 minutes under 2 MPa constant stress.
Figure 14:
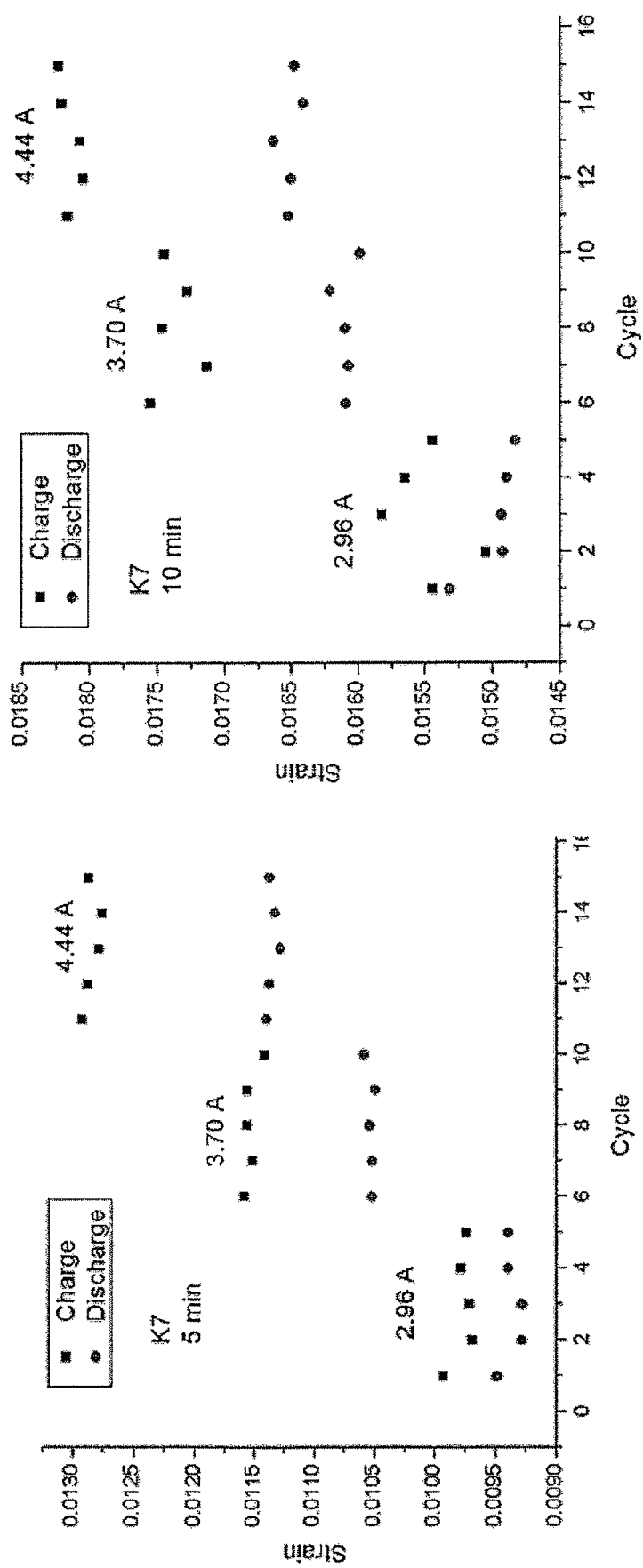
FIG. 14 graphically depicts strain versus cycle number for constant current cycling of a multilayer stacked actuator at the given current for 5 and 10 minutes under 2 MPa constant stress.

FIGS. 13 and 14 show the cyclic actuation strain obtained versus the cycle number, at different values of constant current. At higher currents, more capacity is achieved in the charge/discharge time, and the strain increases. In all of the plots, testing conducted using lower current followed by successively higher current. Note that substantial strains are obtained in very short actuation times, for example at the 4.44 A rate (6 C) rate, 0.3%, 0.65%, 1.25%, and 1.75% strain are obtained in 1, 2, 5, and 10 minutes respectively. FIG. 15 shows the charging actuation strain versus capacity. It is noted that the strain increases monotonically with the capacity to which the cell is charged, such that a desired strain level can be selected by charging for a selected time.

In all cases, that discharge capacity (and strain) is less than charge capacity may be due to differences in the total current passed during the charge and discharge cycles under test conditions, and can be readily adjusted by changing the charge and discharge profile, as described in other embodiments. For this cell, the manufacturer's prescribed charge profile is to use CC-CV at 0.5 C to 4.2 V. However, the fastest charge to any capacity is obtained by a direct constant voltage charge at 4.2 V, with a limiting current set to the maximum rated 14.8 A.

Example 5

Figure 16:
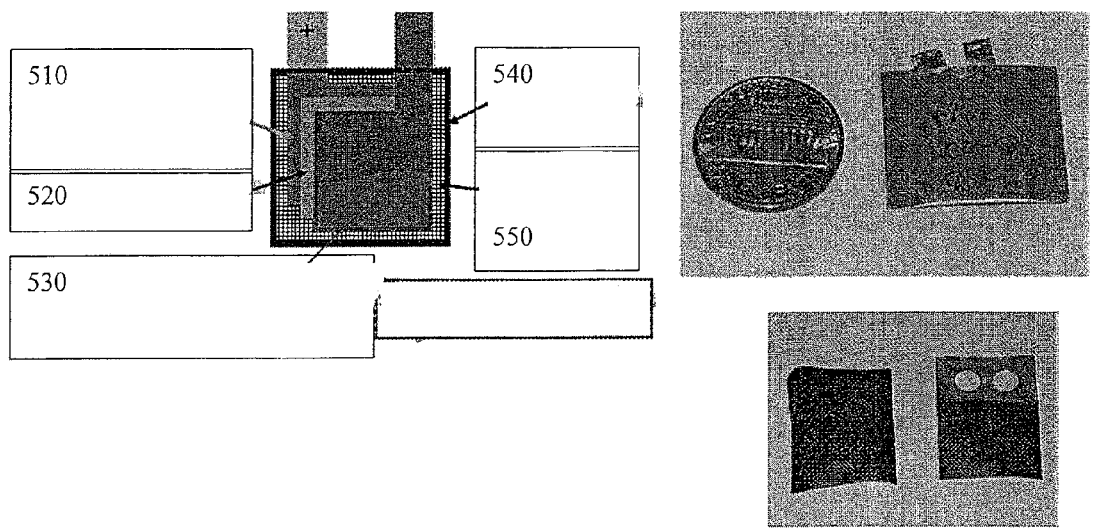
FIG. 16 depicts an embodiment of a bi-layer stacked actuator fabricated from densified single-layer coatings of LiCoO$_2$ and graphite electrodes.

Stacked Actuator from High Density Electrodes $LiCoO_2$-based and graphite-based electrodes of conventional design typical of those used in the lithium ion battery field were used to form a bi-layer stacked actuator, shown in FIG. 16. This actuator differs from those in preceding examples which have used commercially available cells in that the electrode formulation has been selected according to methods well-known to those skilled in the art to provide a higher packing density and a higher stiffness. Accordingly, the completed actuator exhibits higher stiffness and lower viscoelastic relaxation than in the preceding examples. In addition, the negative electrode uses a platelet graphite which during processing takes on a preferred crystallographic texture with the c-axis preferentially aligned in the desired actuation direction. Consequently, the strains obtained are greater than in the commercially available cells, and may be greater than expected for the $LiCoO_2$-graphite system under the conditions where the graphite is not preferentially aligned.

The electrodes were prepared by coating a formulation incorporating a powder of the respective active material, a polymer binder, and a conductive carbon additive, dispersed in an organic solvent. The $LiCoO_2$ coating (510) was applied to one side of an aluminum foil current collector (570) while the graphite coating (530) was applied to one side of a copper foil current collector (560). The Al was laminated on a polymer film. The $LiCoO_2$ on Al foil had the following properties: 125 um, 55 vol %, ~1 cm×~1 cm. The graphite on Cu-foil had the following properties: 85 um, 70.3% vol %, ~1 cm×~1 cm. After drying and pressing, a cell was assembled as shown in FIG. 16. A conventional polymer separator (520) was used, and a conventional organic carbonate electrolyte (LP30) (550) was used. The active thickness of the electrode was 210 um and the total thickness was ~0.6 mm. The measured electrode modulus is ~100 mPa (14.5 ksi).

Figure 17:
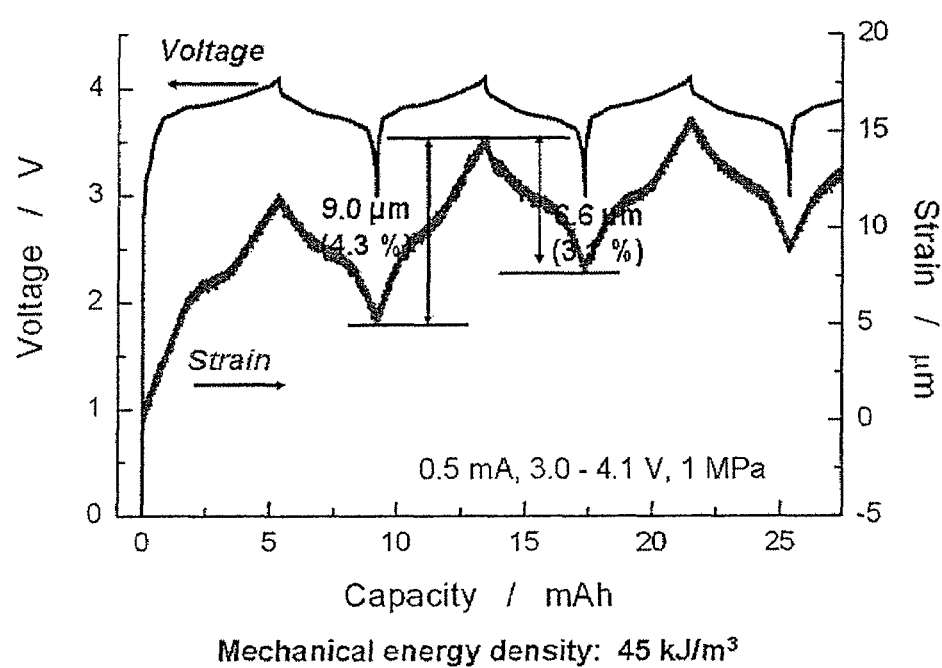
FIG. 17 graphically depicts a charge-discharge voltage curve and corresponding strain measured in an embodiment of a bi-layer stacked actuator under 1 MPa constant prestress. Measured strain is 3-4% and actuation energy density is ~45 kJ/m$^3$.
Figure 18:
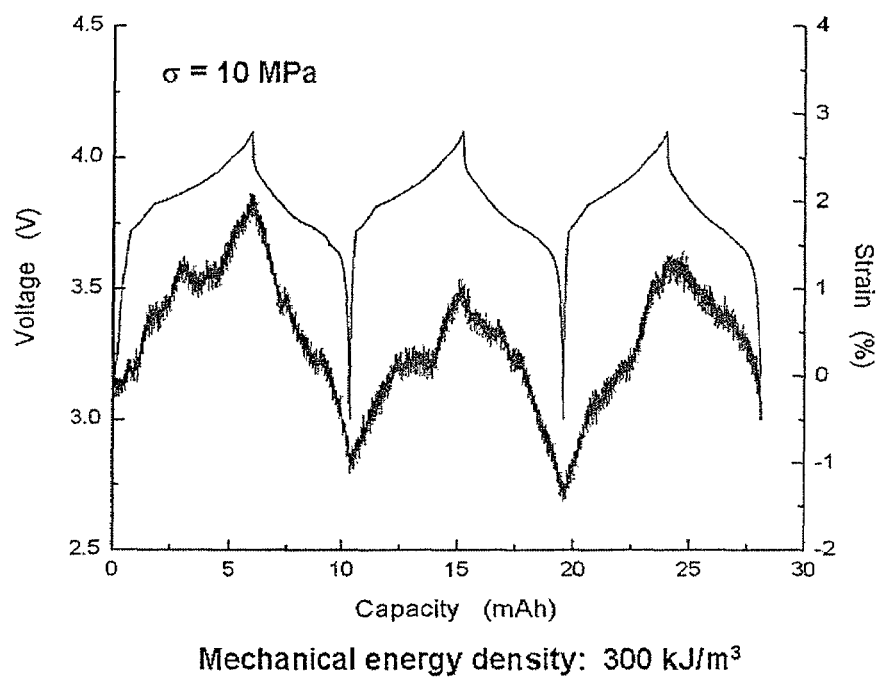
FIG. 18 graphically depicts a charge-discharge voltage curve and corresponding strain measured in an embodiment of a bi-layer stacked actuator under 10 MPa constant prestress. Measured strain is 2.5-3% and actuation energy density is ~300 kJ/m3.
Figure 19:
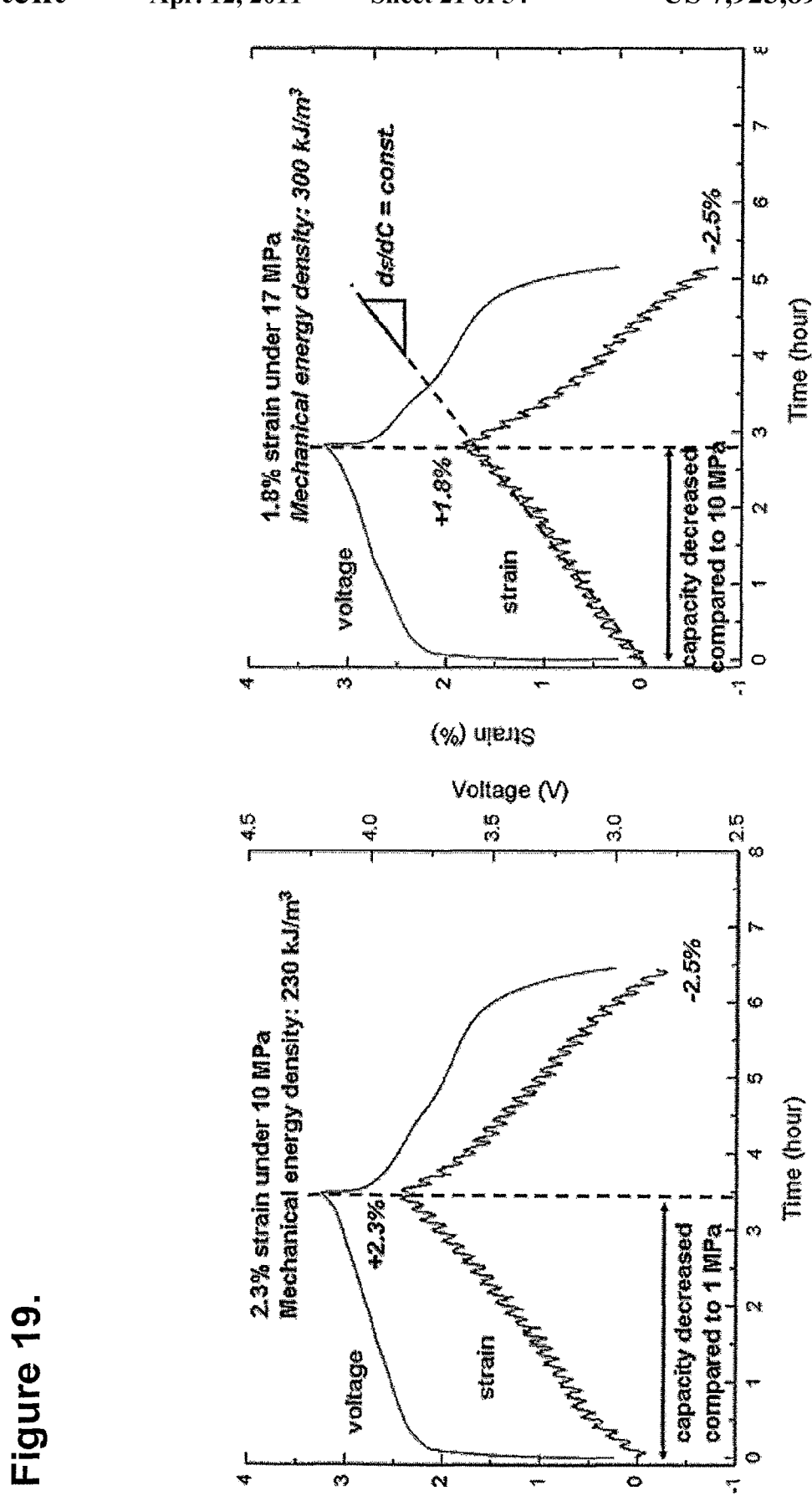
FIG. 19 shows actuation strain versus charge/discharge for an embodiment of a bilayer stacked actuator, at 10 and 17 MPa applied uniaxial stress.

FIGS. 17 and 18 show the charge-discharge voltage curves and the corresponding strain measured in this cell, measured under 1 MPa and 10 MPa pre-stress respectively. Under 1 MPa pre-stress, FIG. 17, a strain of 3-4.3% was observed, corresponding to an actuation energy density of ~45 kJ/m3. Under 10 MPa prestress, FIG. 18, a strain of 2-3% was observed, corresponding to an actuation energy density of ~300 kJ/m3. FIG. 19 shows results from another actuator of the same type, tested under 10 MPa and 17 MPa uniaxial applies stress. In this instance, 2.3% and 1.8% strain, and 230 kJ/m$^3$ and 300 kJ/m$^3$ energy density, are obtained respectively at 10 and 17 MPa. It is further noted that under 17 MPa, the rate of strain with capacity is the same as at the lower pressures even though the total strain is less, which indicates that the full capacity of the cell is not reached for kinetic reasons such as the compression of porosity in the polymer separator, but that the active material has not substantially changed its actuation performance. It is understood that with improvements in design as described in other embodiments, still higher strains and strain energy densities may be obtained from actuators using electrodes of this type.

Figure 20:
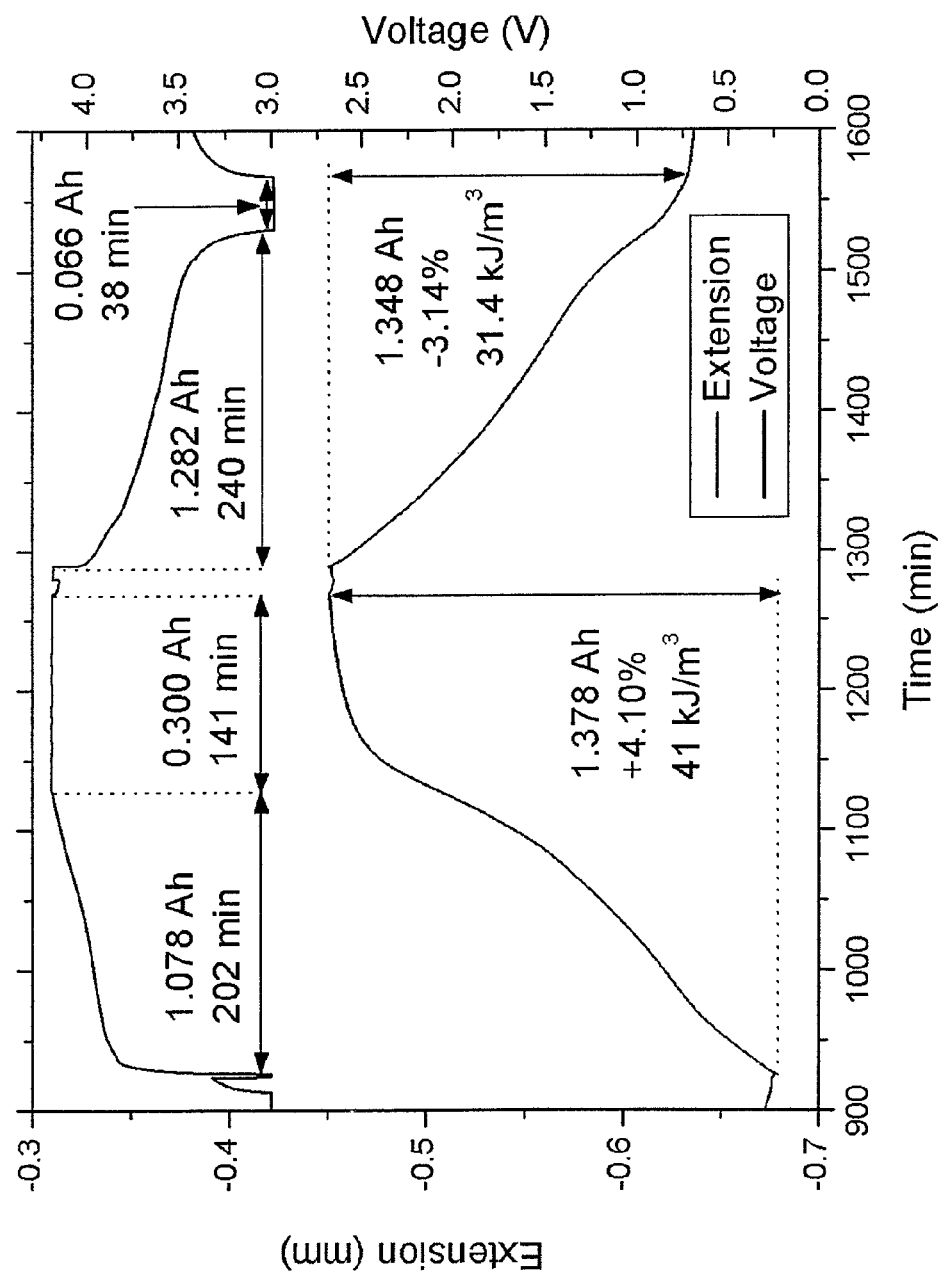
FIG. 20 shows strain versus charge and discharge at 1 MPa stress in an embodiment of a multilayer actuator, 6 mm thick, utilizing high density electrodes and a microporous polymer separator.
Figure 21:
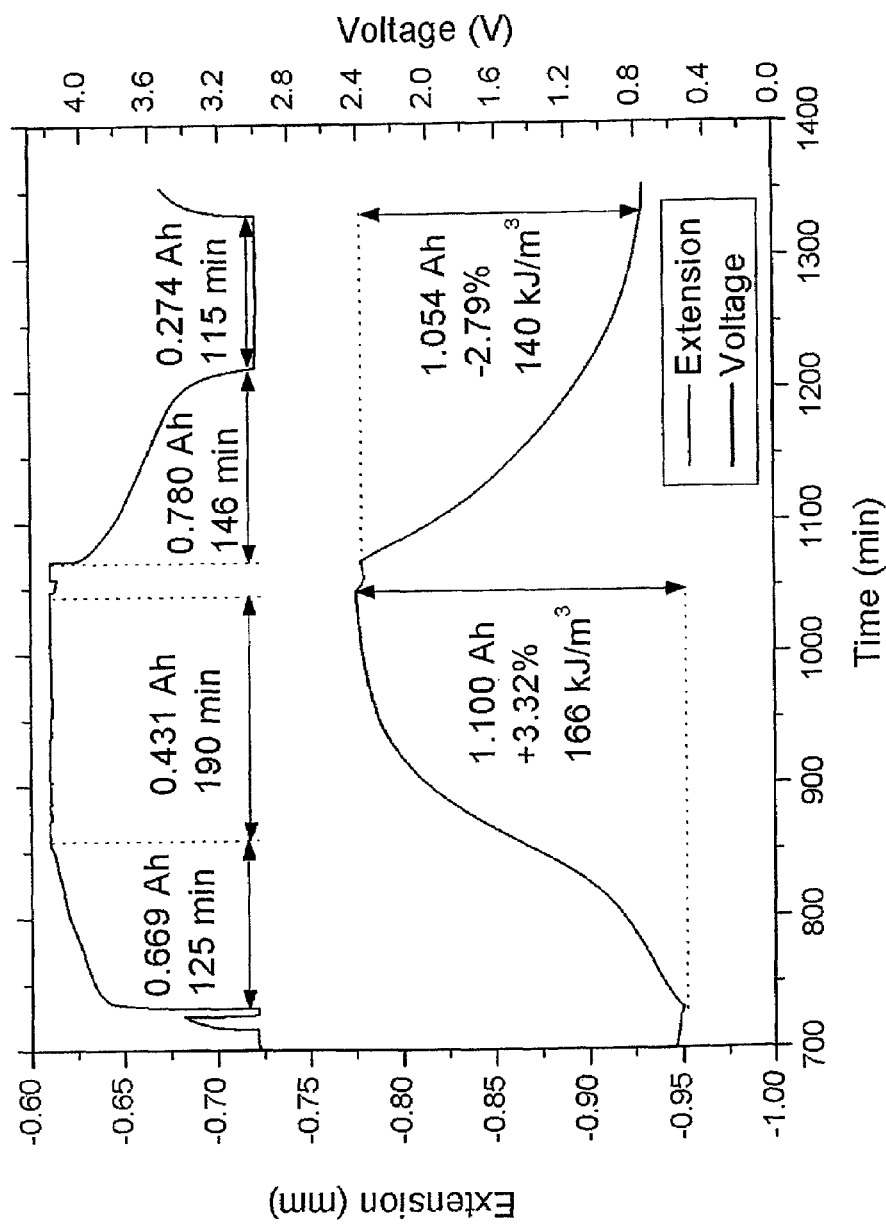
FIG. 21 shows strain versus charge and discharge at 5 MPa stress in an embodiment of a multilayer actuator, 6 mm thick utilizing high density electrodes and microporous polymer separator.
Figure 22:
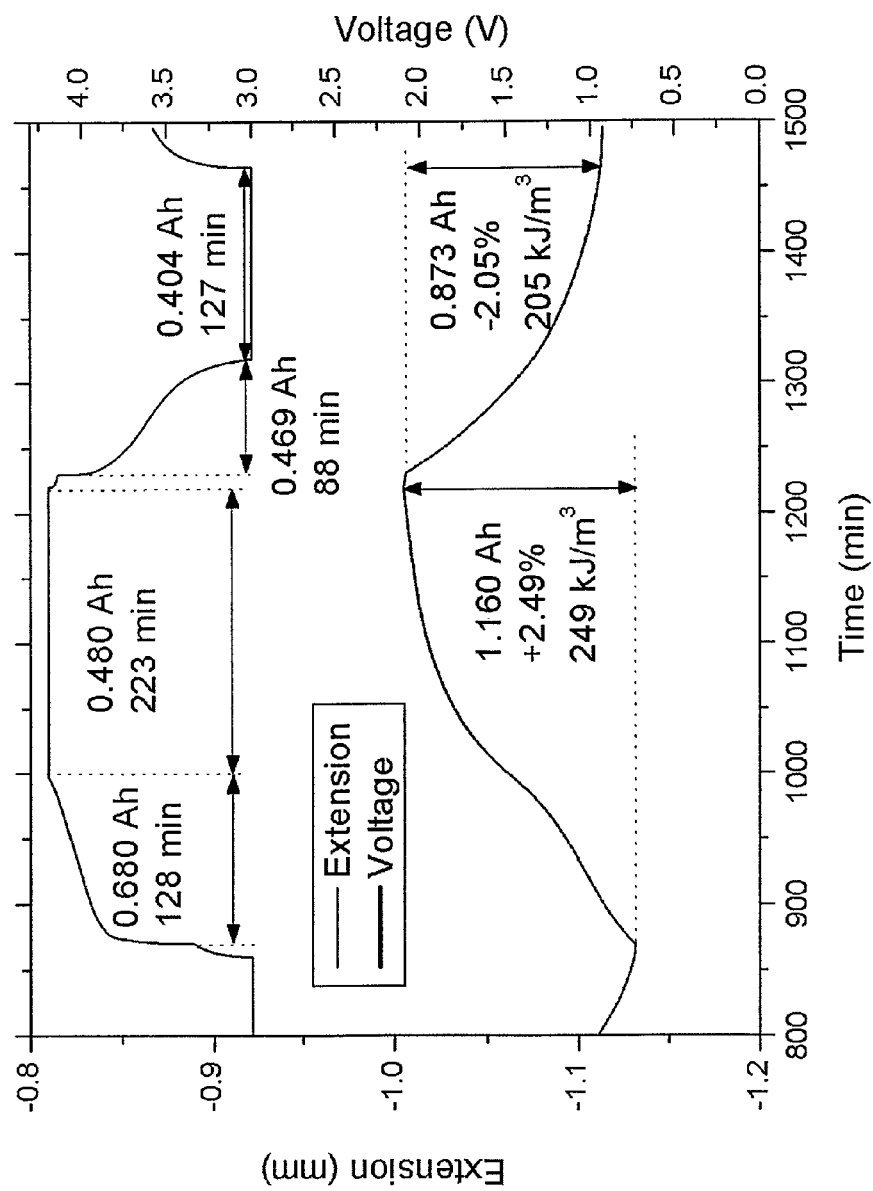
FIG. 22 shows strain versus charge and discharge at 10 MPa in an embodiment of a multilayer actuator, 6 mm thick, utilizing high density electrodes and microporous polymer separator.

The electrodes of this example were further coated on both sides of their respective current collector foils and assembled into a multilayer stacked actuator having a thickness of about 6 mm. These cells were tested under varying prestress levels, using a so-called CCCV profiles in which the voltage range was 3.0-4.2V, and a constant C/5 current was applied until the 4.2 charge voltage or 3.0 discharge voltage was reached, at which point the voltage was held constant until the current decayed to less than C/50. A 10 minute rest at constant voltage and zero current was also conducted between charge and discharge portions. FIGS. 20 to 22 show the strain obtained under 1, 5 and 10 MPa stress, at corresponding portions of the charge-discharge curve. Note that at 1 MPa, a high strain of 4.1% is obtained. At 10 MPa, the strain is still 2.5%, and the corresponding energy density is 249 kJ/m$^3$. Here also, the capacity of the cell decreases with increasing stress, showing that it is charge/discharge kinetics that are limiting the achieved strain and mechanical energy density and not the intrinsic capability of the active materials used.

Example 7

Segmented Multi-Element Electrochemical Actuator

Figure 23:
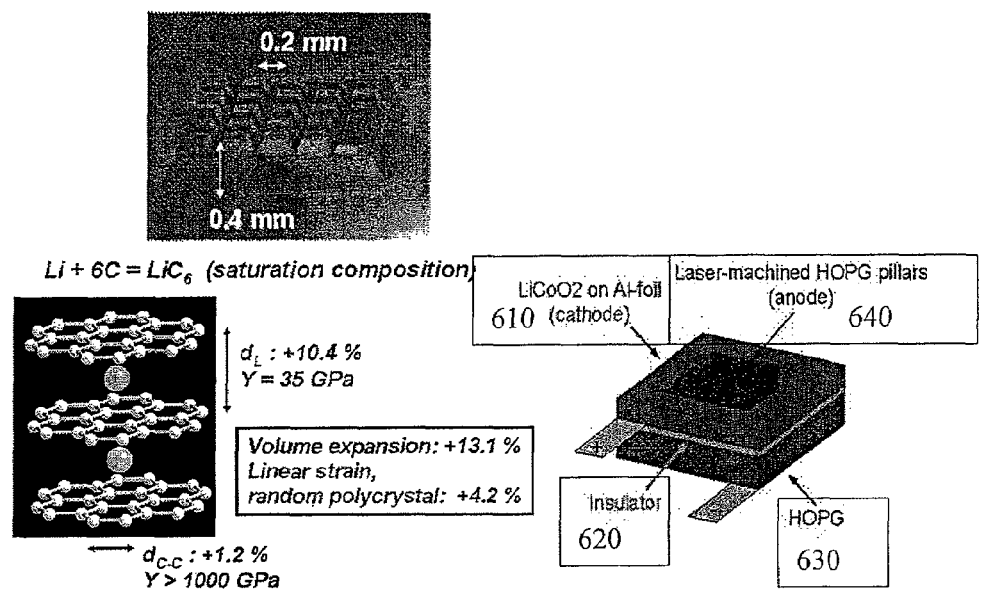
FIG. 23 depicts an embodiment of an actuator comprising multiple square posts laser-micromachined from electrochemical actuation material, here highly oriented pyrolytic graphite (HOPG) with the c-axis direction aligned with the post axis (longitudinal direction). An LiCoO$_2$ lithium source is placed adjacent to HOPG posts allowing intercalation of the graphite in the transverse direction, in this embodiment.

Highly oriented pyrolytic graphite (HOPG), which is a near-single-crystal form of graphite, was used as the actuation material. The direction of actuation was selected to be normal to the graphene sheets, namely along the c-axis of graphite, as shown in FIG. 23. Along this direction, the free strain of graphite is 10.4% and the Young's modulus is 35 GPa. In order to have high mechanical loading along this direction while intercalating ions transverse to this direction, the HOPG was laser-machined into a square array of 25 square posts, each of 0.2 mm×0.2 mm dimension at the top, and 0.4 mm height. Lithium was used as the ion intercalant. A conventional $LiCoO_2$ composite electrode on aluminum foil current collector was assembled proximally to the HOPG posts as shown in FIG. 23. The two electrodes were separated by an insulating polymer separator film, and packaged in polymer sheet as shown for the actuator in FIG. 16.

Figure 24:
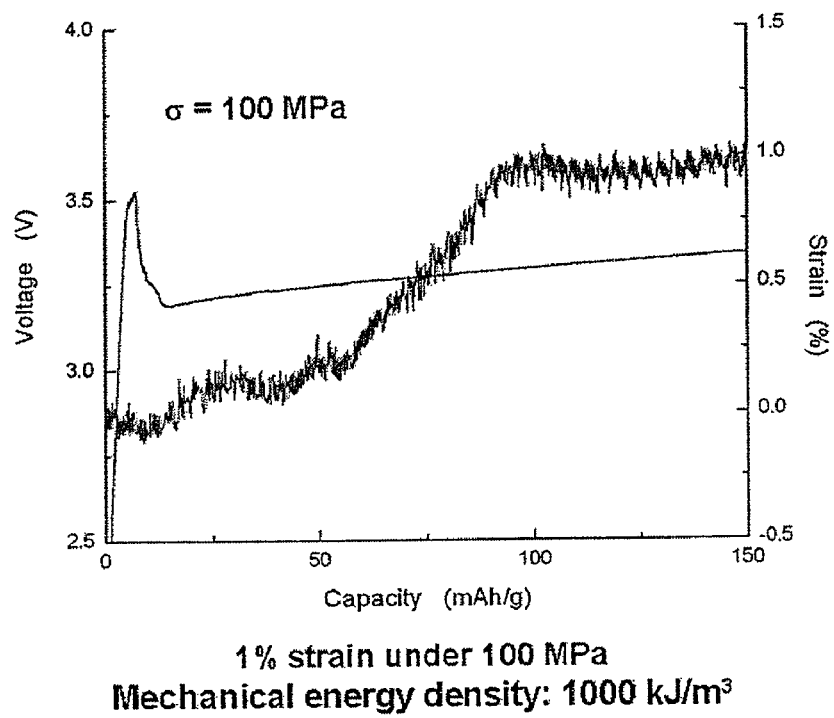
FIG. 24 graphically depicts the actuation strain measured upon intercalation of lithium into one embodiment of an HOPG-based actuator under 100 MPa constant pre-stress. Actuation energy density is ~1000 kJ/m$^3$.

FIG. 24 shows the actuation strain of this actuator under 100 MPa pre-stress. While only partial lithiation of the graphite was achieved, the resulting strain was ~1%, yielding an actuation energy density of ~1000 $kJ/m^3$. This is more than 10 times the typical actuation energy density of a PZT piezoelectric actuator.

Figure 25:
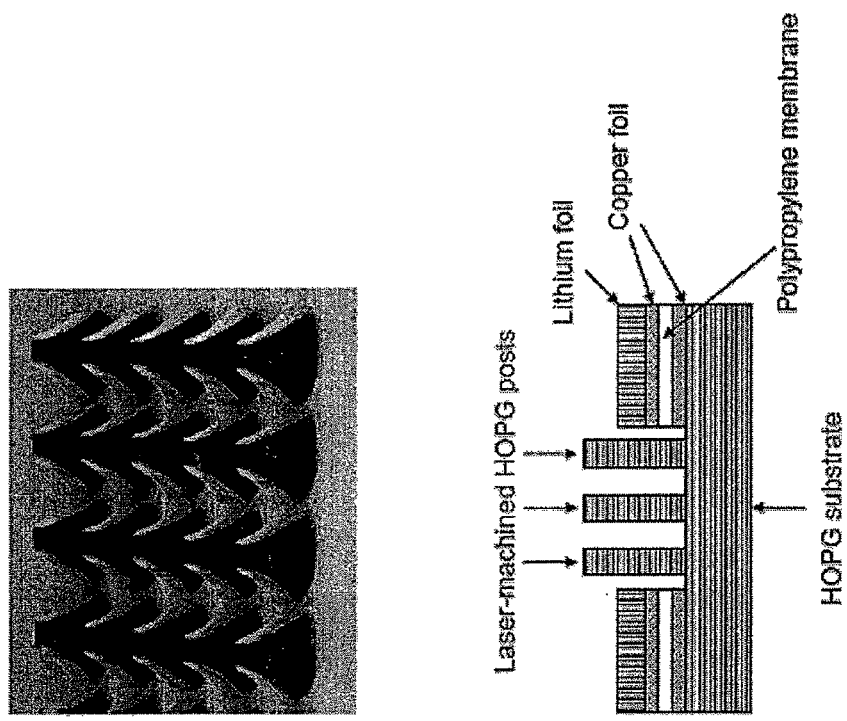
FIG. 25 is an SEM image of an array of posts machined in a piece of HOPG forming active elements of an embodiment of an electrochemical actuator, and schematic side view of the actuator assembly.

In another actuator of this type, an array of small posts was carved from a piece of HOPG, which was 1 cm square and 1 mm thick, by laser micromachining. The dimensions of the posts were 0.2 mm square at the top and 0.7 mm square at the bottom, and the height was 0.4 mm. The surface of the substrate part and that at the top of the posts were parallel to the graphite layers. A SEM image of the sample is shown in FIG. 25.

A three layer assembly of copper foil, polypropylene membrane and another copper foil was attached on the substrate, surrounding the HOPG posts. The lower copper foil was attached on the surface of the substrate part. Lithium foil was put on the upper copper foil and used as a counter electrode. The polypropylene membrane insulated the two copper foils. FIG. 25 schematically shows the cross-section of the sample. The sample was sealed in a bag of aluminum-laminate film filled with liquid electrolyte. The electrolyte used was 1.33 M $LiPF_6$ dissolved in a mixed solvent of ethylene carbonate, propylene carbonate, dimethyl carbonate, and ethyl methyl carbonate (4:1:3:2 by volume). The sample was measured in a strain apparatus in which various preloads could be applied along the normal to the surface. The sample was cyclically charged and discharged, and the change in thickness was simultaneously measured by a precision displacement transducer equipped on the apparatus.

Figure 26A:
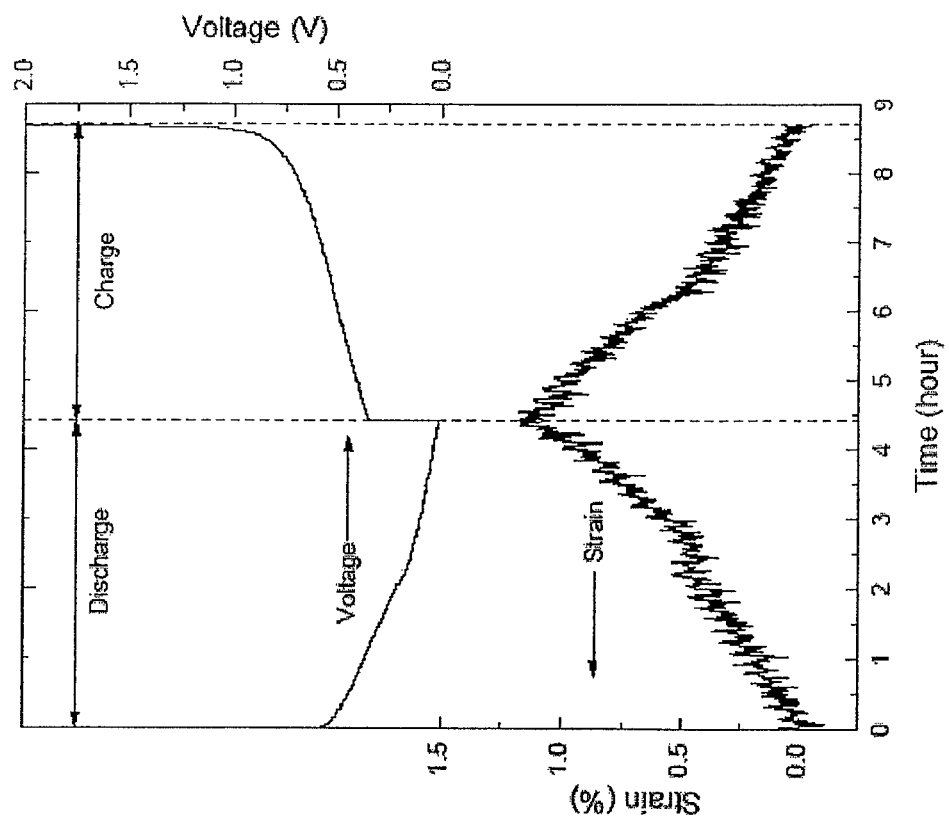
FIG. 26 shows strain versus discharge/charge voltage for an HOPG actuator under 100 MPa applied stress (1 metric ton per cm2) (A), and strain versus charging voltage for an HOPG laser micromachined actuator under 50 MPa applied stress (B).

FIG. 26 shows strain and voltage as functions of time during a charge-discharge cycle by a constant current of 0.4 mA under a mechanical preload of 100 MPa. The sample was first discharged until voltage became less than 0.01 V, then it was charged until voltage became more than 2 V. The curves clearly show that the strain was induced by the charge and discharge. The linear strain is 1.2% during the discharge, and this corresponds to a mechanical energy density of 1,200 $kJ/m^3$.

In another sample of this type, a layer of HOPG was bonded to an alumina plate. A piece of HOPG, which was 5 mm square and 0.4 mm thick, was first bonded to an alumina substrate, which was 12 mm square and 0.6 mm thick, with 25 μm thick copper foil at 650° C. for 1 hour in vacuum under a stress of 50 MPa. The HOPG piece was bonded so that the graphite layers were parallel to the surface of the substrate. An array of small posts was carved from the HOPG part by laser micromachining. The dimensions of the posts were 0.2 mm square at the top and 0.35 mm square at the bottom, and the height was 0.4 mm.

A triple layer of copper foil, polypropylene membrane and another copper foil was attached on the substrate, surrounding the HOPG posts. The lower copper foil was attached to the copper layer that was used to bond the HOPG part. Lithium foil was put on the upper copper foil and used as a counter electrode. The polypropylene membrane insulated the two copper foils. The sample was sealed in a bag of aluminum-laminate film filled with liquid electrolyte. The electrolyte used was 1.33 M $LiPF_6$ dissolved in a mixed solvent of ethylene carbonate, propylene carbonate, dimethyl carbonate, and ethyl methyl carbonate (4:1:3:2 by volume). The sample was measured in a strain apparatus in which various preloads could be applied along the normal to the surface. The sample was cyclically charged and discharged, and the change in thickness was simultaneously measured by a precision displacement transducer equipped on the apparatus.

Figure 26B:
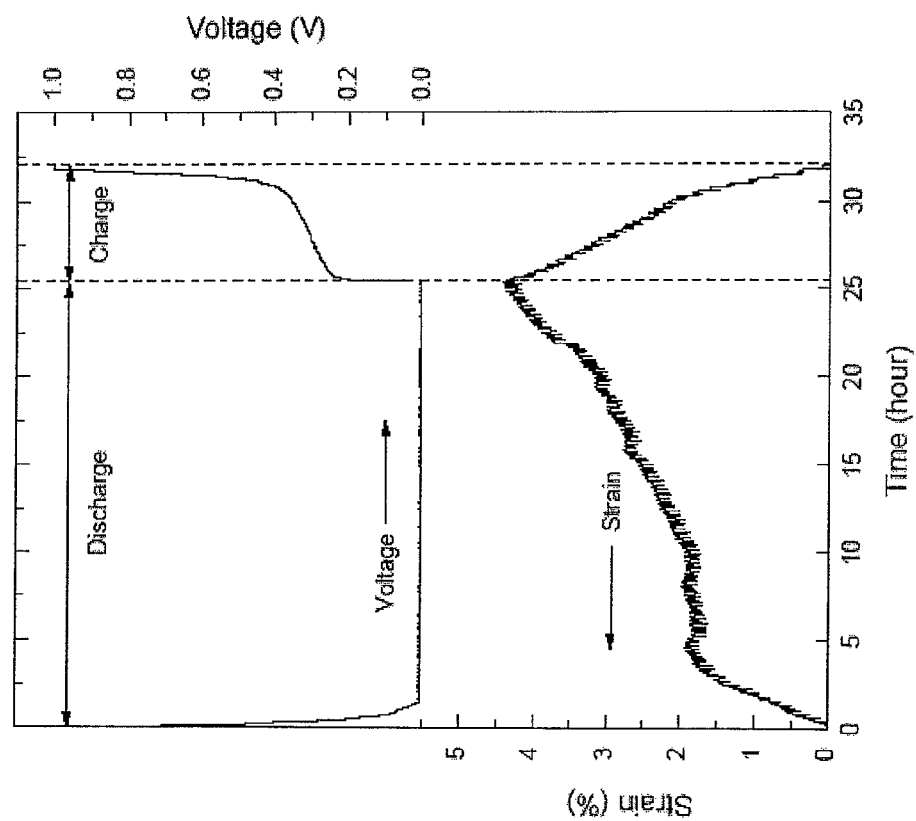

FIG. 26B shows strain and voltage as functions of time during a charge-discharge cycle under a preload of 30 MPa. The sample was discharge at a current of 0.05 mA until voltage became 0.01 V, followed by additional discharge at a voltage of 0.01 V until the current decayed to less than 0.005 mA. Then, it was charged at a current of 0.05 mA until the voltage became more than 1 V, followed by additional charge at 1 V until the current decayed to less than 0.005 mA. The linear strain is 4.3% during and mechanical energy density is 1,290 $kJ/m^3$.

It is understood that with engineering improvements well-understood to those skilled in the art of electrochemical materials and devices, greater intercalation and greater corresponding strain is achievable. For example, the width of the posts may be narrowed in order to increase the extent of lithiation under a given current rate. At complete lithiation giving ~10% linear expansion, the actuation energy density under 100 MPa pre-stress is 10,000 $kJ/m^3$.

Figure 27:
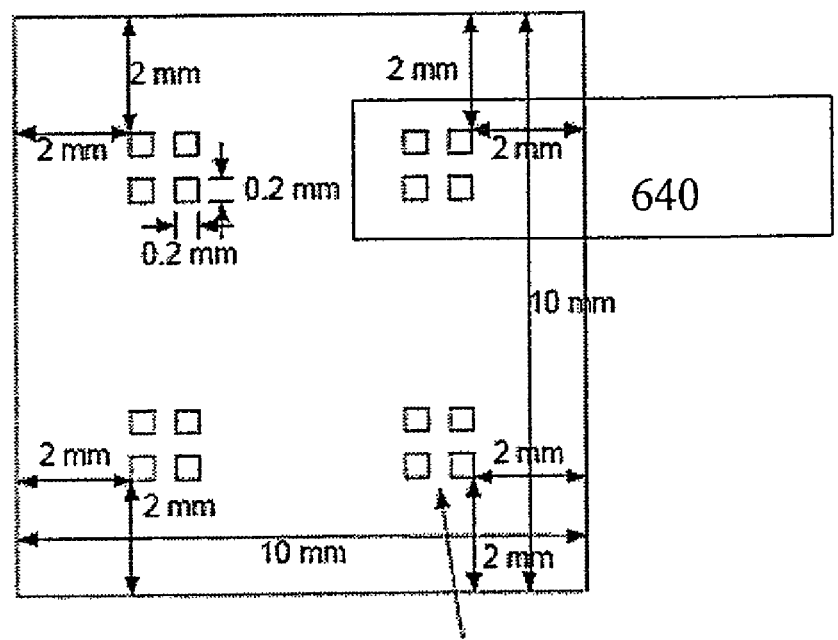
FIG. 27 schematically depicts an embodiment of an alternate post design for a multi-post actuator.
Figure 27:
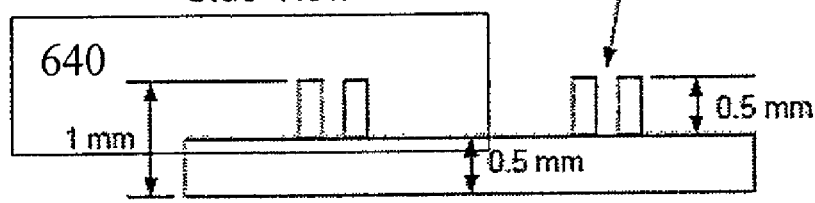

It is also understood that many segmentation patterns may be applied to this basic actuator design to improve load-bearing and intercalation. FIG. 27 shows one alternative design in which the posts are more widely spaced so as to distribute the load over a larger macroscopic area, in which instance the lithiation source may be placed between the load-bearing posts.

Example 8

Large Stroke Electrochemical Lever Actuator

Large stroke electrochemical lever actuators may be prepared, and represent additional embodiments of the invention. A lever and fulcrum mechanism are used to amplify the induced strain of multilayer electrochemical actuators, hereafter referred to as the "active elements" to distinguish from the actuator, which comprises these as well as a mechanical assembly and optionally other sensors and controls for controlling the performance of the actuator. This actuator benefits from a simple amplification mechanism, easy method of applying prestress at the actuator output, and an ideal and compact form factor for placing the actuator in small spaces, exemplified by, but not limited to, such applications as actuating a rotor blade spar for trailing edge or rotor blade twisting actuation, deploying flaps in aircraft, watercraft, and land vehicles, deforming a mirror in an adaptive optical device, deploying solar panels in a satellite, latching or unlatching a door or lid, or opening and closing a valve.

Measurements of displacement under preload, actuation force, and device stiffness have been conducted on the ELA. The results show that actuators based on this approach are capable of performing significant mechanical work. The mechanical performance of the electrochemical lever actuator (ELA) was characterized using different kinds of active elements. The results show that electrochemical actuators based on solid state active compounds should be attractive for applications where high strain, high energy density and high actuation authority are desirable.

Figure 28:
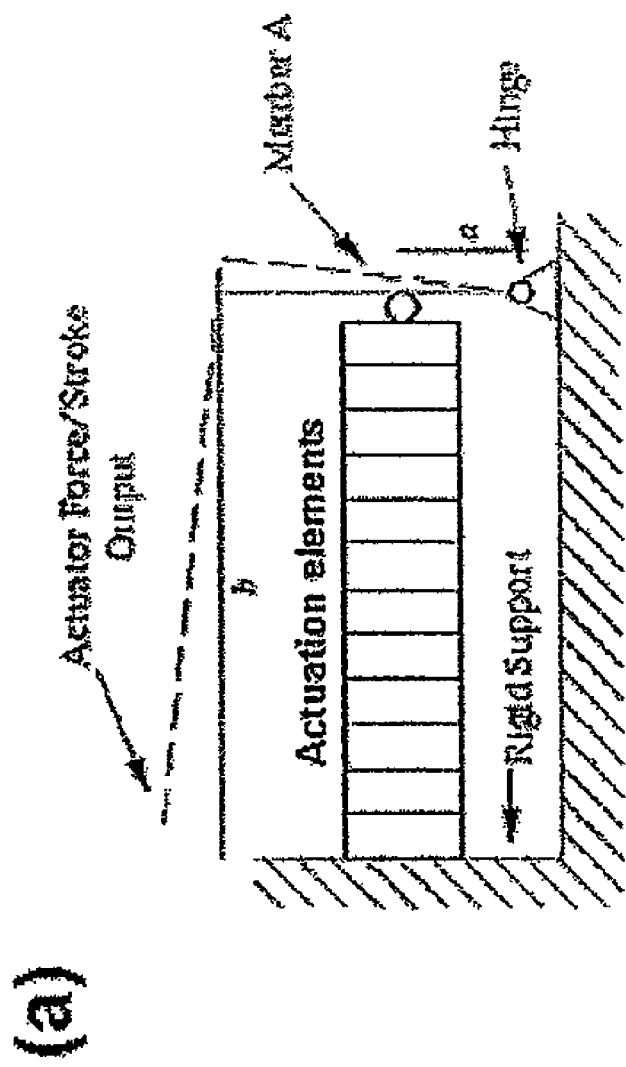
FIG. 28 schematically depicts an embodiment of a large stroke electrochemical lever actuator.
Figure 29:
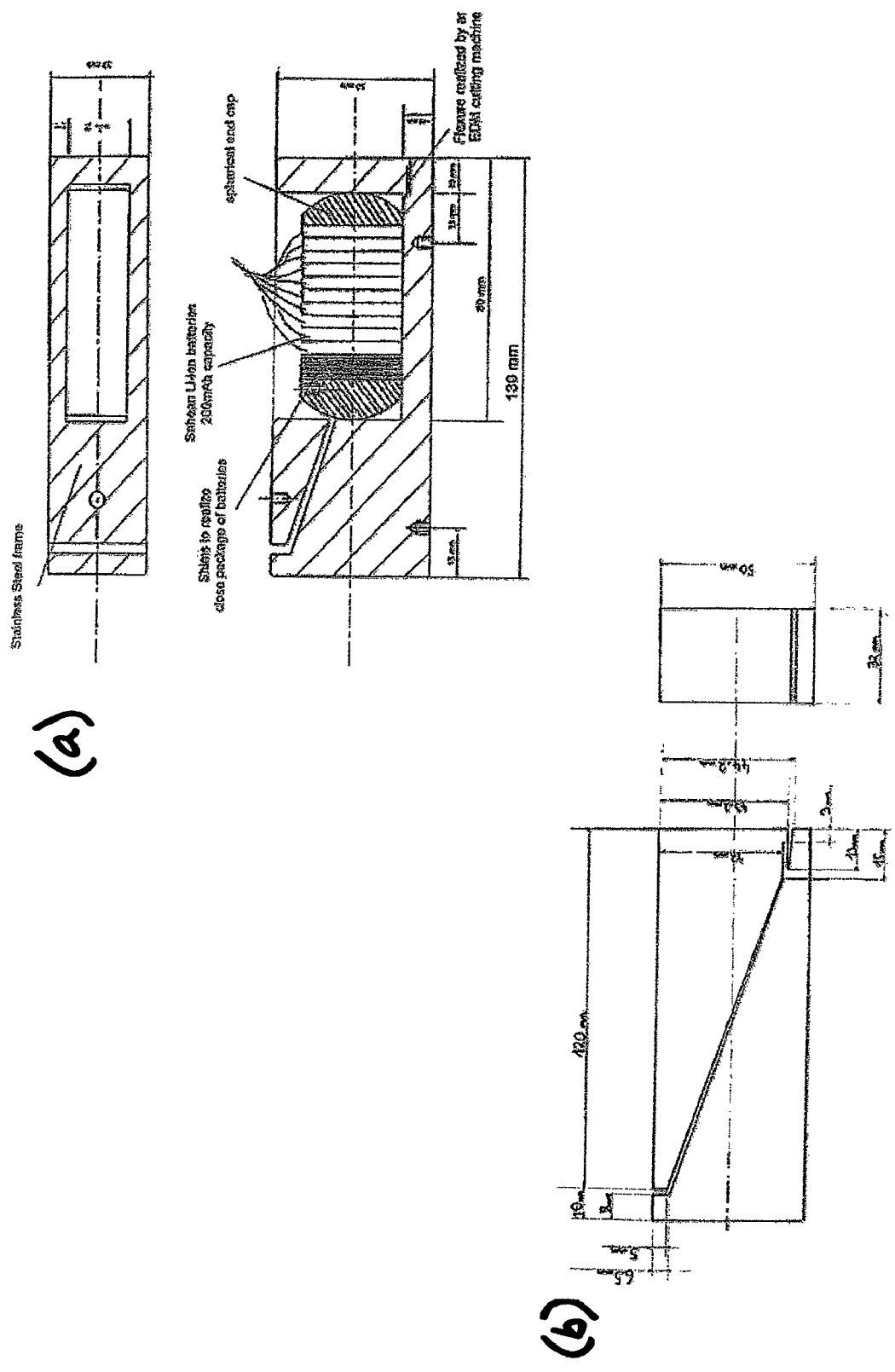
FIG. 29 schematically depicts an embodiment of a large stroke electrochemical lever actuator.

The design of the ELA is shown schematically in FIG. 28a, and with dimensional details in FIGS. 29a and 29b. While an actuator of similar design in which piezoceramics are used as the active materials is available commercially for micropositioning applications (Physik Instrumente, there are, in some embodiments, functional advantages in using electrochemical actuation elements in an actuator of this type, including but not limited to the ability to generate much larger stroke. Referring to FIG. 28a, the amplification ratio, given by the ratio of the displacement at the actuator output relative to the displacement of the active elements (here a stack of individual elements), is given by b/(a/2). The actuator of the example was designed to have an amplification ratio of six.

A stiffness analysis illustrates advantages of the present actuator compared to comparable piezo-powered devices. As shown by E. F. Prechtl and S. R. Hall (Design of a high efficiency, large stroke electromechanical actuator, MIT, Cambridge, Mass. 1998), to obtain the highest coupling efficiency the stiffness of the expansive element, in this case the active elements, should be much lower than the stiffness of the coupler, in this case the elastic flexure. This is readily accomplished in the present case since, as shown in preceding examples, electrochemical actuators can be fabricated with stiffness much lower than that of many structural metals, ceramics, and composites. In addition, in order to reduce performance losses due to bending in the lever arm, the bending moment in the flexure should be low compared to the bending moment in the lever arm. These considerations led to the design shown in FIG. 27.

Although the flexure can in principle be fabricated from numerous materials, in this example the frame was constructed of stainless steel with a Young's modulus of E=170 GPa. This frame, having outer dimensions 130 mm×32 mm×50 mm, transmits the load from the actuation elements to the actuator output. A cavity of dimensions of 80 mm×20 mm×40 mm was machined in the frame to accommodate the actuation elements. The flexure having the dimensions in FIG. 27 was then realized by making a series of precision wire-EDM (Electric Discharge Machining) cuts (Model: ROBOFIL240CC from Charmilles Technologies SA).

End caps were made of the same stainless steel as the support frame. They have a spherical surface with a radius of 20 mm and a thickness of 15 mm for one end cap and 10 mm for the other. The radius of the end caps can also be increased to reduce Hertzian losses at the contacts. Shims were also made of stainless steel in thicknesses from 0.1 mm to 0.8 mm and were used to fulfil the preload methodology of the ELA.

A preload is applied easily at the actuator output, see FIG. 27. A compressive preload is necessary to eliminate mechanical backlash, and to maximize the actuator force and stroke output. When the electrochemical active elements exhibit creep strain under load, shims can be used between the end caps and the actuator element stack to ensure that the creep strain is taken up under compressive preload.

A multitude of tests were conducted to characterize the performance of the ELA, using actuator elements of prismatic form factor similar to those discussed in preceding examples. Displacement tests were carried out with different compressive preloads. The preload was applied with an Instron apparatus (Model 5550 and Bluehill control software) at a load rate of 460 N/h for most tests. After a desired peak preload value was reached, a rest period was used to allow for creep deformation of the active elements. The active elements were connected in parallel and simultaneously charged and discharged for multiple cycles at various rates, using the CCCV protocol. The amplified displacement at the actuator output was measured by the Instron crosshead, using a test rod with a spherical surface of 5 mm diameter made of tungsten was used to transmit the induced displacement and load from the actuator output to the strain gage and the load cell of the Instron crosshead.

For example, the output strain measured under a load of 270N results in a stress of 4 MPa on the active elements. The output average displacement during charging is 3.42 mm, and for discharging is 3.72 mm, approximately an order of magnitude greater than can be expected from a lever actuator using piezoceramic elements. With these values and the amplification factor we calculate a battery stack strain of approx. 1.5%, which is consistent with the strains shown in preceding examples for these active elements under a few MPa stress. This implies a much higher stiffness for the frame than for the active elements, as is desired, and a high mechanical efficiency for the device.

Example 9

Electrochemical Woven Actuator

An Electrochemical Woven Actuator (EWA) was designed, as part of this invention, whose properties allow for very large stroke and high force actuation. While the embodiment described herein, for this actuator was developed for operation in a helicopter rotor blade, it is also suitable for other engineering applications requiring large stroke actuation.

Figure 30:
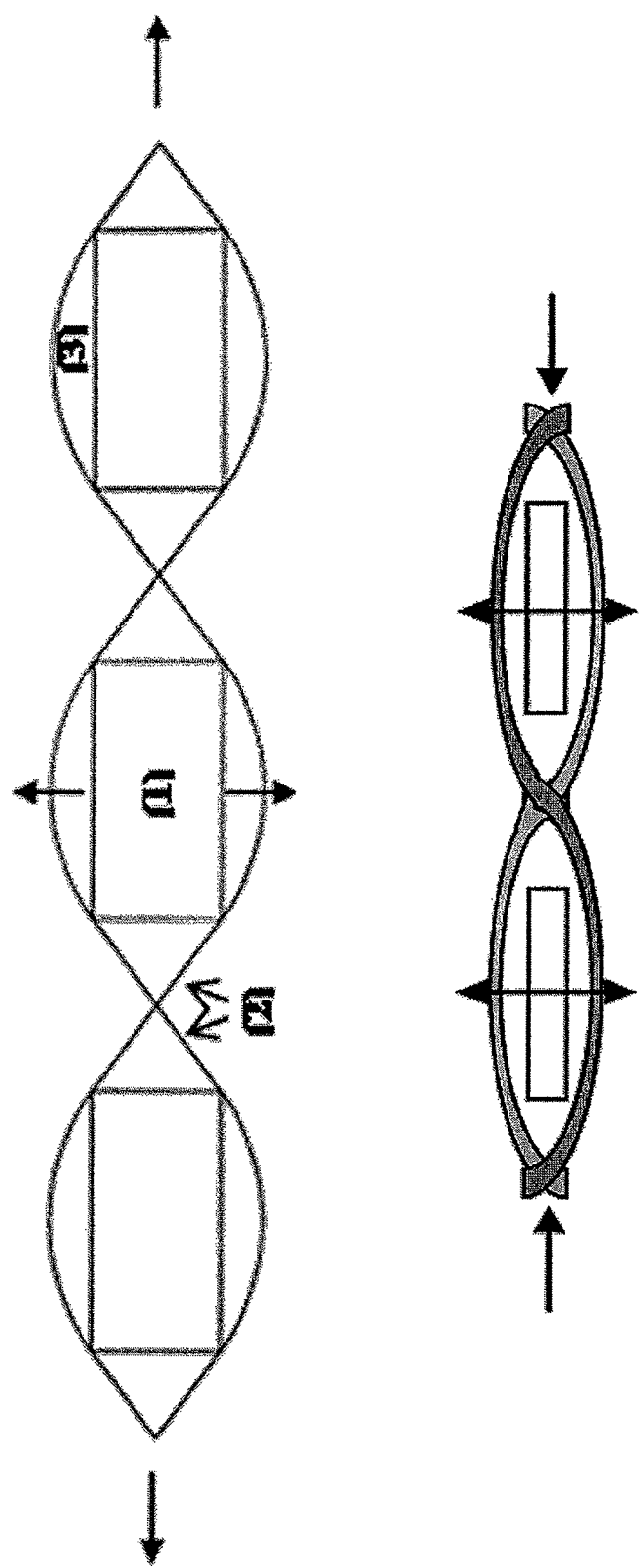
FIG. 30 schematically depicts views of weave actuator with main parts: (1) active elements, (2) top and bottom fibers and (3) constant-curvature caps.

One of the main challenges in developing a novel actuator with the intercalation compounds was that the induced strain of the compounds has an actuation direction not identical to the direction required for many engineering applications. Considering this limitation, the development of actuation mechanisms that transform the principal strain direction of the active element (i.e., a multilayer electrochemical actuator) into the appropriate direction required for the application was sought. One desirable aspect of the actuator sought was to enclose the active elements with a layer of woven fibers, and to generate the strain and force of the actuator in the horizontal direction by extending the active element vertically. FIG. 30 shows the schematic view of the actuator, where three active elements (1) are enclosed by two alternating fibers (2). On the top and bottom surfaces of each active element, a cap with a constant curvature (3) is attached to provide a uniform normal stress. Clearly, a vertical extension of the active element reduces horizontal displacement of the actuator, and therefore, a contraction force is generated in the horizontal direction.

We constructed a first prototype EWA by using stainless steel wires as the weaving material, and tested its performance to validate its concept. The active elements comprised three commercial batteries, each one of them with its caps machined from aluminum and attached with epoxy glue. The geometry of the EWA was chosen to maximize the energy efficiency of the device, while the resulting thickness of the EWA is acceptable. In order to test the performance of the EWA, it was subjected to a constant load while the batteries were charged, as shown in FIG. 31(a). The actuator strain was measured and compared with the strain in one of the batteries. The measurements showed a smaller strain than expected, due to some creep which was produced in large part by the commercial lithium ion cells used as active elements. If, however, the creep is removed from the data, a strain very close to the predicted value is obtained. FIG. 31(b) shows the graph obtained from the test, with the creep portion removed.

Figure 31:
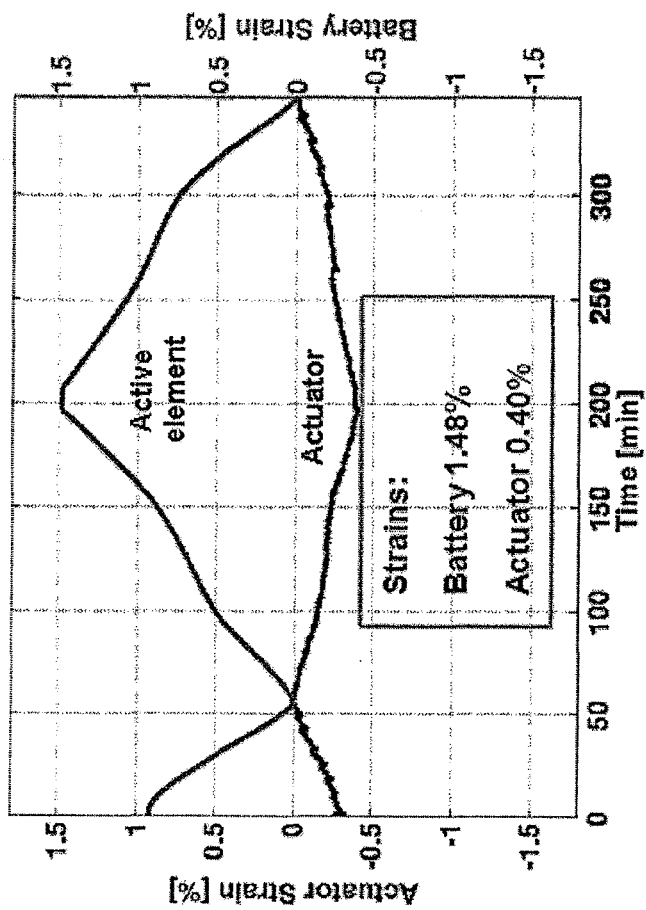
FIG. 31 depicts an experimental setup for a test of an embodiment of an electrochemical woven actuator and results from test, with actuator strain and active element strains shown.
Figure 31:
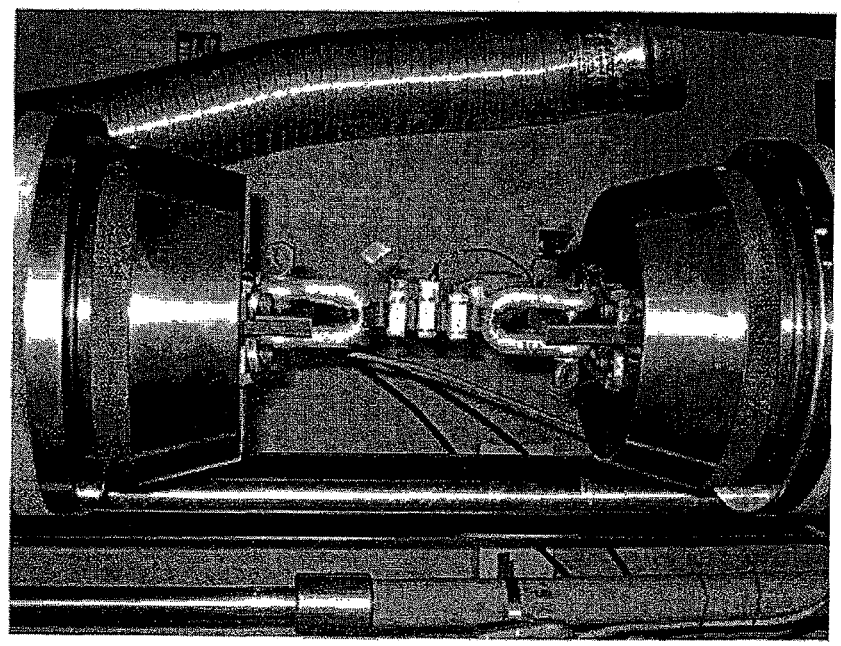
Figure 32:
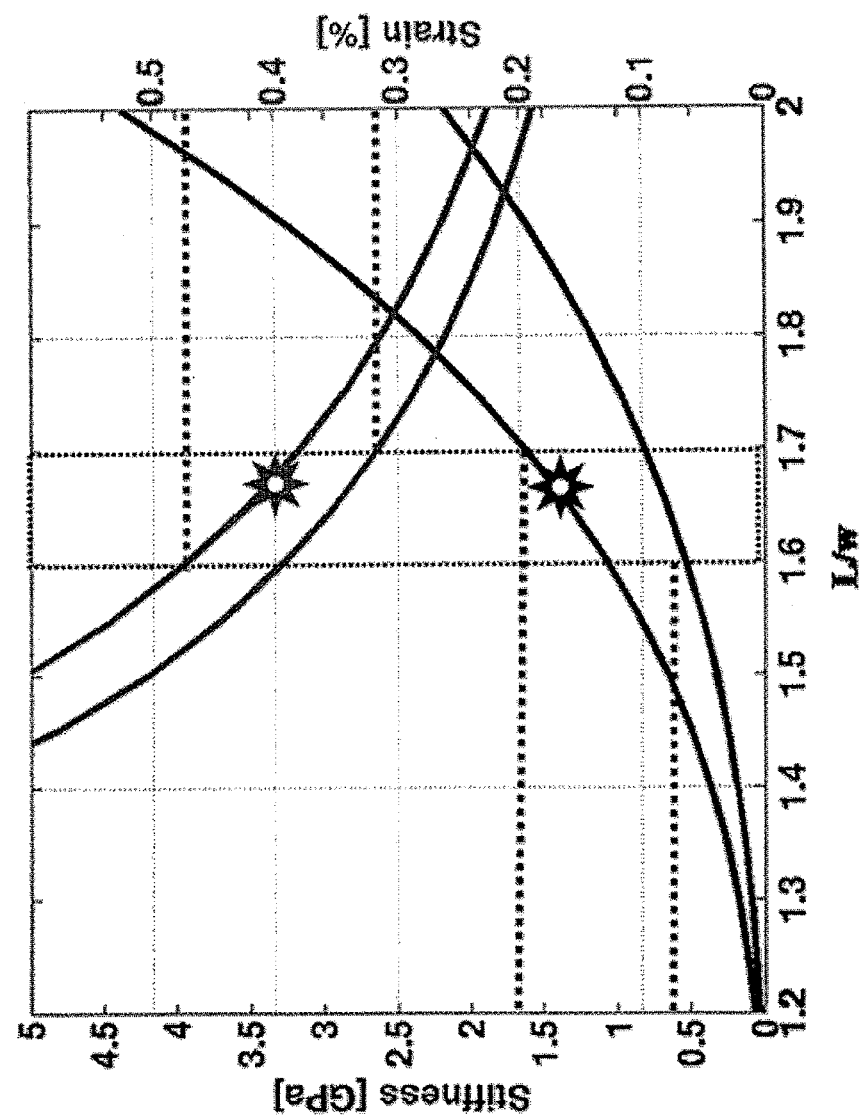
FIG. 32 graphically depicts the theoretical stiffness and maximum-strain bounds of an embodiment of the EWA as a function of the ratio of its length (L) and the active element length (w). Actual test results are shown as stars on the figure.
Figure 32:
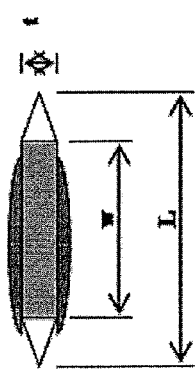

FIG. 31 provided predicted values, and in FIG. 32 the expected stiffness and strain bounds were plotted against the ratio of the actuator length L and the battery length w, which demonstrated good correspondence.

Example 10

Actuated Beams

Figure 33:
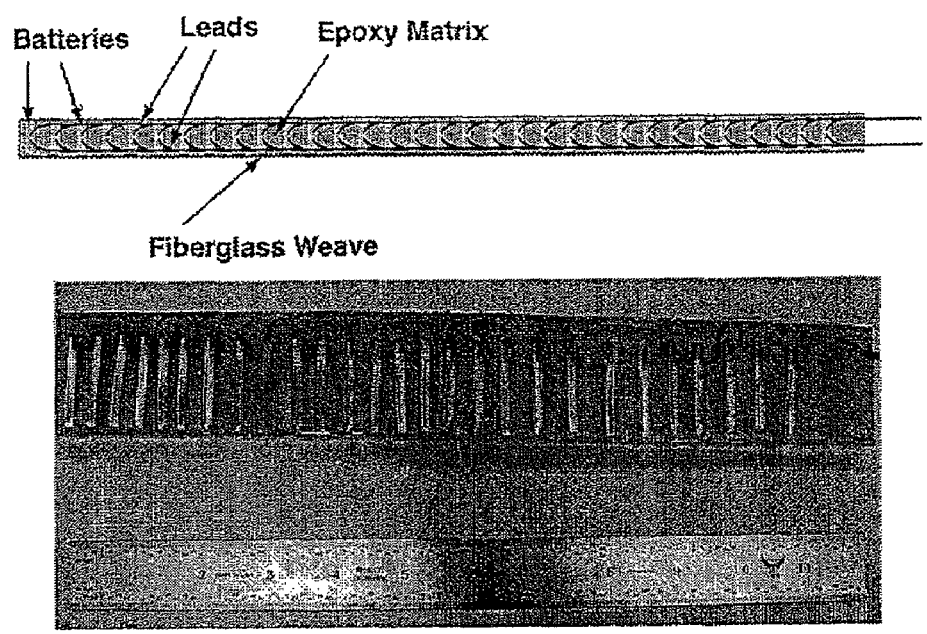
FIG. 33 depicts an embodiment of an actuated beam utilizing 27 electrochemical actuators of type shown in FIGS. 2-4, electrically connected in parallel. Layers of fiberglass weave constrain the deformation of the beam on the lower surface. When one end (the base) of the beam was clamped, the tip of the beam was observed to deform 1 mm upon charging or discharging the batteries, corresponding to a surface strain of 400 microstrain.

It was also of interest to construct an actuated beam, as shown in FIG. 33. One face of the beam was mechanically constrained by two layers of a fiberglass weave. 27 actuators were arrayed as shown in FIG. 33, and epoxy resin was poured as the matrix for the beam. The 27 actuators were electrically joined in parallel, and a power source was used to charge and discharge them within the voltage limits specified by the manufacturer (ATL Corporation). The beam was tested by clamping one end and using a laser beam as a "light lever" to measure the deflection of the other end. Upon charging and discharging, the tip of the beam deformed by 1 mm. This corresponds to a surface strain of 400 microstrain. Thus it is demonstrated that the electrochemical actuators of the invention can be used to provide mechanical actuation in a beam structure.

Example 11

Electrochemically Based Fluidics Actuator

While electrochemical pumping of a gas with a solid electrolyte has been used in prior art to perform actuation, a high stress is not possible, due to the compressibility of the gas. Since liquids have much less compressibility than gases their utilization produces greater actuation authority.

In this concept an electrolytic membrane, which pumps an ion from one side of a device to another, generating a liquid rather than a gas in the process, is used. By pumping a liquid, much higher actuation forces can be produced since liquids have much lower compressibility. Actuators of this kind can be used in fluidic and micro fluidic devices, micro hydraulic devices, nastic structures compressing cellular micro-fluidic or micro hydraulic devices, and others.

Figure 34:
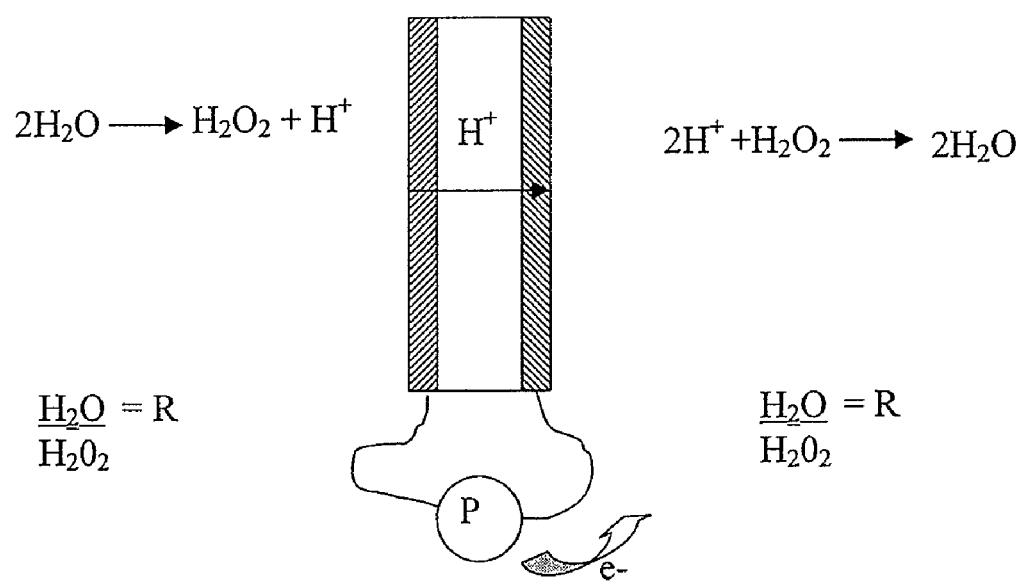
FIG. 34 schematically depicts actuation in a fluidic system, comprising an electrolytic membrane, which pumps an ion from one side to another, producing high actuation forces. In one embodiment, R1 is not equal to R2.
Figure 35:
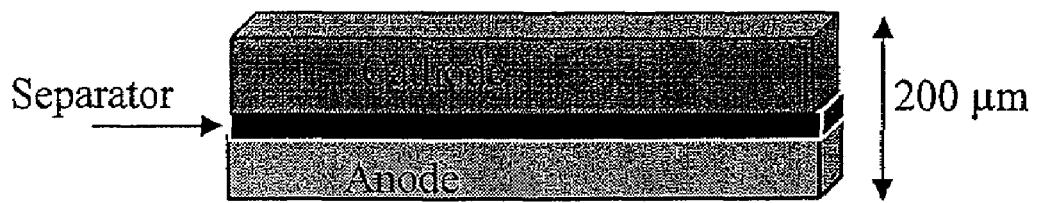
FIG. 35 schematically depicts an example of an actuator comprising a positive electrode, separated from an negative electrode by a separator, where the height of the actuator is 200 μm.
Figure 36:
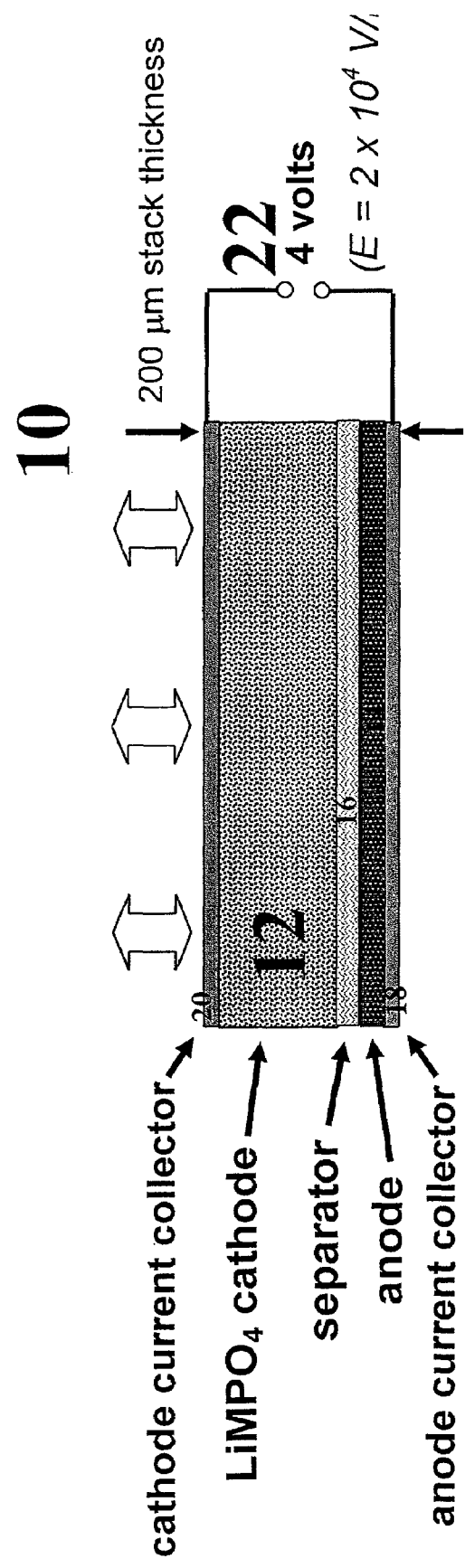
FIG. 36 is an additional schematic depiction of one embodiment of this invention, showing an actuator 10 comprising a positive electrode 12, in this case $LiMPO_4$, where M is any metal, separated from an negative electrode 14 by a separator layer 16, and both negative electrode and positive electrode current collectors, 18 and 20, respectively, attached to a power source 22, supplying 4 V. The actuator possesses 200 μm stack thickness, and an E value of $2\times10^4$ V/m.

A proton-conducting membrane may be utilized to transport hydrogen ions to produce water, resulting in a net volume expansion (FIG. 34). Upon charging, for each mole of H+ transported across the membrane, producing one mole of water, from one half mole of OH, there is a net volume change:

$$\text{For } H_2O = \frac{18.02 \text{ g/mole}}{1.00 \text{ g/cm}^3}$$
$$= 18.02 \text{ cm}^3/\text{mole } H_2O$$

$$\text{For } H_2O_2 = \frac{34.01 \text{ g/mole}}{1.4067 \text{ g/cm}^3}$$
$$= 24.18 \text{ cm}^3/\text{mole } H_2O_2$$
$$= 12.09 \text{ cm}^3/\text{mole } HO$$

Thus the volume expansion is:

$$\frac{18.02 - 12.09}{12.09 \text{ g/cm}^3} \times 100 = 49.05\%$$

What is claimed is:

1. An electrochemical actuator, comprising:
   a. a negative electrode;
   b. a positive electrode; and
   c. an intercalating species;
   wherein, when said electrochemical actuator is subjected to an applied voltage or current, or is permitted to discharge from an initially charged state, intercalation or deintercalation of said species in at least one of the electrodes of said actuator results in a volumetric or dimensional change of said actuator and linear strain of at least 1% is produced.

2. The electrochemical actuator of claim 1, wherein said volumetric or dimensional change is in said negative electrode, said positive electrode, or a combination thereof.

3. The electrochemical actuator of claim 1, wherein said negative electrode or positive electrode undergoes a phase change, anisotropic expansion, or anisotropic contraction upon intercalation.

4. The electrochemical actuator of claim 1, wherein said negative electrode, positive electrode, or combination thereof is lithium or a lithium-metal alloy, which may be crystalline, nanocrystalline, or amorphous.

5. The electrochemical actuator of claim 1, wherein an electrode comprises carbon in the form of graphite, a carbon fiber structure, a glassy carbon structure, a highly oriented pyrolytic graphite, a disordered carbon structure, or a combination thereof.

6. The electrochemical actuator of claim 1, wherein the intercalating species is an ion.

7. The electrochemical actuator of claim 1, wherein the intercalating species is a proton, an alkali metal, or an alkaline earth metal.

8. The electrochemical actuator of claim 4, wherein said negative electrode comprises lithium metal and said positive electrode comprises aluminum, silver, gold, boron, bismuth, gallium, germanium, indium, lead, antimony, silicon, tin, or a combination thereof.

9. The electrochemical actuator of claim 4, wherein said negative electrode comprises lithium metal and said positive electrode comprises aluminum.

10. The electrochemical actuator of claim 4, wherein said negative electrode comprises lithium metal and said positive electrode comprises silver.

11. The electrochemical actuator of claim 4, wherein said negative electrode comprises lithium metal and said positive electrode comprises gold.

12. The electrochemical actuator of claim 4, wherein said negative electrode comprises lithium metal and said positive electrode comprises boron.

13. The electrochemical actuator of claim 4, wherein said negative electrode comprises lithium metal and said positive electrode comprises bismuth.

14. The electrochemical actuator of claim 4, wherein said negative electrode comprises lithium metal and said positive electrode comprises gallium.

15. The electrochemical actuator of claim 4, wherein said negative electrode comprises lithium metal and said positive electrode comprises germanium.

16. The electrochemical actuator of claim 4, wherein said negative electrode comprises lithium metal and said positive electrode comprises indium.

17. The electrochemical actuator of claim 4, wherein said negative electrode comprises lithium metal and said positive electrode comprises lead.

18. The electrochemical actuator of claim 4, wherein said negative electrode comprises lithium metal and said positive electrode comprises antimony.

19. The electrochemical actuator of claim 4, wherein said negative electrode comprises lithium metal and said positive electrode comprises silicon.

20. The electrochemical actuator of claim 4, wherein said negative electrode comprises lithium metal and said positive electrode comprises tin.

* * * * *